(12) United States Patent
Yamada et al.

(10) Patent No.: US 12,482,217 B2
(45) Date of Patent: Nov. 25, 2025

(54) STORAGE MEDIUM, IMAGE PROCESSING APPARATUS, AND IMAGE PROCESSING METHOD

(71) Applicant: CANON KABUSHIKI KAISHA, Tokyo (JP)

(72) Inventors: Akitoshi Yamada, Kanagawa (JP); Shinichi Miyazaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 311 days.

(21) Appl. No.: 18/350,931

(22) Filed: Jul. 12, 2023

(65) Prior Publication Data

US 2024/0037895 A1 Feb. 1, 2024

(30) Foreign Application Priority Data

Aug. 1, 2022 (JP) ................................. 2022-122595
Aug. 1, 2022 (JP) ................................. 2022-122596
(Continued)

(51) Int. Cl.
*G06V 10/28* (2022.01)
*G06V 10/54* (2022.01)
(Continued)

(52) U.S. Cl.
CPC .............. *G06V 10/28* (2022.01); *G06V 10/54* (2022.01); *G06V 10/60* (2022.01); *H04N 1/405* (2013.01)

(58) Field of Classification Search
CPC ........ G06V 10/28; G06V 10/54; G06V 10/60; H04N 1/405
See application file for complete search history.

(56) References Cited

U.S. PATENT DOCUMENTS 7,855,809 B2 12/2010 Kato
7,965,418 B2 6/2011 Yamada
(Continued)

FOREIGN PATENT DOCUMENTS

WO 2011/036735 A1 3/2011

OTHER PUBLICATIONS

NPL: 2005-2025.*
U.S. Appl. No. 18/331,427, filed Jun. 8, 2023 by Yoshinori Mizoguchi.

*Primary Examiner* — Quang N Vo
(74) *Attorney, Agent, or Firm* — VENABLE LLP

(57) ABSTRACT

An object of the present disclosure is to maintain density as an area as compared to a conventional technology even in a case where the quantization target is an image of a high-frequency pattern, such as a hatching pattern, with a halftone value to be subjected to an error diffusion process. An embodiment of the present invention is a program for causing a computer to function as an image processing apparatus for quantizing a pixel value of each pixel in an input image, the computer being caused to function as: an adding unit configured to add at least part of a difference between an accumulated pixel value and an applied error value for a pixel of interest to a quantization error value obtained by the quantization; and an error distributing unit configured to diffuse an added error obtained by the adding unit to peripheral pixels around the pixel of interest.

42 Claims, 28 Drawing Sheets

(30) Foreign Application Priority Data

Aug. 1, 2022 (JP) ................................. 2022-122675
Aug. 1, 2022 (JP) ................................. 2022-122729

(51) Int. Cl.
  *G06V 10/60* (2022.01)
  *H04N 1/405* (2006.01)

(56) References Cited

U.S. PATENT DOCUMENTS

| | | |
|---|---|---|
| 8,503,031 B2 | 8/2013 | Kajihara |
| 8,619,319 B2 | 12/2013 | Tsuchiya |
| 8,830,530 B2 | 9/2014 | Sano |
| 9,087,291 B2 | 7/2015 | Hori |
| 9,092,720 B2 | 7/2015 | Nakagawa |
| 9,135,536 B2 | 9/2015 | Miyazaki |
| 9,210,292 B2 | 12/2015 | Miyake |
| 9,807,281 B2 | 10/2017 | Kajiwara |
| 9,876,940 B2 | 1/2018 | Yamada |
| 10,033,906 B2 | 7/2018 | Nakagawa |
| 10,165,153 B2 | 12/2018 | Kajiwara |
| 10,462,333 B2 | 10/2019 | Kajiwara |
| 10,469,710 B2 | 11/2019 | Yamada |
| 2009/0116072 A1* | 5/2009 | Hiramoto ............... G06V 10/28 358/3.06 |
| 2014/0139853 A1* | 5/2014 | Goto ....................... H04N 1/405 358/1.9 |

* cited by examiner

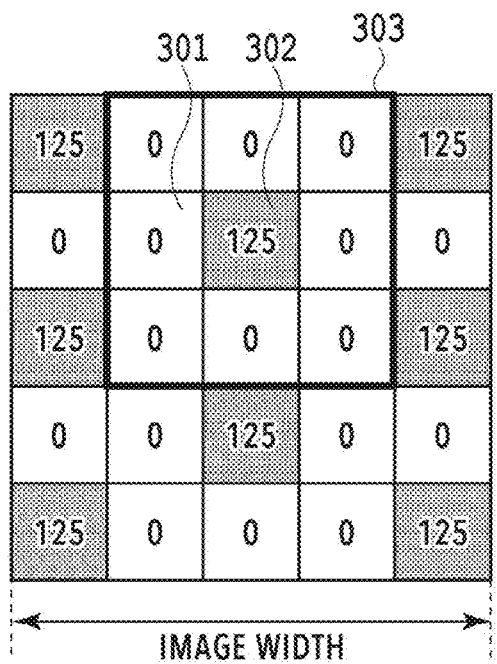
FIG.3A
FIG.3B
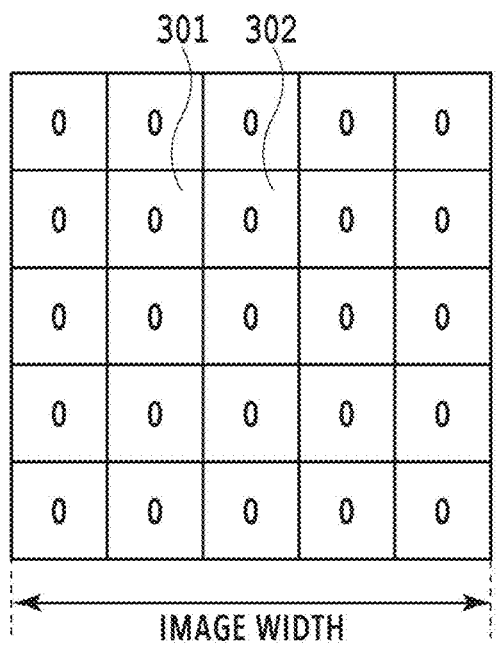
FIG.3C
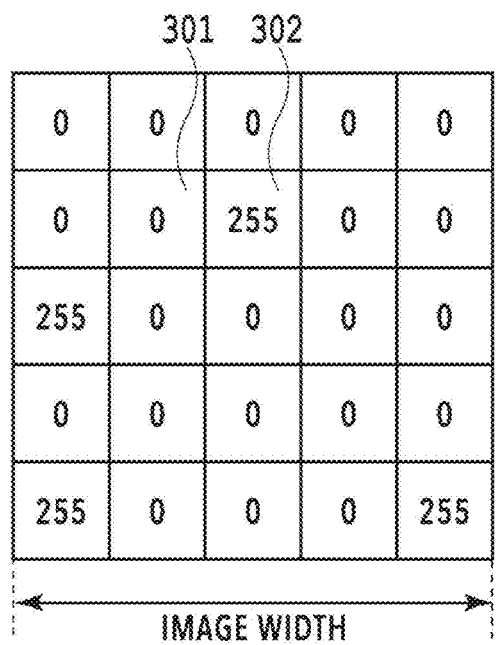
FIG.3D

STORAGE MEDIUM, IMAGE PROCESSING APPARATUS, AND IMAGE PROCESSING METHOD

BACKGROUND

Field

The present disclosure relates to a storage medium, an image processing apparatus, and an image processing method.

Description of the Related Art

In order to print an image with a printer, it is typically necessary to perform a quantization process on each pixel forming the image. The quantization process is a halftone process of converting an image expressed with continuous tones into the number of tones which can be expressed by the printer. For example, a dither process and an error diffusion process have been known as methods of performing the quantization process.

A method of performing quantization by selectively using a dither process and an error diffusion process has been known. In WO2011/036735, quantization is performed not by switching between the dither process and the error diffusion process and performing one of the processes but by allocating the degree of influence of the dither process and the degree of influence of the error diffusion process. With the method of WO2011/036735, it is possible to suppress generation or occurrence of texture, a dot delay, a worm noise, and the like.

SUMMARY

However, with an image of a high-frequency pattern, such as a hatching pattern, with a halftone value to be subjected to the error diffusion process, there is a case where the image is processed by the error diffusion process but the degree of error propagation is low or no error propagation occurs depending on the error use rate. This may result in a failure to maintain density as an area.

In view of the above problem, an object of the present disclosure is to maintain density as an area as compared to the conventional technology even in a case where the quantization target is an image of a high-frequency pattern, such as a hatching pattern, with a halftone value to be subjected to an error diffusion process.

An embodiment of the present invention is a non-transitory computer readable storage medium storing a program for causing a computer to perform quantization on a density value of each pixel in an input image, the density value indicating density of a color, the quantization comprising: a pixel selecting process of sequentially selecting a pixel of interest to be subjected to the quantization; a use rate determining process of determining a first use rate and a second use rate based on the density value of the pixel of interest, the first use rate indicating a degree of influence of a dither matrix noise on the quantization of the pixel of interest, the dither matrix noise being a noise designated by a preset dither matrix, the second use rate indicating a degree of influence of an accumulated error on the quantization of the pixel of interest, the accumulated error being obtained by accumulating quantization errors resulting from the quantization of peripheral pixels; a quantization executing process of quantizing the density value of the pixel of interest by using a dither matrix noise according to the first use rate for the pixel of interest and using the accumulated error according to the second use rate for the pixel of interest; and an adding process of adding at least part of the accumulated error not used in the quantization of the pixel of interest to a quantization error resulting from the quantization of the pixel of interest Further features of the present invention will become apparent from the following description of exemplary embodiments with reference to the attached drawings.

BRIEF DESCRIPTION OF THE DRAWINGS

FIGS. 3A to 3D are diagrams showing details of an input image and processing results;

DESCRIPTION OF THE EMBODIMENTS

First Embodiment

An example embodiment of an image processing apparatus, an image processing method, and a program will be described below in detail with reference to accompanying drawings. Note that the following embodiment does not limit the present invention, and not all the combinations of the features described in this embodiment are necessarily essential for the solution provided by the present invention. Moreover, the positions, shapes, and the like of the components described in the embodiment are mere examples, and there is no intension to limit the scope of the present invention only to these.

<Configuration of Printing System>

Figure 1A:
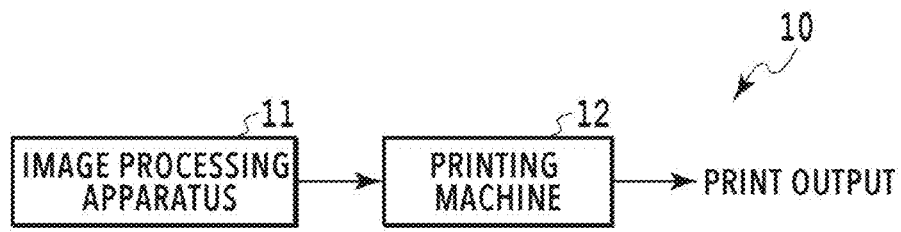
FIGS. 1A and 1B are diagrams showing an overview of a quantization process.
Figure 1B:
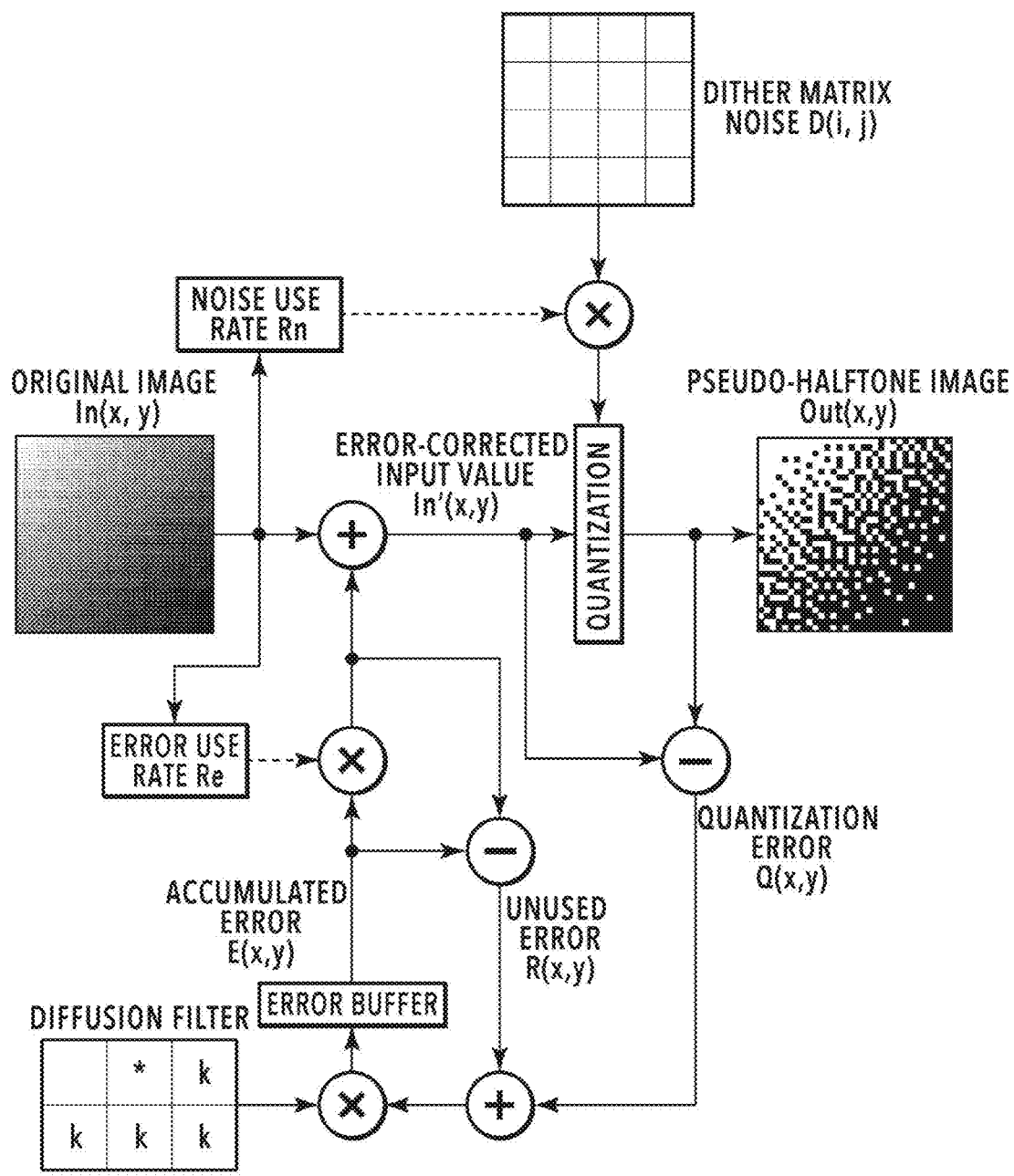

FIGS. 1A and 1B are diagrams illustrating a program according to an embodiment of the present disclosure. FIG. 1A shows an example of the configuration of a printing system 10 using the program. As shown in FIGS. 1A and 1B, the printing system 10 has an image processing apparatus 11 and a printing machine 12.

The image processing apparatus 11 is an apparatus that performs an image forming process such as a raster image processor (RIP) process, for example. The image processing apparatus 11 generates printable data indicating an image in a format which can be analyzed by the printing machine 12 by developing an original image indicated by print data. While illustration is omitted, the image processing apparatus 11 includes at least a central processing unit (CPU), a read-only memory (ROM) storing programs of various processes to be executed by the CPU and the like, and a random access memory (RAM) used as a work memory and the like for the CPU. Also, the image processing apparatus 11 includes a storage unit capable of storing various pieces of information.

In this embodiment, the image processing apparatus 11 performs quantization on at least the pixel value of each pixel in the original image, which is a density value indicating the density of color, in the image forming process. In this case, the image processing apparatus 11 performs the quantization for each process color used in the printing machine 12. In this way, the image processing apparatus 11 forms a halftone image for each process color based on the print data.

The image processing apparatus 11 is, for example, a host personal computer (PC) that controls the printing machine 12, and operates as an image processing apparatus in accordance with a predetermined program. The image processing apparatus 11 may receive the print data from, for example, another PC. The print data may be created by the user on the image processing apparatus 11.

The printing machine 12 is, for example, an ink jet printer, and prints an image based on the printable data received from the image processing apparatus 11. In this embodiment, the printing machine 12 performs color printing by using inks of cyan (C), magenta (M), yellow (Y), and black (K) as process colors. The printing machine 12 may perform printing by using inks of other additional colors.

<Overview of Quantization Process>

Next, an overview of the quantization process executed by the image processing apparatus 11 will be described. FIG. 1B is a diagram showing an overview of the quantization process performed by the image processing apparatus 11. The image processing apparatus 11 forms a pseudo-halftone image, which is a halftone image, by quantizing the original image for each process color. The quantization is a process of converting a density value In(x, y) at each set of coordinates in the original image into a quantized value out(x, y) at the same set of coordinates in the pseudo-halftone image.

In this embodiment, the image processing apparatus 11 performs the quantization through the use of a method using both a dither matrix noise D(i, j) and an accumulated error E(x, y) (hybrid error diffusion process). The image processing apparatus 11 additionally uses a noise use rate Rn and an error use rate Re each of which is set to a value in the range of 0 to 1 (0% to 100%) as parameters associated with the dither matrix noise D(i, j) and the accumulated error E(x, y).

The noise use rate Rn is a parameter indicating the degree of influence of the dither matrix noise D(i, j), which is a two-dimensional matrix, on the quantization process, and is calculated based on the density value In(x, y) of the pixel to be quantized. The image processing apparatus 11 performs the quantization by using the product of the dither matrix noise D(i, j) and the noise use rate Rn, instead of using the dither matrix noise D(i, j) as is. Thus, the image processing apparatus 11 uses the dither matrix noise D(i, j) for each pixel according to the noise use rate Rn for that pixel.

The error use rate Re is a parameter indicating the degree of influence of the accumulated error E(x, y) on the quantization process, and is calculated based on the density value In(x, y) of the pixel to be quantized. The image processing apparatus 11 calculates an error-corrected input value In'(x, y) of each pixel corresponding to its density value In(x, y) by using the product of the accumulated error E(x, y) and the error use rate Re, instead of using the accumulated error E(x, y) as is. The image processing apparatus 11 performs the quantization process by using the calculated error-corrected input value In'(x, y). Thus, the image processing apparatus 11 uses the accumulated error E(x, y) for each pixel according to the error use rate Re for that pixel. The quantization process will be described in more detail later.

An unused error R(x, y), which is an unused portion of the accumulated error E(x, y), is combined to a later-described quantization error Q(x, y) and included in the accumulated error E(x, y). The accumulated error E(x, y) is calculated using the following equation.

$$R(x, y) = E(x, y) - (E(x, y) \times Re)$$
$$= E(x, y) \times (1 - Re)$$

Specifically, instead discarding the unused error as in the conventional example, the unused error is propagated to other pixels. In this way, it is possible to maintain density as an area as compared to the conventional example.

<Concern with Publicly Known Technology>

A processing result by a conventional method will be described below using FIGS. 2 and 3A to 3D. In the conventional method, the noise use rate and the error use rate for each pixel to be quantized is determined based on the density value In(x, y) of the pixel.

Figure 2:
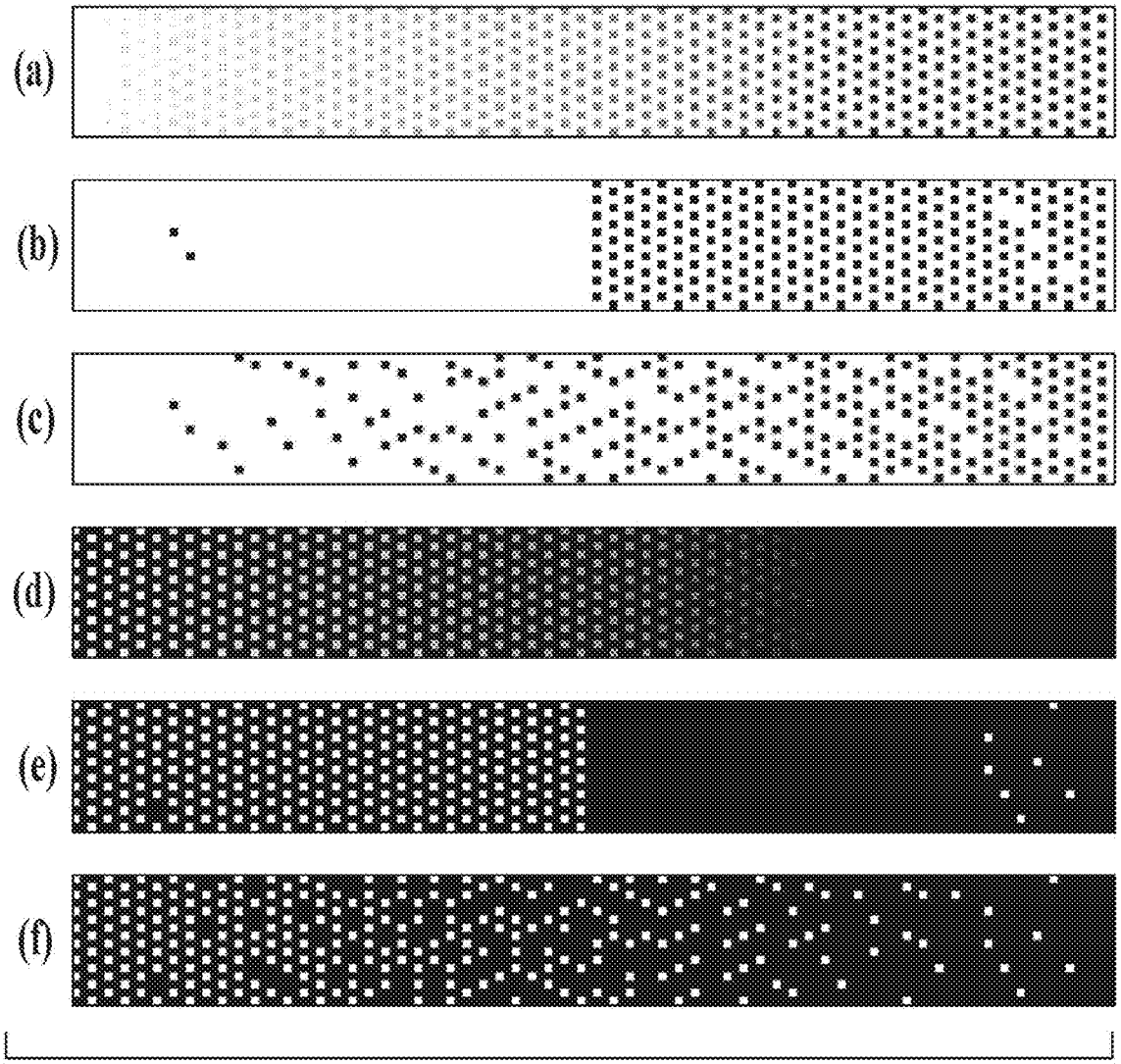
FIG. 2 is a diagram showing input images and processing results.

FIG. 2 exemplarily show input images according to this embodiment and processing results of those input images.

Figure 6:
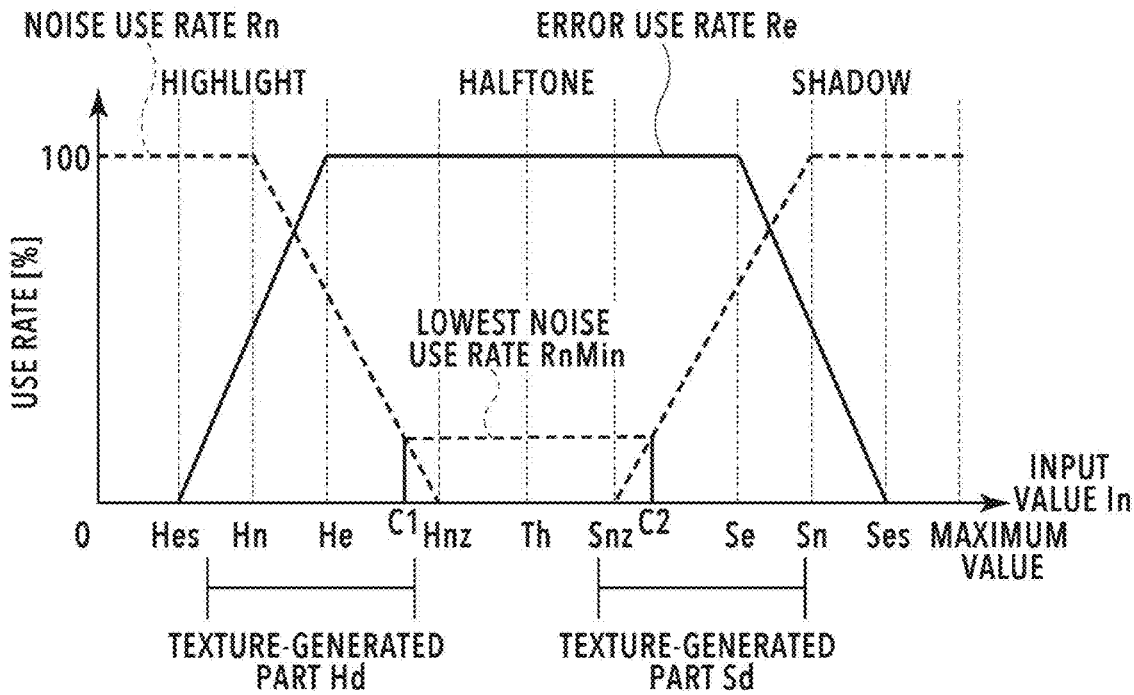
FIG. 6 is a graph and calculation equations correlating an error use rate Re and a noise use rate Rn with a density value In(x, y)

Reference Sign (a) of FIG. 2 shows an image in any one of the process colors as an input image to be processed in the quantization process in this embodiment. In this input image, pixels with density 0 and pixels with density are arranged in a staggered pattern, and the density of the pixels with density gradually rises from the left of the image toward the right. FIG. 3A shows an image obtained by cutting 5×5 pixels out of a halftone area in the image shown in Reference Sign (a) (the density value of the pixels with density is 125 (in a case of 8 bit)). The filled pixels in FIG. 3A are pixels with a density value of 125 (8 bit), and the error use rate is 100% and the noise use rate is 0% for these pixels. On the other hand, the blank pixels in FIG. 3A are pixels with a density value of 0, and the error use rate is 0% and the noise use rate is 100% for these pixels. Also, the diffusion filter is the diffusion filter shown in FIG. 1B. The ratio between the error use rate and the noise use rate with respect to the density value are as shown in FIG. 6, and details will be described later.

The density value of a pixel 301 in FIG. 3A is 0, and therefore the corresponding noise use rate and error use rate are 100% and 0%, respectively. In a case of quantizing this pixel, the accumulated error E to be applied to the pixel 301 is a value not equal to 0 since there are pixels with a density value of 125 around it and the errors generated at the peripheral pixels propagate. Nonetheless, since the error use rate is 0%, the accumulated error E is not reflected on the input value, so that the error-diffused input value is 0 (=0+0). Thus, in this embodiment, in a case where the value of the dither matrix corresponding to the pixel 301 is −108 and an initial threshold value is 128, the noise-corrected threshold value is 16 (=−108×1.0+128). As a result, the input value of 0 and the threshold value of 16 are compared with each other. Since the input value is less than the threshold value, the quantization result is 0. Moreover, the error is calculated as 0 (=0−0), so that there is no error to be diffused to the periphery.

On the other hand, the density value of a pixel 302 in FIG. 3A is 125, and therefore the corresponding noise use rate and error use rate are 0% and 100%, respectively. The peripheral pixels around this pixel are pixels with a density value of 0, so that no error is generated at any of these peripheral pixels. Hence, the accumulated error E to be applied to the pixel 302 is 0. Thus, although the error use rate is 100%, the accumulated error E is 0 and the error-diffused input value is therefore 125 (=125+0). In this embodiment, in a case where the value of the dither matrix for the pixel 302 is −64 and the initial threshold value is 128, the noise-corrected threshold value is 128 (=−64×0.0+128). As a result, the input value of 125 and the threshold value of 128 are compared with each other. Since the input value is less than the threshold value, the quantization result is 0. Moreover, the error is calculated as +125 (=125−0), and is diffused to peripheral pixels by the diffusion filter.

As described above, in the image in FIG. 3A, the error generated at each pixel with density is diffused but is not applied to peripheral pixels, so that the output values in the area are all 0, as shown in FIG. 3C, representing a quantization result failing to maintain density as an area. Accordingly, as shown in Reference Sign (b) of FIG. 2, with an input value for which the error use rate is 100% and the noise use rate is 0%, the density in the quantization result by the error diffusion process changes abruptly at a reference threshold value. Also, with tones for which the noise use rate is low, a quantization result failing to maintain density as an area may be obtained.

Also, in the conventional example, as can be understood by viewing Reference Sign (b) of FIG. 2, the quantization result in a light part (a left end side in Reference Sign (b)) is partly 255, and the quantization result in a dark part (a right end side in Reference Sign (b)) is partly 0. This is because as the noise use rate shifts toward 100% the following pixels appear in the light part and the dark part.

Light part: noise-corrected threshold value <pixel density value
Dark part: noise-corrected threshold value >pixel density value By comparing Reference Sign (a) and Reference Sign (b), it can be seen that, in Reference Sign (b), the density gradation is not maintained such that the density not only changes abruptly at around the center but also is reversed between the light part and the dark part.

According to this embodiment, for example, it is possible to impose influence of the spatial frequency characteristic of the dither process (dither characteristic) on the spatial frequency characteristic of the error diffusion process (error diffusion characteristic). In this way, the quantization can be performed, for example, through the use of a method in which the dither characteristic is combined into the error diffusion characteristic. Moreover, in this case, unlike the case of, for example, simply switching between the dither process and the error diffusion process or the like, it is possible to appropriately prevent the generation of a boundary line due to the switching of the processes and the like. In addition, from each pixel that does not use the entire accumulated error, the unused error can be propagated to peripheral pixels. In this way, even in a case of an image of a high-frequency pattern, such as a hatching pattern, with a halftone value to be subjected to the error diffusion process, it is possible to maintain density as an area as compared to the conventional technology.

Thus, according to this embodiment, it is possible to perform, for example, a quantization process which makes appropriate use of each process' specialty while also avoiding the problem of failing to maintain density in the quantization result obtained by using the processes together. As a result, for example, it is possible to appropriately solve various printing problems originating from the quantization process, and thus perform the quantization process through the use of a more appropriate method.

The dither matrix noise $D(i, j)$ is a two-dimensional matrix and is, for example, a value designated by a preset dither matrix. The dither matrix noise $D(i, j)$ may be identical or similar to the dither matrix noise used in a conventional dither process, for example. It is preferable that, for example, a noise with a blue noise characteristic be used as the dither matrix noise $D(i, j)$. It is also preferable that the image processing apparatus 11 change the dither matrix to be used for each process color.

The accumulated error $E(x, y)$ is a value obtained by accumulating the sums of quantization errors $Q(x, y)$ which are the errors resulting from the quantization of peripheral pixels and the respective unused errors $R(x, y)$ mentioned above, and is calculated using a preset diffusion filter (diffusion matrix). The calculated accumulated error $E(x, y)$ is stored, for example, in an error buffer. The image processing apparatus 11 calculates the accumulated error $E(x, y)$ through the use of a method identical or similar to a method of calculating an accumulated error used in a conventional error diffusion process, for example.

<Quantization Process>

Figure 4:
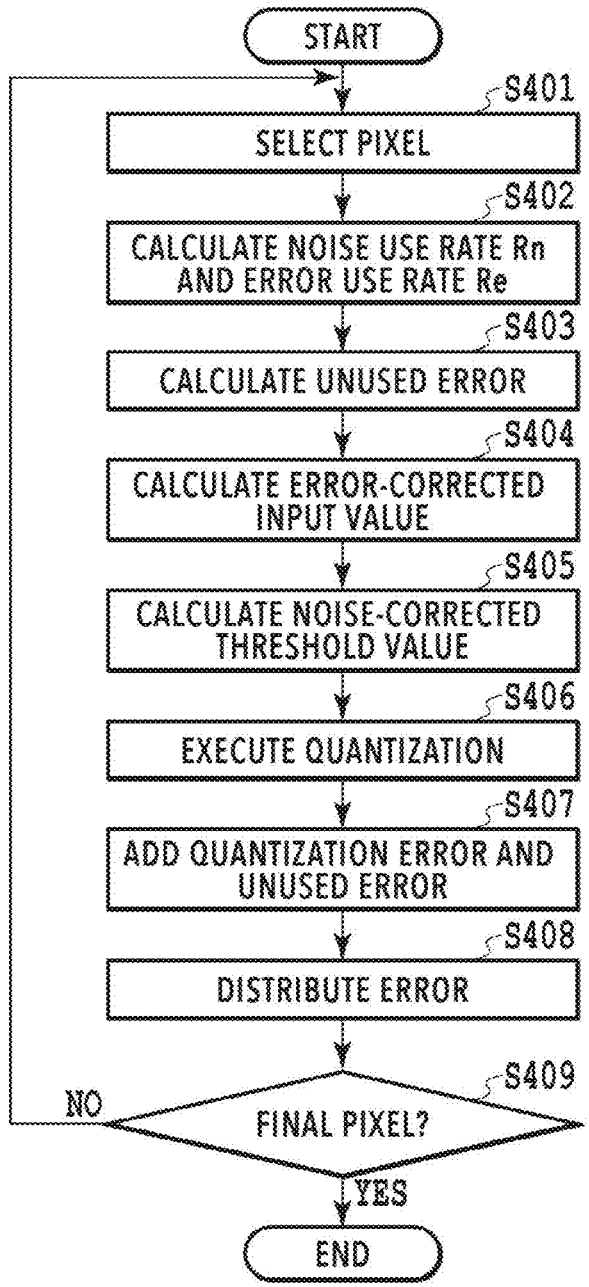
FIG. 4 is a flowchart of a quantization operation.

The quantization process executed by the image processing apparatus 11 in this embodiment will be described below. The quantization process is a process of executing quantization on each pixel in an original image. FIG. 4 is a flowchart showing an example of the quantization operation. The image processing apparatus 11 performs the following processes, for example, for each process color. Note that each step (referred to as "S~") in FIG. 4 is executed by the image processing apparatus 11, more specifically, the CPU of the image processing apparatus 11.

In the quantization operation, the image processing apparatus 11 in this embodiment firstly selects a pixel of interest which is a pixel to be quantized from the original image (pixel selecting process S401). Then, the image processing apparatus 11 calculates the noise use rate Rn and the error use rate Re for the selected pixel based on the density value In(x, y) of that pixel, which is its pixel value. As a result, the image processing apparatus 11 determines the noise use rate Rn and the error use rate Re to be used in the quantization of the pixel of interest (use rate determining process S402).

Subsequently, the image processing apparatus 11 calculates the unused error R(x, y) in the accumulated error E(x, y), which will not be used in the quantization, through the use of the equation below (unused error calculating process S403).

$$R(x,y)=E(x,y)\times(1-Re)$$

Subsequently, the image processing apparatus 11 calculates the error-corrected input value In'(x, y), which is a density value after performing correction with the accumulated error E(x, y) (error-corrected input value calculating process S404). In this process, the image processing apparatus 11, for example, adds an applied error value, which is the product of the error use rate Re for the pixel selected in the pixel selecting process S401 and the accumulated error E(x, y), to the density value In(x, y) of that pixel. The image processing apparatus 11 calculates the value after the addition as the error-corrected input value In'(x, y), which is an accumulated pixel value.

The image processing apparatus 11 additionally calculates a noise-corrected threshold value Th', which is a threshold value reflecting the dither matrix noise D(i, j), as a threshold value to be used in the quantization (noise-corrected threshold value calculating process S405). In this process, the image processing apparatus 11, for example, adds the product of the noise use rate Rn for the pixel selected in the pixel selecting process S401 and the dither matrix noise D(i, j) to a preset initial threshold value Th. The image processing apparatus 11 calculates the value after the addition as the noise-corrected threshold value Th', which is a quantization threshold value.

Then, the image processing apparatus 11 compares the calculated noise-corrected threshold value Th' and error-corrected input value In'(x, y) with each other. By doing so, the image processing apparatus 11 performs quantization on the pixel selected in the pixel selecting process S401 and thereby calculates a quantized value (quantization executing process S406).

Subsequently, the image processing apparatus 11 calculates an added error Q'(x, y) by adding up the quantization error Q(x, y) resulting from this quantization of the pixel and the unused error R(x, y) (error adding process S407).

Subsequently, the image processing apparatus 11 diffuses this added error Q'(x, y) of the pixel to peripheral pixels through the use of the diffusion filter (error distributing process S408). Accordingly, the image processing apparatus 11 integrates the added error Q'(x, y) with the values in the diffusion filter corresponding to the distribution destination coordinates of the peripheral pixels and updates the values of the accumulated errors E(x, y) for the peripheral pixels.

After the error distributing process S408, the image processing apparatus 11 determines whether the pixel subjected to the quantization is the final pixel in the original image (final pixel determining process S409). If determining that the pixel is the final pixel (Yes in S409), the image processing apparatus 11 ends the quantization process of the original image. If determining that the pixel is not the final pixel (No in S409), the image processing apparatus 11 proceeds to the pixel selecting process S401 again and selects the next pixel. In this way, the image processing apparatus 11 sequentially selects the pixels to be quantized in the pixel selecting process S401. Moreover, by performing the processes subsequent to the pixel selecting process S401 on the pixels sequentially selected, the image processing apparatus 11 executes the quantization on those pixels.

According to this embodiment, for example, by adding the accumulated error E(x, y) multiplied by the error use rate Re to the density value In(x, y), it is possible to appropriately adjust the degree of influence of the error diffusion characteristic. By adding the dither matrix noise D(i, j) multiplied by the noise use rate Rn to the initial threshold value Th, it is possible to appropriately adjust the degree of influence of the dither characteristic.

Accordingly, it is possible to appropriately set the degrees of influence of the error diffusion characteristic and the dither characteristic, for example, based on the density value In(x, y), which is the input value. It is also possible to perform a quantization process which makes appropriate use of the specialty of each of the error diffusion process and the dither process. Further, even in a case where the error use rate Re is less than 1, the unused error can be propagated to peripheral pixels. Hereinafter, the processes in the quantization operation will be described in more detail.

<Pixel Selecting Process>

Figure 5:
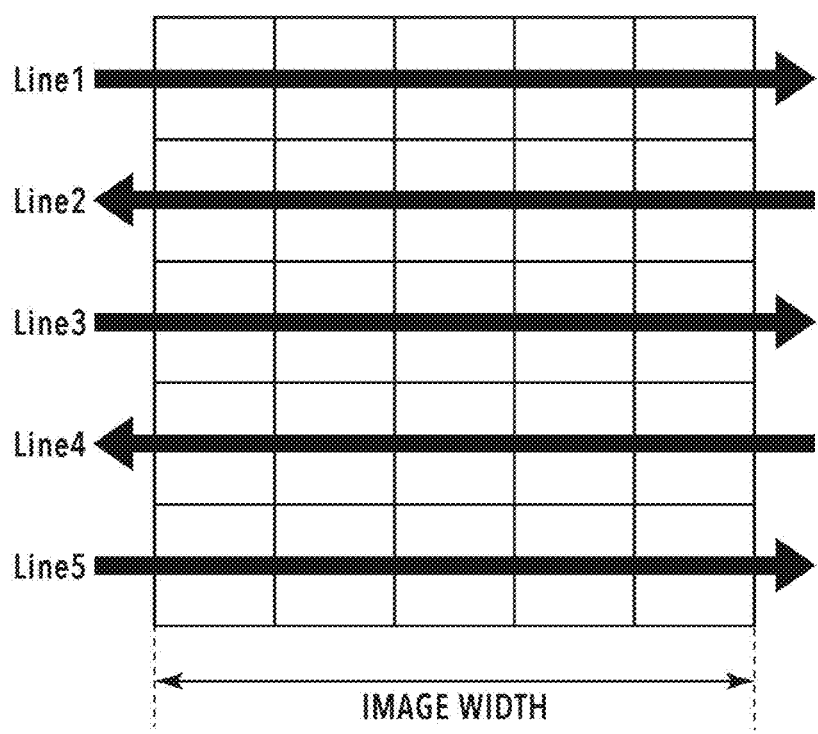
FIG. 5 is a diagram illustrating a pixel selecting process S401 in detail.

FIG. 5 is a diagram illustrating a pixel selecting process S401 in more detail. FIG. 5 shows an example of the order of sequentially selecting pixels. In the pixel selecting process S401 in this embodiment, the image processing apparatus 11, for example, sequentially selects lines of pixels and sequentially selects the pixels in the selected line in a predetermined processing direction. The image processing apparatus 11 switches this processing direction for each line to be processed. For example, the image processing apparatus 11 sequentially selects the pixels from left to right in the odd-numbered lines and right to left in the even-numbered lines. In this way, the image processing apparatus 11 performs the quantization process by bidirectional processing. In a case where the bidirectional processing is performed, the direction of the error diffusion is not fixed and it is thus possible to more appropriately distribute dots. In this way, it possible to appropriately prevent the occurrence of a dot delay and the like as compared with a case where the quantization is performed by unidirectional processing, for example.

<Use Rate Determining Process>

Figure 7:
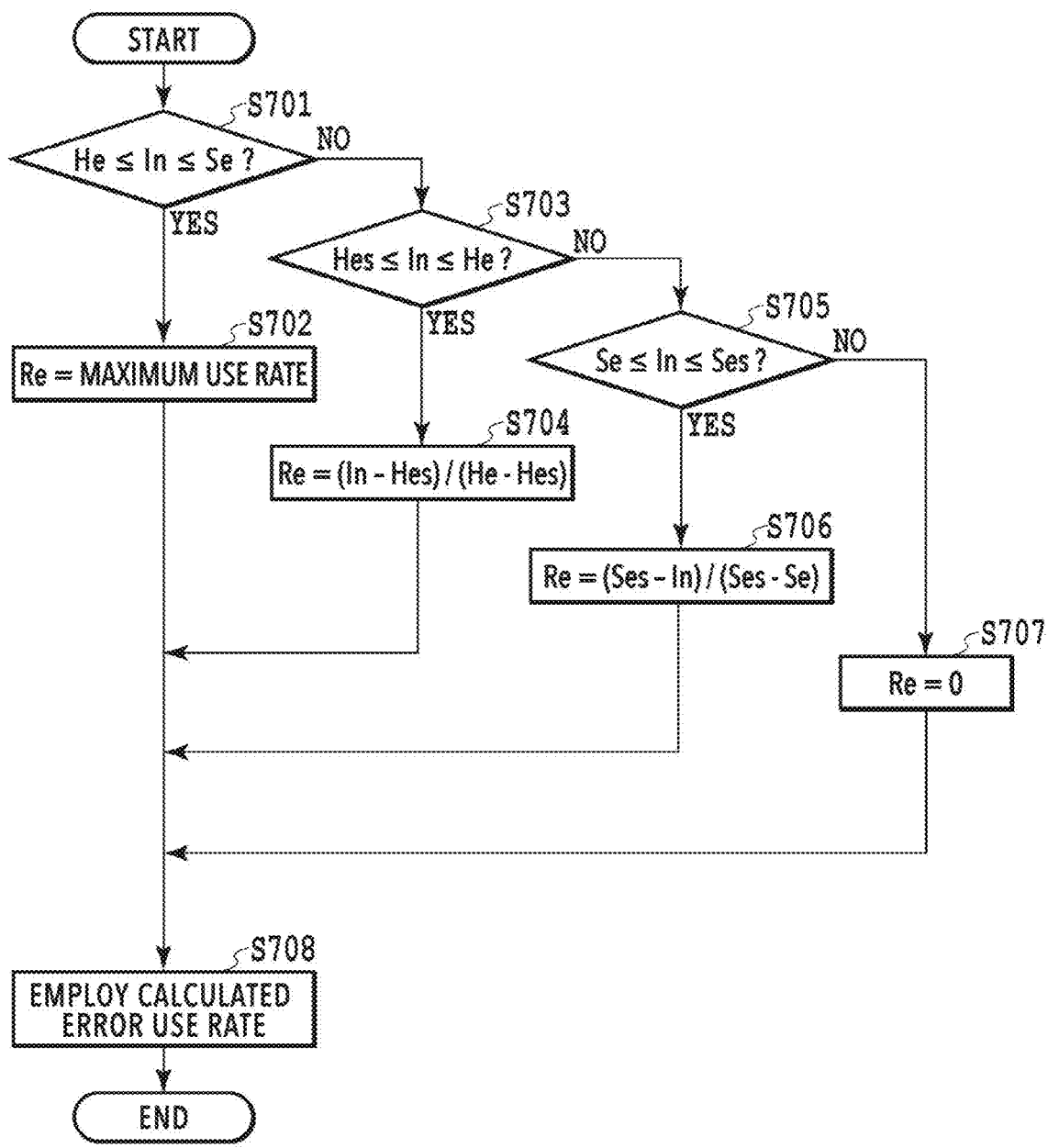
FIG. 7 is a flowchart showing a process of calculating the error use rate Re.
Figure 8:
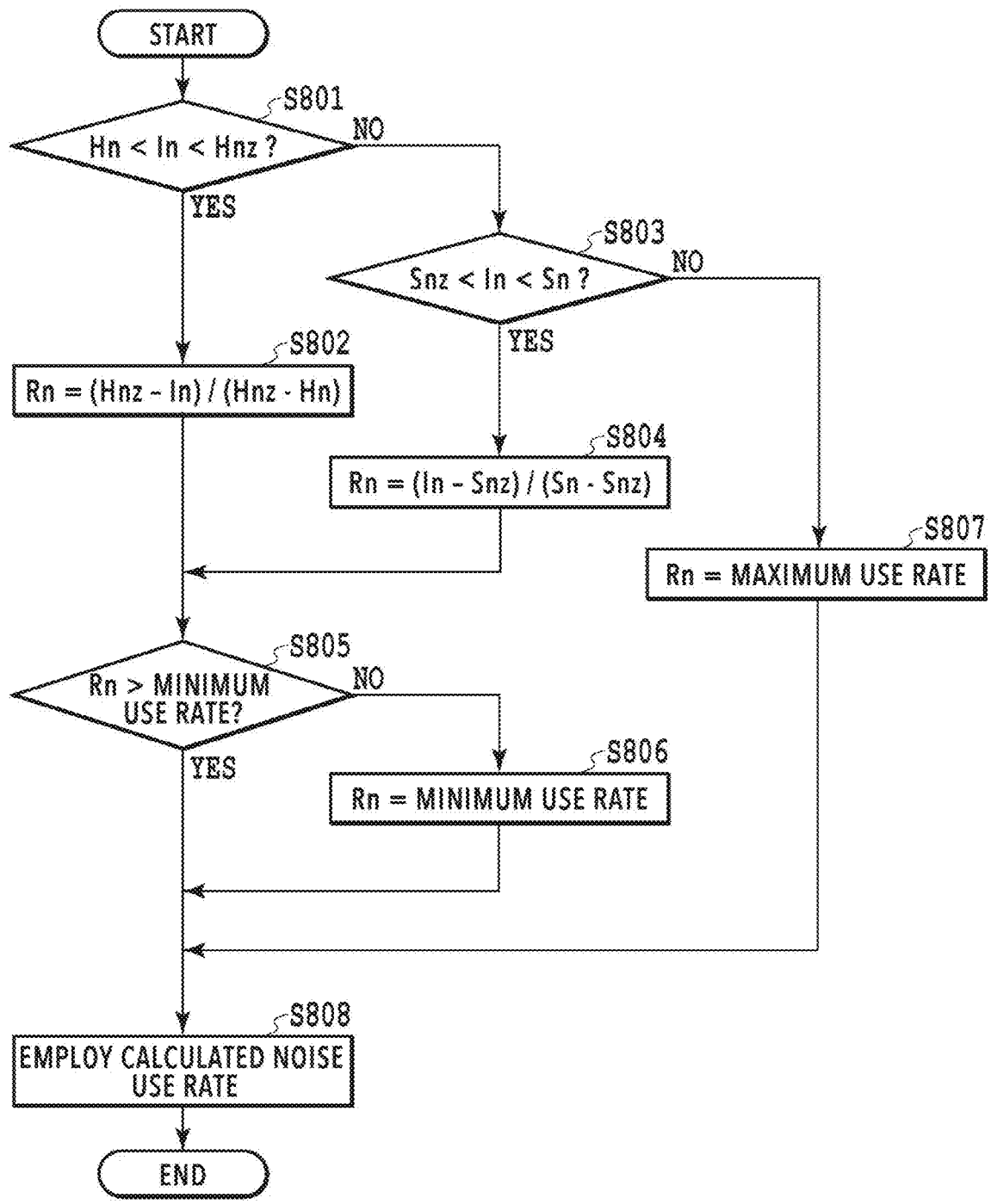
FIG. 8 is a flowchart showing a process of calculating the noise use rate Rn.

FIGS. 6 to 8 are diagrams illustrating the use rate determining process S402 in more detail. FIG. 6 shows an example of a graph and calculation equations correlating the error use rate Re and the noise use rate Rn with the density value.

In this embodiment, the image processing apparatus 11 calculates the error use rate Re and the noise use rate Rn based on a function that continuously changes according to the density value in a range equal to or more than a minimum input value MinIn, which is 0, and equal to or less than a maximum input value MaxIn. The maximum input value MaxIn and the minimum input value MinIn are, for example, the maximum value and the minimum value in a range available for the density value, which is the input value, respectively.

In this function, the image processing apparatus 11 uses the following three values as references indicating density ranges in a highlighted part.

Highlight-side minimum error use rate density value Hes as an example of a third highlight reference value Highlight-side maximum noise use rate density value Hn as an example of a first highlight reference value Highlight-side maximum error use rate density value He as an example of a second highlight reference value Moreover, the image processing apparatus 11 uses the following three values as references indicating density ranges in a shadowed part.

Shadow-side maximum error use rate density value Se as an example of a first shadow reference value Shadow-side maximum noise use rate density value Sn as an example of a second shadow reference value Shadow-side minimum error use rate density value Ses as an example of a third shadow reference value The image processing apparatus 11 additionally uses a highlight-side 0% noise use rate density value Hnz, a shadow-side 0% noise use rate density value Snz, a first halftone reference value C1, and a second halftone reference value C2 as references indicating density ranges on both sides of the initial threshold value Th at the center of a halftone part.

These parameters are set to satisfy at least Hes≤Hn<He<Se<Sn≤Ses and Hn<Hnz<Snz<Sn. In this embodiment, these parameters are also set to satisfy the magnitude relationship shown in the graph, i.e., 0 (MinIn) <Hes≤Hn<He<C1<Hnz<Th<Snz<C2<Se<Sn≤Ses<MaxIn.

In the use rate determining process S402, the image processing apparatus 11 determines the error use rate Re and the noise use rate Rn through the use of the calculation equations shown below the graph in FIG. 6. Here, in a case where the noise use rate Rn calculated through the use of the corresponding equation is less than a predetermined lowest noise use rate RnMin, the image processing apparatus 11 sets the noise use rate Rn to the lowest noise use rate RnMin. In this way, the image processing apparatus 11 sets the noise use rate Rn to a value equal to or more than the lowest noise use rate RnMin regardless of the density value of the pixel.

The error use rate Re and the noise use rate Rn are each set to a value in the range of 0% to 100% (a value in the range of 0 to 1). In a case where the value of the calculation equation shown below the graph is equal to or more than 100%, the error use rate Re or the noise use rate Rn is set to 100%. In a case where the value is equal to or less than 0%, the error use rate Re or the noise use rate Rn is set to 0%.

The lowest noise use rate RnMin is set to a value more than 0 in advance, for example, at the time of making an adjustment during the setting of parameters or the like. It is possible, for example, that the lowest noise use rate RnMin is set to a value equal to or more than 0.1 (10%). It is preferable that the lowest noise use rate RnMin is set to be, for example, in the range of 0.1 to 0.2 (10% to 20%). As can be seen from the graph, in a case where the input value In is equal to the first halftone reference value C1 or the second halftone reference value C2, the noise use rate Rn calculated through the use of the calculation equation is equal to the lowest noise use rate RnMin.

With the above method, in a case where the input value In is, for example, equal to or more than the highlight-side maximum error use rate density value He and equal to or less than the shadow-side maximum error use rate density value Se, the image processing apparatus 11 sets the error use rate Re to 1 (100%). In a case where the input value In is, for example, equal to or less than the highlight-side minimum error use rate density value Hes, the image processing apparatus 11 sets the error use rate Re to 0. In a case where the input value In is equal to or more than the highlight-side minimum error use rate density value Hes and equal to or less than the highlight-side maximum error use rate density value He, the image processing apparatus 11 sets the error use rate Re to a value calculated by (In−Hes)/(He−Hes). In this way, in a case where the input value In is, for example, equal to or less than the highlight-side maximum error use rate density value He, the image processing apparatus 11 sets the error use rate Re to a value which is in the range of 0 to 1 (100%) and which is gradually decreased from 1 according to the difference between the highlight-side maximum error use rate density value He and the input value In.

In a case where the input value In is, for example, equal to or more than the shadow-side maximum error use rate density value Se and equal to or less than the shadow-side minimum error use rate density value Ses, the image processing apparatus 11 sets the error use rate Re to a value calculated by (Ses−In)/(Ses−Se). In a case where the input value In is equal to or more than the shadow-side minimum error use rate density value Ses, the image processing apparatus 11 sets the error use rate Re to 0. In this way, in a case where the input value In is, for example, equal to or more than the shadow-side maximum error use rate density value Se, the image processing apparatus 11 sets the error use rate Re to a value which is in the range of 0 to 1 (100%) and which is gradually decreased from 1 according to the difference between the input value In and the shadow-side maximum error use rate density value Se.

In this case, the error use rate Re from the highlighted part to the halftone part gradually increases, for example, from the highlight-side minimum error use rate density value Hes with respect to the input value In and reaches the maximum value at the highlight-side maximum error use rate density value He. The error use rate Re from the halftone part to the shadowed part gradually decreases from the shadow-side maximum error use rate density value Se with respect to the input value In and reaches the minimum value at the shadow-side minimum error use rate density value Ses.

In this way, the image processing apparatus 11, for example, sets the error use rate Re in a case where the input value In is a density value corresponding to the highlighted part or the shadowed part to a value which is less than the error use rate Re than in a case where the input value In is a density value corresponding to the halftone part. In this case, the error use rate Re is, for example, at a value of 0 (0%) at both ends of its density range, and changes so as to be at a value of 1 (100%) within texture-generated parts Hd and Sd, each of which is a density range in which the texture specific to the dither process will be generated. By employing this constitution, for example, it is possible to appropriately achieve a constitution in which the error use rate Re is mainly used for the halftone part.

In a case where, for example, the input value In is equal to or less than the highlight-side maximum noise use rate density value Hn or equal to or more than the shadow-side maximum noise use rate density value Sn, the image processing apparatus 11 sets the noise use rate Rn to 1 (100%). In a case where the input value In is equal to or more than the first halftone reference value C1 and equal to or less than the second halftone reference value C2, the image processing apparatus 11 sets the noise use rate Rn to the lowest noise use rate RnMin.

In a case where the input value In is, for example, equal to or more than the highlight-side maximum noise use rate density value Hn and equal to or less than the first halftone reference value C1, the image processing apparatus 11 sets the noise use rate Rn to a value equal to or more than the lowest noise use rate RnMin and equal to or less than to 1 (100%). The image processing apparatus 11 sets the noise use rate Rn to a value gradually decreased from 1 according to the difference between the input value In and the highlight-side maximum noise use rate density value Hn.

In a case where the input value In is, for example, equal to or more than the second halftone reference value C2 and equal to or less than the shadow-side maximum noise use rate density value Sn, the image processing apparatus 11 sets the noise use rate Rn to a value equal to or more than the lowest noise use rate RnMin and equal to or less than 1 (100%). The image processing apparatus 11 sets the noise use rate Rn to a value gradually increased from the lowest noise use rate RnMin according to the difference between the input value In and the second halftone reference value C2.

In this way, the image processing apparatus 11, for example, sets the noise use rate Rn in a case where the input value In is a density value corresponding to the highlighted part or the shadowed part to a value which is more than the noise use rate Rn in a case where the input value In is a density value corresponding to the halftone part. In this case, the noise use rate Rn has a value of 1 (100%), for example, in the highlighted part and the shadowed part and changes so as to gradually decrease toward the halftone part.

According to this embodiment, the noise use rate Rn is set high and the error use rate Re is set low in the highlighted part and the shadowed part, in which a dot delay tends to occur in a case where the influence of the error diffusion characteristic is strong, for example. Accordingly, for example, in the highlighted part and the shadowed part, the influence of the dither characteristic, which enables dots to be arranged in a scattered fashion, is large, thus making it possible to appropriately suppress the occurrence of the dot delay. That is, in a case where there are a first pixel value lighter (or darker) than an intermediate value and a second pixel value closer to the intermediate value than the first pixel value is, the error use rate for the first pixel value is lower than the error use rate for the second pixel value. In addition, there are such combinations of pixels that the noise use rate for the first pixel value is higher than the noise use rate for the second pixel value. As for the intermediate value, in a case where the input value is in the range of 0 to 255 as in this embodiment, 128, for example, which is the median of that range, is set as the intermediate value.

By performing the quantization process for the halftone part with the influence of the error diffusion characteristic increased, it is possible to obtain, for example, a more natural pseudo-gradation. Moreover, by, for example, setting the noise use rate Rn low and setting the error use rate Re high in the density ranges corresponding to the texture-generated parts, it is possible to make a change to the arrangement of dots. As a result, it is also possible to, for example, appropriately suppress the generation of the texture.

Further, by, for example, providing the lowest noise use rate RnMin so as not to set the noise use rate Rn to 0, it is possible to, for example, make the influence of the error diffusion characteristic large in the halftone part while also allowing the dither characteristic to impose slight influence in the halftone part. Moreover, it is possible to, for example, appropriately suppress the generation of a pattern noise.

The magnitude of influence of the dither characteristic and the magnitude of influence of the error diffusion characteristic are gradually changed based on the calculation equations for calculating the error use rate Re and the noise use rate Rn, for example. In this way, it is possible to appropriately suppress the generation of a boundary line at a switching part between an area where the dither characteristic is dominant and an area where the error diffusion characteristic is dominant. Accordingly, it is possible to smoothly switch the method of the quantization process.

Therefore, according to this embodiment, it is possible to appropriately set the error use rate Re and the noise use rate Rn for a pixel, for example, based on the density value of the pixel. Accordingly, it is possible to appropriately perform a quantization process making more appropriate use of the specialty of each of the error diffusion process and the dither process.

The processes of calculating the error use rate Re and the noise use rate Rn will be described in more detail below. FIG. 7 is a flowchart showing an example of the process of calculating the error use rate Re. Note that each step (referred to as "S~") in FIG. 7 is executed by the image processing apparatus 11, more specifically, the CPU of the image processing apparatus 11.

In the calculation of the error use rate Re, the image processing apparatus 11 firstly determines whether the input value In is in a range equal to or more than the highlight-side maximum error use rate density value He and equal to or less than the shadow-side maximum error use rate density value Se (S701). If determining that the input value In is in this range (Yes in S701), the image processing apparatus 11 sets the error use rate Re to 1 (100%), which is the maximum use rate (S702).

If determining that the input value In is not in the range (No in S701), the image processing apparatus 11 additionally determines whether the input value In is in a range equal to or more than the highlight-side minimum error use rate density value Hes and equal to or less than the highlight-side maximum error use rate density value He (S703). If determining that the input value In is in this range (Yes in S703), the image processing apparatus 11 sets the error use rate Re to a value calculated by Re=(In−Hes)/(He−Hes) (S704).

If determining in S703 that the input value In is not in the range (No in S703), the image processing apparatus 11 additionally makes a determination as below. Specifically, the image processing apparatus 11 determines whether the input value In is in a range equal to or more than the shadow-side maximum error use rate density value Se and equal to or less than the shadow-side minimum error use rate density value Ses (S705). If determining that the input value In is in this range (Yes in S705), the image processing apparatus 11 sets the error use rate Re to a value calculated by Re=(Ses−In)/(Ses−Se) (S706). If determining in S705 that the input value In is not in the range (No in S705), the image processing apparatus 11 sets the error use rate Re to 0 (0%) (S707).

The image processing apparatus 11 employs the error use rate Re set in S702, S704, S706, or S707 as the error use rate Re for the input value In (S708). According to this embodiment, it is possible to appropriately set the error use rate Re.

FIG. 8 is a flowchart showing an example of the process of calculating the noise use rate Rn. Note that each step (referred to as "S~") in FIG. 8 is executed by the image processing apparatus 11, more specifically, the CPU of the image processing apparatus 11.

In the calculation of the noise use rate Rn, the image processing apparatus 11 firstly determines whether the input value In is in a range which is more than the highlight-side maximum noise use rate density value Hn and less than the highlight-side 0% noise use rate density value Hnz (S801). If determining that the input value In is in this range (Yes in S801), the image processing apparatus 11 sets the noise use rate Rn to a value calculated by Rn=(Hnz−In)/(Hnz−Hn) (S802).

If determining that the input value In is not in the range (No in S801), the image processing apparatus 11 additionally determines whether the input value In is in a range which is more than the shadow-side 0% noise use rate density value Snz and less than the shadow-side maximum noise use rate density value Sn (S803). If determining that the input value In is in this range (Yes in S803), the image processing apparatus 11 sets the noise use rate Rn to a value calculated by Rn=(In−Snz)/(Sn−Snz) (S804).

After setting the noise use rate Rn to the calculated value in S802 or S804, the image processing apparatus 11 determines whether the set noise use rate Rn is greater than the lowest noise use rate RnMin, which is the minimum use rate (S805). If the noise use rate Rn is equal to or less than the lowest noise use rate RnMin (No in S805), the image processing apparatus 11 changes the value of the noise use rate Rn to the lowest noise use rate RnMin (S806) and proceeds to S808. If the noise use rate Rn is greater than the lowest noise use rate RnMin (Yes in S805), the image processing apparatus 11 proceeds to S808 without changing the value of the noise use rate Rn.

If determining in S803 that the input value In is not in the range mentioned above (No in S803), the image processing apparatus 11 sets the noise use rate Rn to 1 (100%), which is the maximum use rate (S807). Then, the image processing apparatus 11 employs the noise use rate Rn set in S802, S804, S806, or S807 as the noise use rate Rn for the input value In (S808). According to this embodiment, it is possible to appropriately set the noise use rate Rn.

<Quantization Executing Process>

Figure 9:
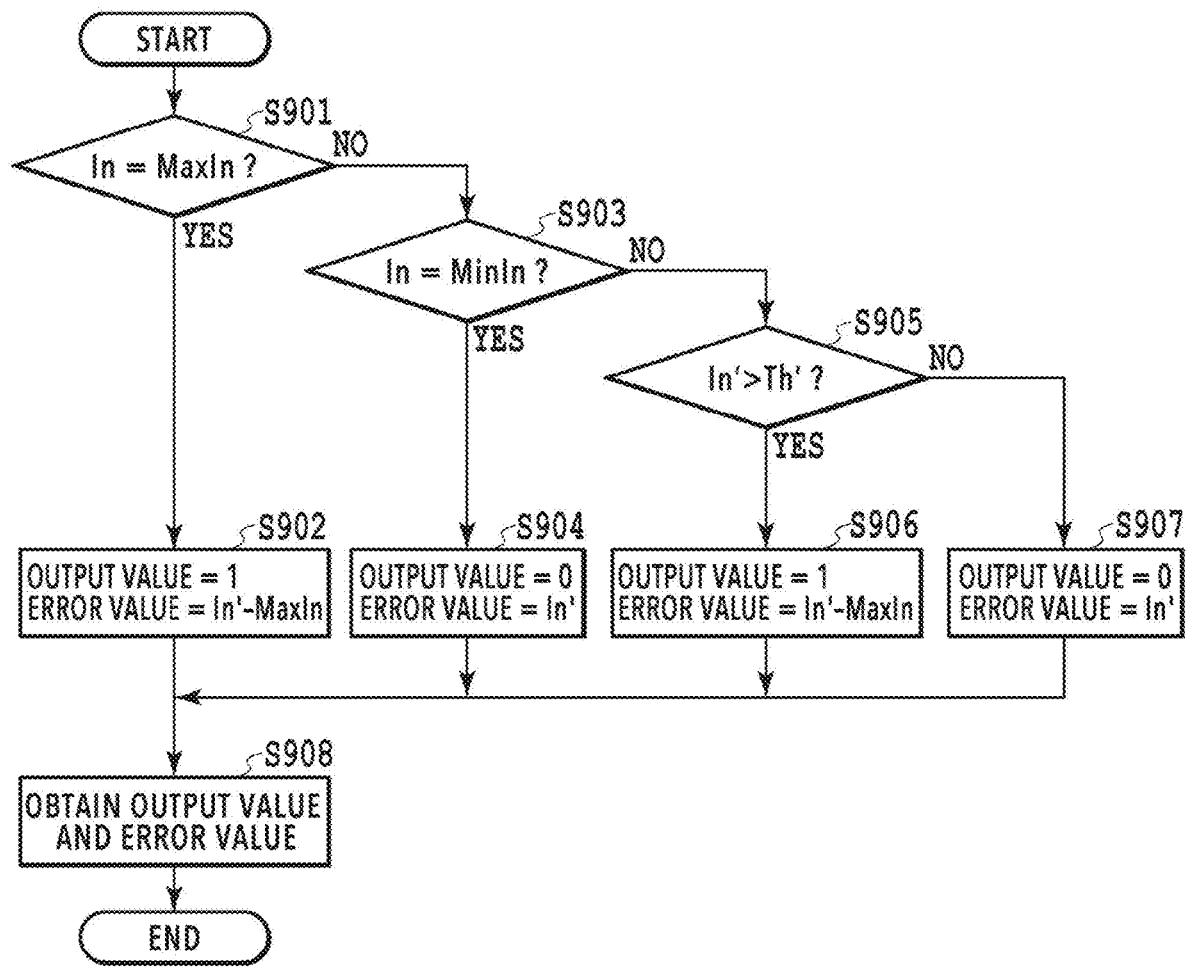
FIG. 9 is a flowchart showing an example of the operation of a quantization executing process S406.

FIG. 9 is a flowchart showing an example of the operation of the quantization executing process S406. Note that each step (referred to as "S~") in FIG. 9 is executed by the image processing apparatus 11, more specifically, the CPU of the image processing apparatus 11.

In the quantization executing process S406 in this embodiment, the image processing apparatus 11 firstly determines whether the input value In is equal to the maximum input value MaxIn (maximum value determining process S901). If determining that the input value In is equal to the maximum input value MaxIn (Yes in S901), the image processing apparatus 11 sets the output value indicating the quantization result to 1 (S902). This value of 1 is an example of the value to be output in a case where the input value In is more than the threshold value Th. In addition to the setting of this output value, the image processing apparatus 11 also sets the error value to be used in the subsequent error adding process S407 to In'—MaxIn, which is the difference between the error-corrected input value In' and the maximum input value MaxIn.

If determining in S901 that the input value In is not equal to the maximum input value MaxIn (No in S901), the image processing apparatus 11 additionally determines whether the input value In is equal to the minimum input value MinIn (minimum value determining process S903). If determining that the input value In is equal to the minimum input value MinIn (Yes in S903), the image processing apparatus 11 sets the output value to 0 (S904). This value of 0 is an example of the value to be output in a case where the input value In is less than the threshold value Th. In addition to the setting of this output value, the image processing apparatus 11 also sets the error value to the error-corrected input value In'.

If determining in S903 that the input value In is not equal to the minimum input value MinIn (No in S903), the image processing apparatus 11 determines whether the error-corrected input value In' is more than the noise-corrected threshold value Th' (S905). If determining that the error-corrected input value In' is more than the noise-corrected threshold value Th' (Yes in S905), the image processing apparatus 11 sets the output value to 1 and sets the error value to In'—MaxIn (S906). If determining in S905 that the error-corrected input value In' is equal to or less than the noise-corrected threshold value Th' (No in S905), the image processing apparatus 11 sets the output value to 0 and sets the error value to In' (S907).

Then, the image processing apparatus 11 obtains the output value and the error value set in S902, S904, S906, or S907 as the quantized value and the error value representing the result of the quantization executing process S406 (quantized value obtaining process S908). The image processing apparatus 11 also passes the obtained error value to the subsequent error adding process S407. According to this embodiment, it is possible to, for example, easily and appropriately set the output value and the error value.

<Error Distributing Process>

Figures 10A, 10B:
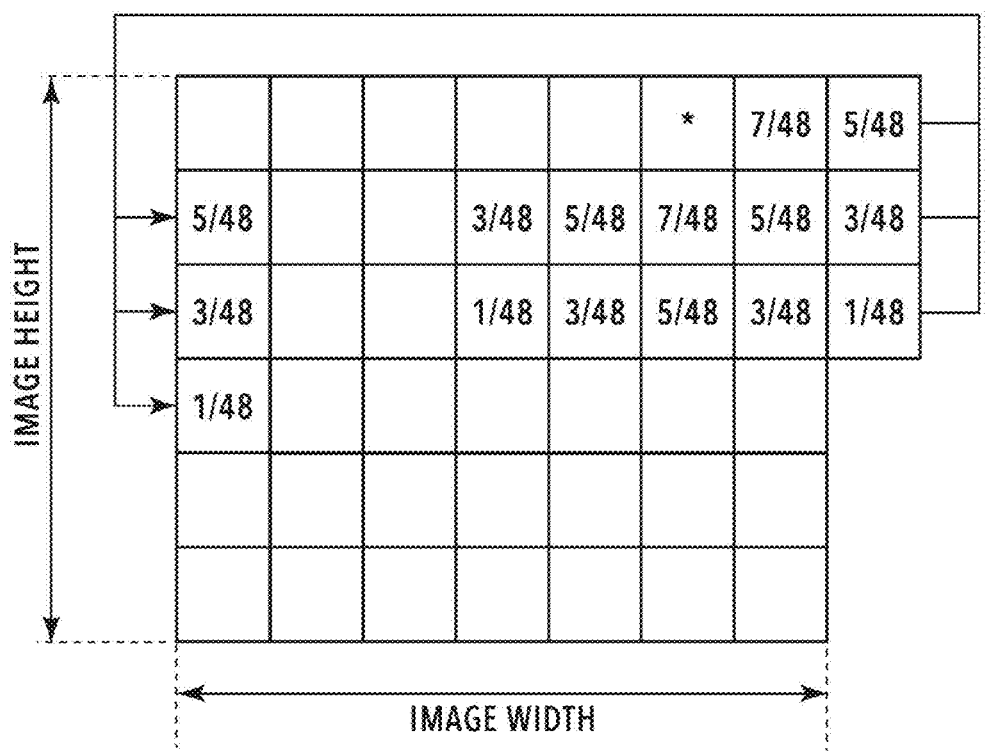
FIG. 10A is a diagram showing an example of diffusion filters used in the respective directions in bidirectional processing.
FIG. 10B is a diagram showing an example of an error distribution method.
Figure 11:
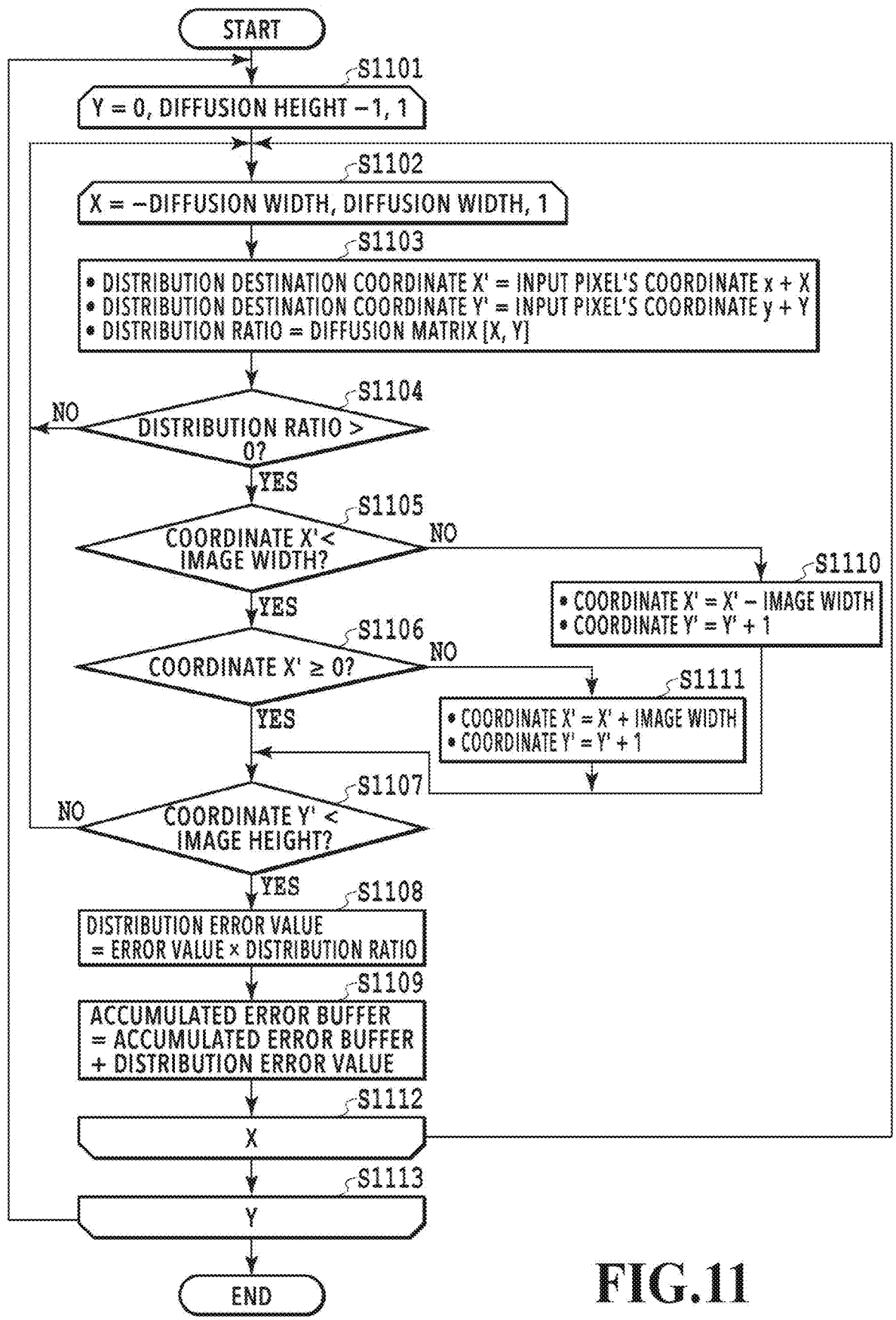
FIG. 11 is a flowchart of an error distributing process S408.

FIGS. 10A and 10B and FIG. 11 are diagrams illustrating the error distributing process S408 in more detail. FIGS. 10A and 10B show an example of the diffusion filters used in this embodiment. FIG. 10A shows an example of the diffusion filters used in the respective directions in bidirectional processing.

In this embodiment, each diffusion filter is, for example, a Jarvis, Judice & Ninke matrix. The shown filters are used respectively for a main scanning direction and a reverse main scanning direction, which are the directions in the bidirectional processing. In the shown filters, the position where the symbol * is indicated is the coordinates [0, 0] of the input value In (origin). The numerical values in each matrix represent distribution ratios at which an error is distributed to peripheral pixels.

FIG. 10B shows an example of the error distributing method. In the process of distributing an error to peripheral pixels, in a case where the coordinates of an error distribution destination is outside the image width, the image processing apparatus 11 changes the coordinates of the distribution destination to the coordinates of the head of the next line. Similar processing is also performed in a case where the coordinates on the opposite side is outside the range. In a case where there is no line for distribution destinations, the image processing apparatus 11 does not distribute the error. The image processing apparatus 11 does not distribute the error either in a case where the coordinates of the distribution destination represent a processed pixel.

FIG. 11 is a flowchart showing an example of the operation of the error distributing process S408. Note that each step (referred to as "S~") in FIG. 11 is executed by the image processing apparatus 11, more specifically, the CPU of the image processing apparatus 11. In the error distributing process S408, the image processing apparatus 11 executes a loop in which the Y coordinate is sequentially changed for each series of steps S1101 to S1113 in the flowchart. In this loop, the image processing apparatus 11 increments the value of Y by 1 from 0 up to a diffusion height of −1. The diffusion height means, for example, a height calculated as the diffusion matrix height. The diffusion matrix height means, for example, the number of rows in the matrix used as the diffusion filter.

The image processing apparatus 11 also executes a loop in which the X coordinate is sequentially changed for each series of steps S1102 to S1112. In this loop, the image processing apparatus 11 increments the value of X by 1 from a −diffusion width (=diffusion width×(−1)) up to the diffusion width. The diffusion width means, for example, a width calculated by (diffusion matrix width −1)÷2. The diffusion matrix width means, for example, the number of columns in the matrix used as the diffusion filter.

In these loops, the image processing apparatus 11 firstly sets coordinates (X', Y') of the distribution destination, as shown in the flowchart. Also, the image processing apparatus 11 sets the distribution ratio through the use of the diffusion filter (S1103). At this time, the image processing apparatus 11 firstly determines whether the distribution ratio is more than 0 (S1104) and, if the distribution ratio is equal to or less than 0 (No in S1104), proceeds to S1102 again without distributing the error.

If the distribution ratio is more than 0 (Yes in S1104), the image processing apparatus 11 proceeds to the processing from S1105. In this process, if the coordinate X' of the distribution destination is less than the image width (Yes in S1105), the coordinate X' is equal to or more than 0 (Yes in S1106), and the coordinate Y' of the distribution destination is less than the image height (Yes in S1107), the image processing apparatus 11 performs the processes of S1108 and S1109. Specifically, the image processing apparatus 11 sets the error value (quantization error) to be distributed to the product of the error value and the distribution ratio (S1108), and adds the resulting value to a distribution error value stored in an accumulated error buffer (S1109). In this way, the image processing apparatus 11 updates the accumulated error based on the generated quantization error.

If the coordinate X' is equal to or more than the image width in S1105 (No in S1105), the image processing apparatus 11 sets the coordinate X'=X'—image width and the coordinate Y'=Y'+1 (S1110) and proceeds to S1107. If the coordinate X' is less than 0 in S1106 (No in S1106), the image processing apparatus 11 sets the coordinate X'=X'+image width and the coordinate Y'=Y'+1 (S1111) and proceeds to S1107. If the coordinate Y' is equal to or more than the image height in S1107 (No in S1107), the image processing apparatus 11 proceeds to S1102 without distributing the error.

By performing the above operation, the image processing apparatus 11 integrates the quantization error with the value stored in the accumulated error buffer to thereby calculate an accumulated error. According to this embodiment, it is possible to appropriately distribute an error. Accordingly, it is possible to appropriately calculate an accumulated error.

In a case of performing only a typical error diffusion process, a problem such as a dot delay occurs, for example, in a highlighted part or a shadowed part. In a case of performing only a dither process, a problem such as texture specific to the dither process occurs, for example. This example involves switching from the dither process to the error diffusion process and vice versa, for example, between a highlighted part and a halftone part and between a halftone part and a shadowed part without performing a switching process that gradually changes the noise use rate and the error use rate as in this embodiment (FIG. 6, etc.). In a case of simply switching from the dither process to the error diffusion process and vice versa without performing an appropriate switching process as above, the switching causes a problem such as generation of a boundary line.

According to this embodiment, it is possible to, for example, appropriately suppress a dot delay in a highlighted part and a shadowed part. It is also possible to appropriately prevent the generation of texture, the generation of a boundary line due to switching, and the like in a halftone part. Hence, according to this embodiment, it is possible to more appropriately perform the quantization process.

In addition, a pixel not using the entire accumulated error can propagate the unused error to peripheral pixels. In this way, even in a case of an image of a high-frequency pattern, such as a hatching pattern, with a halftone value to be subjected to the error diffusion process, it is possible to maintain density as an area as compared to the conventional technology.

The first embodiment has been described above using a specific embodiment. However, the technical scope of the first embodiment is not limited to the scope described in the above embodiment. It is apparent to those skilled in the art that the above embodiment may be modified or improved in various forms. It is apparent from the description of the claims that the modified or improved embodiments are included in the technical scope of the first embodiment.

For example, in the above embodiment, a description has been given of a configuration in which an entire unused error is propagated to peripheral pixels. However, even with a configuration in which part of an unused error to be propagated is propagated to peripheral pixels, it is possible to maintain density as an area as compared to the conventional technology, which is the advantageous effect of the first embodiment. Thus, the unused error may be individually set with respect to the input value In like the error use rate Re and the noise use rate Rn shown in FIG. 6, or calculated by multiplying the error use rate Re by a positive constant less than 1.

Also, as for the quantization process in the above embodiment, a case where the number of tones after the quantization is two has been described. However, quantization by a similar method is applicable to processing in a case where the number of tones is three or more, for example. The case where the number of tones is three or more means, for example, a case where three or more dot sizes are used.

In this case, for example, quantization processes for the respective dot sizes are each performed using both a dither matrix noise and an accumulated error according to a noise use rate and an error use rate in an identical or similar manner to the case of using two tones. Then, the output results corresponding to the dots of the respective sizes are compared with one another, and the dot with the largest size is determined as the final output. In this way, it is possible to more appropriately perform the quantization process, for example, even in the case where the number of tones is three or more.

Second Embodiment

In the first embodiment, a configuration for remedying problems originating from a failure to propagate a quantization error has been described. In a second embodiment, a configuration for remedying problems originating from propagation of a quantization error due to the dither process will be described.

In the conventional example, in a case where the error use rate Re=100% and the noise use rate Rn=0%, the quantization error Q(x, y) resulting from the quantization is Th at maximum and —Th at minimum on condition that the threshold value Th is the median of density.

On the other hand, in a case where the error use rate Re=0% and the noise use rate Rn=100%, the quantization error Q(x, y) resulting from the quantization is approximately 2×Th at maximum and approximately −2×Th at minimum. As long as the same pixel value continues, the error use rate Re is 0% for the next pixel as well, so that this large quantization error will not actually be propagated. However, in a case where the density abruptly changes within the image, a quantization result=255 may be generated in a focused manner, for example, at a portion where the quantization error Q(x, y) of a pixel with the error use rate Re=0% propagates to a pixel with the error use rate Re=100%.

This tendency is more prominent in a case of implementing the remedy of the first embodiment. Thus, in the second embodiment, in a case where the error use rate Re is low, the error propagation to peripheral pixels is held low to reduce the focused generation of a quantization result=255 mentioned above.

Figure 12:
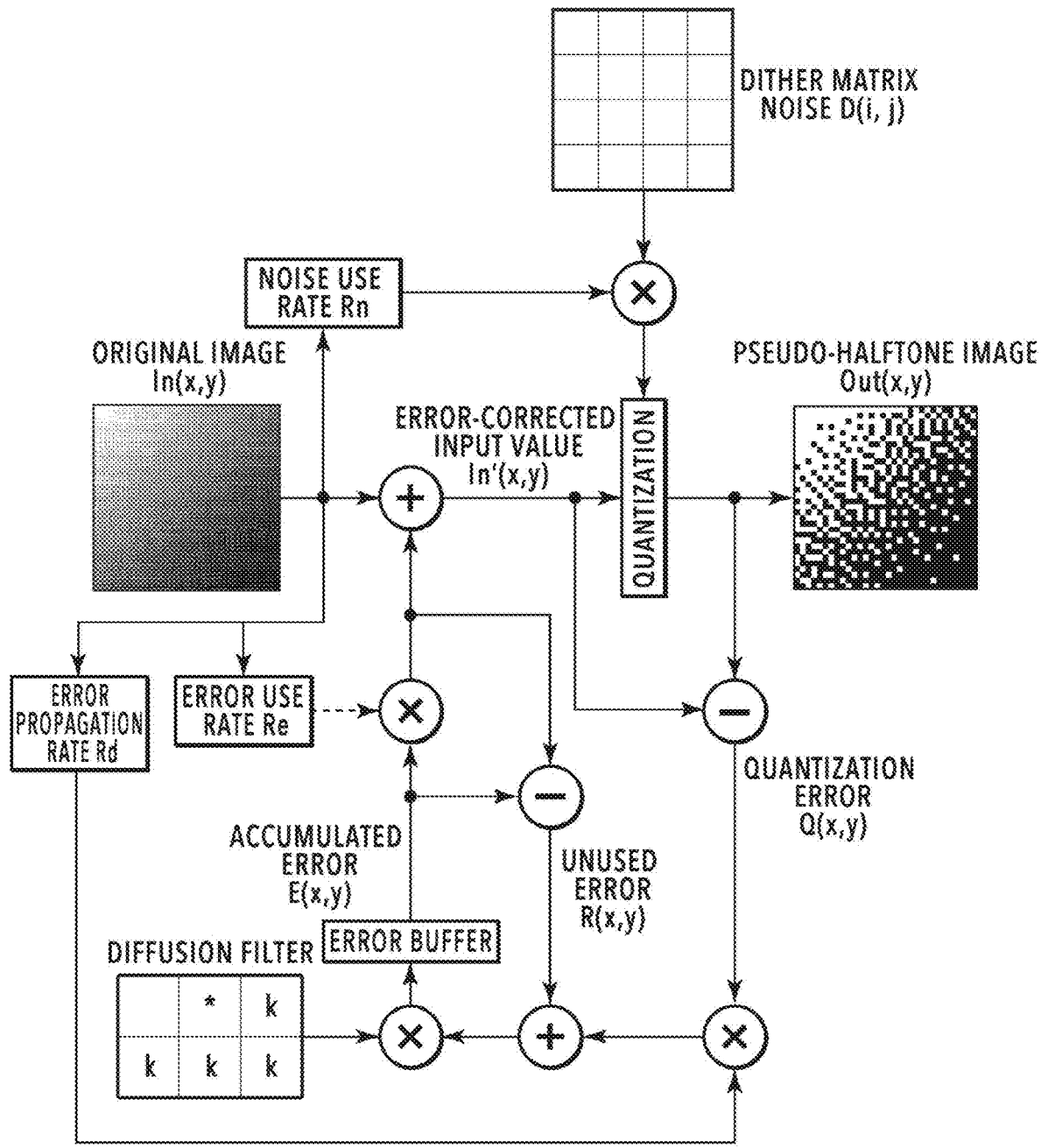
FIG. 12 is a diagram showing an overview of a quantization process.

FIG. 12 is a diagram showing an overview of the quantization process in the second embodiment. The difference from the first embodiment shown in FIG. 1B is the presence of "error propagation rate Rd". The other components are the same as those in FIG. 1B, and description thereof is therefore omitted.

Like "error use rate Re", "error propagation rate Rd" is set to a value in the range of 0 to 1 (0% to 100%) and, specifically, is calculated based on the density value In(x, y) of the pixel to be quantized. Here, "error propagation rate Rd" may be set to a substantially equal value to "error use rate Re".

The image processing apparatus 11 calculates a propagated quantization error Qd(x, y) by using the product of the quantization error Q(x, y) and the error propagation rate Rd.

Thereafter, the image processing apparatus 11 calculates an added error Q'(x, y) by adding up the unused error R(x, y) and the propagated quantization error Qd(x, y).

The subsequent processes are the same as those in FIG. 1B, and description thereof is therefore omitted.

Figure 13:
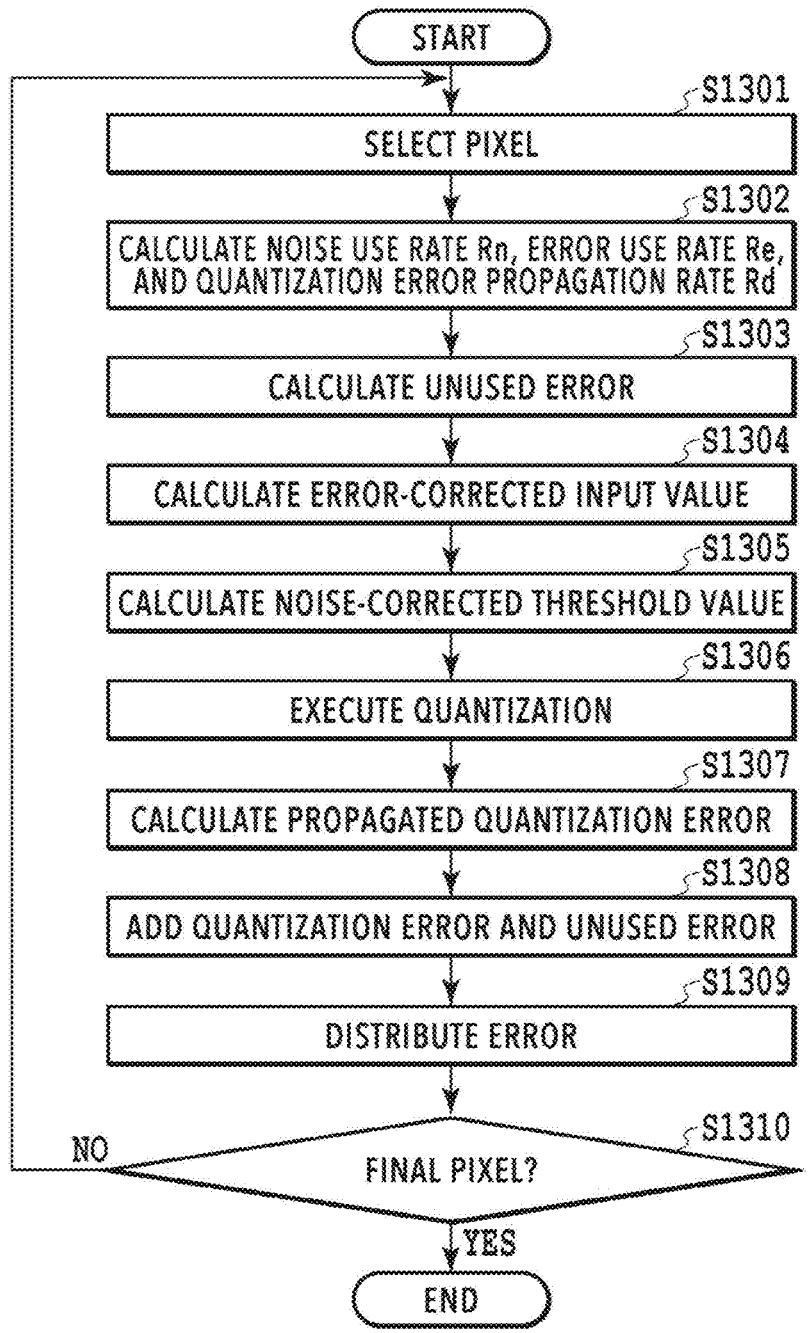
FIG. 13 is a flowchart of a quantization operation.

FIG. 13 is a flowchart showing an example of the quantization operation in the second embodiment. As in the first embodiment described using FIG. 4, the image processing apparatus 11 performs the following processes, for example, for each process color.

First of all, a pixel selecting process S1301 is the same as S401 in FIG. 4, and description thereof is therefore omitted.

Then, the image processing apparatus 11 calculates the noise use rate Rn, the error use rate Re, and the error propagation rate Rd for the selected pixel based on the density value In(x, y) of that pixel. As a result, the image processing apparatus 11 determines the noise use rate Rn, the error use rate Re, and the error propagation rate Rd to be used in the quantization of the pixel of interest (use rate determining process S1302).

Subsequently, the image processing apparatus 11 calculates the unused error R(x, y) in the accumulated error E(x, y), which will not be used in the quantization, through the use of the equation below (unused error calculating process S1303).

$$R(x,y)=E(x,y)\times(1-Re)$$

An error-corrected input value calculating process S1304, a noise-corrected threshold value calculating process S1305, and a quantization executing process S1306 are the same as the error-corrected input value calculating process S404, the noise-corrected threshold value calculating process S405, and the quantization executing process S406 in FIG. 4, respectively, and description thereof is therefore omitted.

Then, the image processing apparatus 11 calculates a propagation error Qa(x, y) by multiplying the quantization error Q(x, y) resulting from the quantization of the pixel of interest by the error propagation rate Rd (propagated quantization error calculating process S1307).

Then, the image processing apparatus 11 calculates the added error Q'(x, y) by adding up the propagated quantization error Qd(x, y) and the unused error R(x, y) (error adding process S1308).

A subsequent error distributing process S1309 and final pixel determining process S1310 are the same as the error distributing process S408 and the final pixel determining process S409 in FIG. 4, respectively, and description thereof is therefore omitted.

With the series of processes described above, it is possible to perform control such that "the error propagation rate Rd is high for pixels for which the error use rate Re is high, and the error propagation rate Rd is low for pixels for which the error use rate Re is low". This can reduce the focused generation of a quantization result=255 mentioned above.

The effect of reducing the focused generation of a quantization result=255 mentioned above by the error propagation rate Rd described in this embodiment is prominent owing to the propagation of an unused error described in the first embodiment, but the effect also occurs in the conventional example in the first place.

Figure 14:
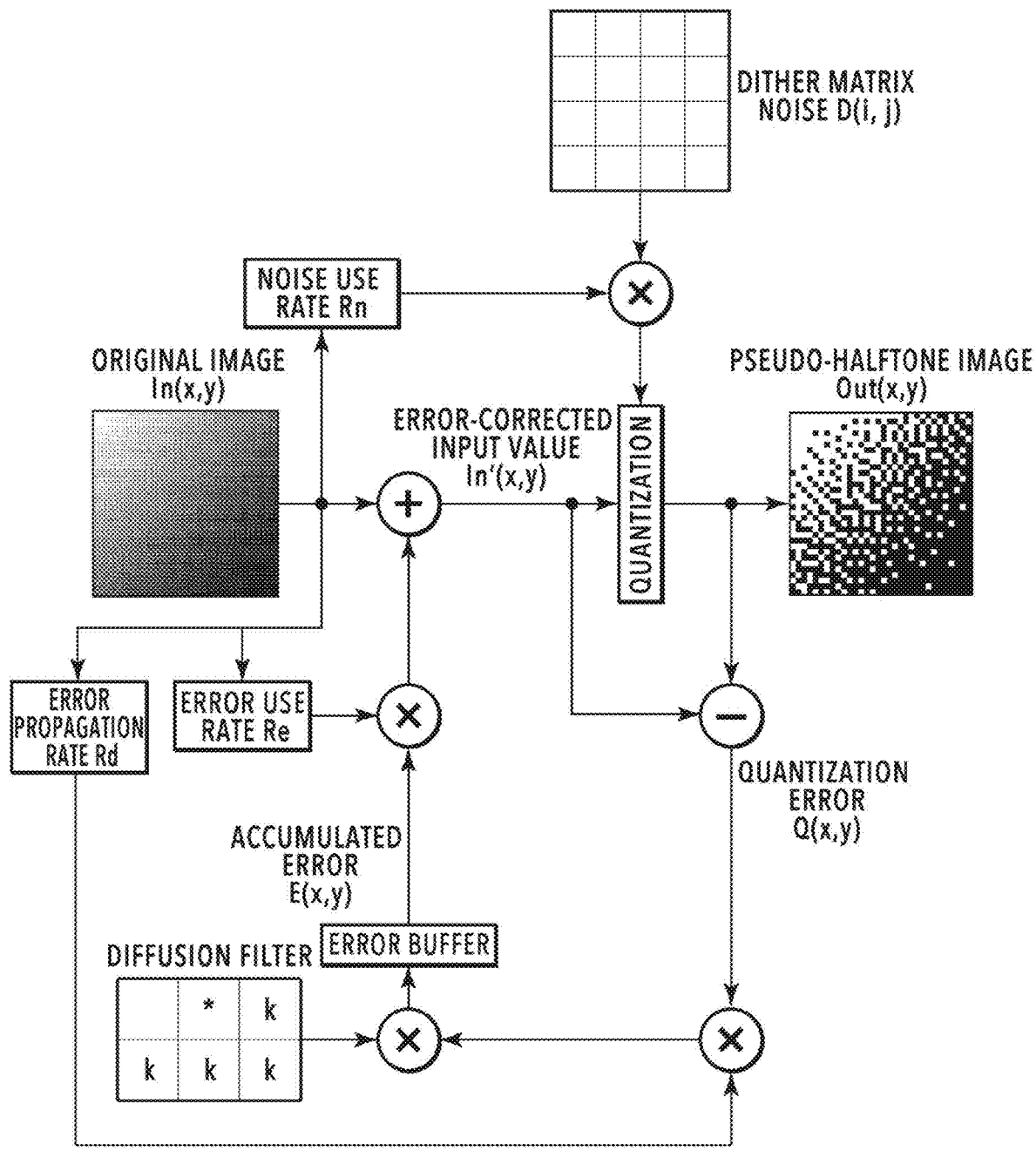
FIG. 14 is a diagram showing an overview of a quantization process.

FIG. 14 shows an example of improving only the effect by the error propagation rate Rd in the conventional example. As compared to FIG. 12, FIG. 14 simply does not have the component related to unused errors. Though not described in detail, an effect of reducing the focused generation of a quantization result=255 mentioned above can be achieved by setting the error propagation rate Rd and the error use rate Re to substantially the same value.

Third Embodiment

Problem in this Embodiment

With an image of a high-frequency pattern, such as a hatching pattern, with such a halftone value that the noise use rate and the error use rate vary within an area, there is a case where the image is processed by error diffusion but the degree of error propagation is low or no error propagation occurs depending on the error use rate. This may result in a failure to maintain density as an area.

In view of the above problem, an object of this embodiment is to maintain density as an area as compared to the conventional technology even in a case of using an image of a high-frequency pattern, such as a hatching pattern, with such a halftone value that the noise use rate and the error use rate vary within an area. In the following, description of contents similar to the foregoing embodiments is omitted as appropriate, and contents different from the foregoing embodiments will be mainly described.

<Overview of Quantization Process>

Figure 15:
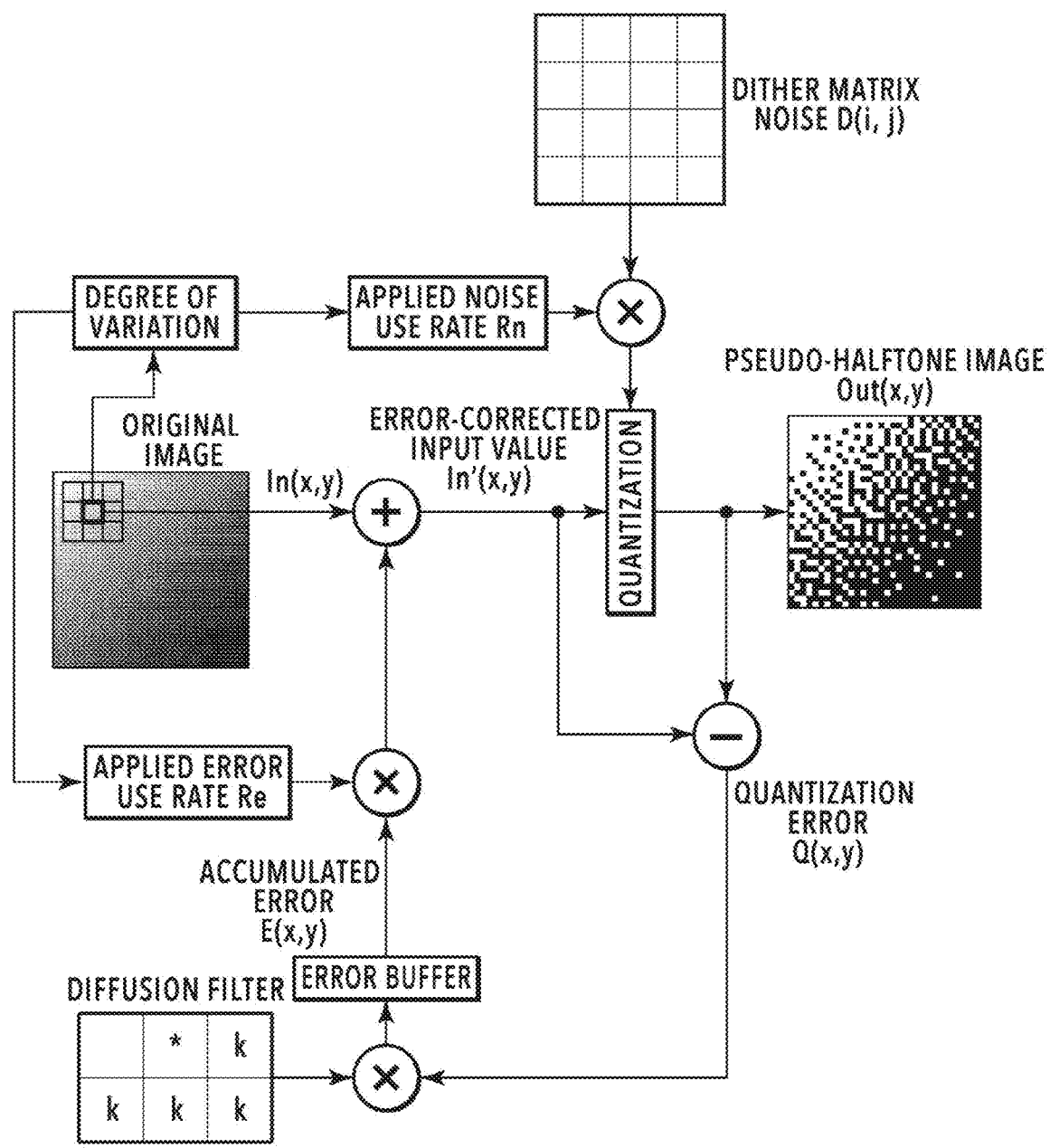
FIG. 15 is a diagram showing an overview of a quantization process.

An overview of the quantization process in this embodiment executed by the image processing apparatus 11 will be described. FIG. 15 is a diagram showing an overview of the quantization process performed by the image processing apparatus 11. The image processing apparatus 11 performs quantization on an original image for each process color to form a pseudo-halftone image, which is a halftone image. The quantization is a process of converting a density value In(x, y) at each set of coordinates in the original image into a quantized value out(x, y) at the same set of coordinates in the pseudo-halftone image.

In this embodiment, the image processing apparatus 11 performs the quantization through the use of a method using both a dither matrix noise D(i, j) and an accumulated error E(x, y) (hybrid error diffusion process). The image processing apparatus 11 additionally uses a noise use rate Rn and an error use rate Re each of which is set to a value in the range of 0 to 1 (0% to 100%) as parameters associated with the dither matrix noise D(i, j) and the accumulated error E(x, y).

The noise use rate Rn is a parameter indicating the degree of influence of the dither matrix noise D(i, j), which is a two-dimensional matrix, on the quantization process. The image processing apparatus 11 calculates the degree of variation in use rate in an area including the pixel to be quantized and peripheral pixels around it, and determines the noise use rate Rn to be applied to the pixel to be quantized based on the calculated degree of variation and the density value of the pixel to be quantized. The noise use rate to be applied to the quantization-target pixel will be referred to as "applied noise use rate". The image processing apparatus 11 performs the quantization by using the product of the dither matrix noise D(i, j) and the applied noise use rate Rn, instead of using the dither matrix noise D(i, j) as is. Thus, the image processing apparatus 11 uses the dither matrix noise D(i, j) according to the applied noise use rate Rn for the pixel to be quantized.

The error use rate Re is a parameter indicating the degree of influence of the accumulated error E(x, y) on the quantization process. The image processing apparatus 11 calculates the degree of variation in use rate in the area including the pixel to be quantized and the peripheral pixels around it, and determines the error use rate Re to be applied to the pixel to be quantized based on the calculated degree of variation and the density value of the pixel to be quantized. Note that the error use rate to be applied to the quantization-target pixel will be referred to as "applied error use rate". The image processing apparatus 11 calculates an error-corrected input value In'(x, y) of each pixel corresponding to its density value In(x, y) by using the product of the accumulated error E(x, y) and the applied error use rate Re, instead of using the accumulated error E(x, y) as is. The image processing apparatus 11 performs the quantization process by using the calculated error-corrected input value In'(x, y). Thus, the image processing apparatus 11 uses the accumulated error E(x, y) according to the applied error use rate Re for the pixel to be quantized. The quantization process will be described in more detail later.

According to this embodiment, for example, it is possible to impose influence of the spatial frequency characteristic of the dither process (dither characteristic) on the spatial frequency characteristic of the error diffusion process (error diffusion characteristic). In this way, the quantization can be performed, for example, through the use of a method in which the dither characteristic is combined into the error diffusion characteristic. Moreover, in this case, unlike the case of, for example, simply switching between the dither process and the error diffusion process or the like, it is possible to appropriately prevent the generation of a boundary line due to the switching of the processes and the like. In addition, the degree of variation in use rate in an area including the pixel to be quantized and the peripheral pixels around it is calculated. In other words, the degree of variation is calculated using at least one of the error use rate or the noise use rate. The noise use rate and the error use rate to be applied to the pixel to be quantized are determined based on the calculated degree of variation and the density value of the pixel to be quantized. In this way, it is possible to apply a noise use rate and an error use rate taking into account the maintaining of the density in the area. Accordingly, even in a case of an image of a high-frequency pattern, such as a hatching pattern, with such a halftone value that the noise use rate and the error use rate vary within an area, it is possible to maintain density as an area as compared to the conventional technology.

Thus, according to this embodiment, it is possible to perform, for example, a quantization process which makes appropriate use of each process' specialty while also avoiding the problem of failing to maintain density in the quantization result obtained by using the processes together. As a result, for example, it is possible to appropriately solve various printing problems originating from the quantization process, and thus perform the quantization process through the use of a more appropriate method.

The dither matrix noise D(i, j) is a two-dimensional matrix and is, for example, a value designated by a preset dither matrix. The dither matrix noise D(i, j) may be identical or similar to the dither matrix noise used in a conventional dither process, for example. It is preferable that, for example, a noise with a blue noise characteristic be used as the dither matrix noise D(i, j). It is also preferable that the image processing apparatus 11 change the dither matrix to be used for each process color.

The accumulated error E(x, y) is an accumulated value obtained by accumulating quantization error values as the errors originating from the quantization of the peripheral pixels, i.e., quantization errors Q(x, y), and is calculated using a preset diffusion filter (diffusion matrix). The calculated accumulated error E(x, y) is stored, for example, in an error buffer. The image processing apparatus 11 calculates the accumulated error E(x, y) through the use of a method identical or similar to a method of calculating an accumulated error used in a conventional error diffusion process, for example.

<Quantization Process>

Figure 16:
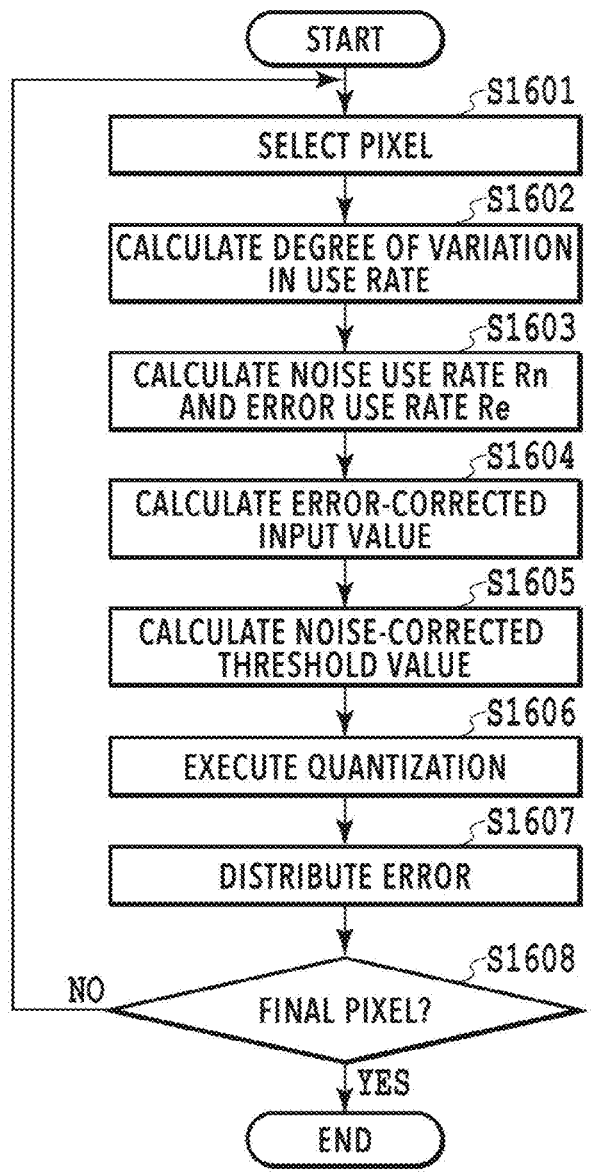
FIG. 16 is a flowchart of a quantization operation.

The quantization process executed by the image processing apparatus 11 in this embodiment will be described below. The quantization process is a process of executing quantization on each pixel in an original image. FIG. 16 is a flowchart showing an example of the quantization operation. The image processing apparatus 11 performs the following processes, for example, for each process color.

In the quantization operation, the image processing apparatus 11 in this embodiment firstly selects a pixel of interest which is a pixel to be quantized from the original image (pixel selecting process S1601). Then, the image processing apparatus 11 calculates the degree of variation in use rate in an area including the pixel to be quantized (pixel of interest) and the peripheral pixels around it (variation degree calculating process S1602). While the "degree of variation in use rate" mentioned here is calculated using the noise use rate, it may be calculated using both the noise use rate and the error use rate (Details will be described later. See FIG. 18 and FIGS. 19A to 19D).

Then, the image processing apparatus 11 determines the noise use rate Rn and the error use rate Re to be applied to the pixel of interest based on the degree of variation calculated in S1602 and the density value of the pixel to be quantized, which is its pixel value. As described above, in this embodiment, the image processing apparatus 11 determines the noise use rate Rn and the error use rate Re to be applied to the pixel of interest by using the degree of variation (use rate determining process S1603). Specifically, the image processing apparatus 11 determines the noise use rate Rn for the pixel of interest by using the degree of variation in an area centered at the pixel of interest and similarly determines the error use rate Re for the pixel of interest by using the degree of variation.

Subsequently, the image processing apparatus 11 calculates the error-corrected input value In'(x, y), which is a density value after performing correction with the accumulated error E(x, y) (error-corrected input value calculating process S1604). In this process, the image processing apparatus 11, for example, adds an applied error value, which is the product of the error use rate Re for the pixel selected in the pixel selecting process S1601 and the accumulated error E(x, y), to the density value In(x, y) of that pixel. The image processing apparatus 11 calculates the value after the addition as the error-corrected input value In'(x, y), which is an accumulated pixel value.

The image processing apparatus 11 additionally calculates a noise-corrected threshold value Th', which is a threshold value reflecting the dither matrix noise D(i, j), as a threshold value to be used in the quantization (noise-corrected threshold value calculating process S1605). In this process, the image processing apparatus 11, for example, adds the product of the noise use rate Rn for the pixel selected in the pixel selecting process S1601 and the dither matrix noise D(i, j) to a preset initial threshold value Th. The image processing apparatus 11 calculates the value after the addition as the noise-corrected threshold value Th', which is a quantization threshold value.

Then, the image processing apparatus 11 compares the calculated noise-corrected threshold value Th' and error-corrected input value In'(x, y) with each other. By doing so, the image processing apparatus 11 performs quantization on the pixel selected in the pixel selecting process S1601 and thereby calculates a quantized value (quantization executing process S1606).

Subsequently, the image processing apparatus 11 diffuses the quantization error Q(x, y) resulting from the quantization of the pixel to peripheral pixels through the use of the diffusion filter (error distributing process S1607). Accordingly, the image processing apparatus 11 integrates the quantization error Q(x, y) with the values in the diffusion filter corresponding to the distribution destination coordinates of the peripheral pixels and updates the values of the accumulated errors E(x, y) for the peripheral pixels.

After the error distributing process S1607, the image processing apparatus 11 determines whether the pixel subjected to the quantization is the final pixel in the original image (final pixel determining process S1608). If determining that the pixel is the final pixel (Yes in S1608), the image processing apparatus 11 ends the quantization process of the original image. If determining that the pixel is not the final pixel (No in S1608), the image processing apparatus 11 proceeds to the pixel selecting process S1601 again and selects the next pixel. In this way, the image processing apparatus 11 sequentially selects the pixels to be quantized in the pixel selecting process S1601. Moreover, by performing the processes subsequent to the pixel selecting process S1601 on the pixels sequentially selected, the image processing apparatus 11 executes the quantization on those pixels.

According to this embodiment, for example, by adding the accumulated error E(x, y) multiplied by the error use rate Re to the density value In(x, y), it is possible to appropriately adjust the degree of influence of the error diffusion characteristic. By adding the dither matrix noise D(i, j) multiplied by the noise use rate Rn to the initial threshold value Th, it is possible to appropriately adjust the degree of influence of the dither characteristic.

In this way, it is possible to appropriately set the degrees of influence of the error diffusion characteristic and the dither characteristic, for example, based on the density value In(x, y) and the density values of the peripheral pixels, which are input values, so as to maintain the density in the area. It is also possible to perform a quantization process which makes appropriate use of the specialty of each of the error diffusion process and the dither process. Hereinafter, the processes in the quantization operation will be described in more detail.

<Pixel Selecting Process>

The pixel selecting process in this embodiment (S1601) is similar to that in the first embodiment (see FIG. 5).

<Use Rate Determining Process>

The use rate determining process in this embodiment (S1603) is similar to that in the first embodiment (see FIGS. 6 to 8). In this embodiment, FIGS. 6 to 8 are diagrams illustrating the use rate determining process S1603 in more detail.

In this embodiment, FIG. 6 shows an example of a graph and calculation equations correlating the error use rate Re and the noise use rate Rn in a case where the degree of variation is the minimum value with the density value. FIG. 7 is a flowchart showing an example of the process of calculating the error use rate Re in the case where the degree of variation is the minimum value. FIG. 8 is a flowchart showing an example of the process of calculating the noise use rate Rn in the case where the degree of variation is the minimum value. Details of the degree of variation will be described later.

<Quantization Executing Process>

The quantization executing process in this embodiment (S1606) is basically similar to that in the first embodiment (see FIG. 9). Thus, only the difference from the first embodiment will be described below.

In the quantization executing process S1606 in this embodiment, the image processing apparatus 11 firstly determines whether the input value In is equal to the maximum input value MaxIn (maximum value determining process S901). If determining that the input value In is equal to the maximum input value MaxIn (Yes in S901), the image processing apparatus 11 sets the output value indicating the quantization result to 1 (S902). This value of 1 is an example of the value to be output in a case where the input value In is more than the threshold value Th. In addition to the setting of this output value, the image processing apparatus 11 also sets the error value to be used in the subsequent error distributing process S1607 to In'—MaxIn, which is the difference between the error-corrected input value In' and the maximum input value MaxIn.

The image processing apparatus 11 obtains the output value and the error value set in S902, S904, S906, or S907 as the quantized value and the error value representing the result of the quantization executing process S1606 (quantized value obtaining process S908). The image processing apparatus 11 also passes the obtained error value to the subsequent error distributing process S1607. According to this embodiment, it is possible to, for example, easily and appropriately set the output value and the error value.

<Details of Degree of Variation>

A method of calculating the degree of variation in use rate in an area including a pixel to be quantized and peripheral pixels around it will be specifically described. In this embodiment, the degree of variation in use rate is calculated from the density values of the 3×3 pixels in the area including the pixel to be quantized and the first peripheral pixels around it, and the noise use rate Rn and the error use rate Re to be applied to the pixel to be quantized are determined based on the degree of variation and the density value of the pixel to be quantized.

Figure 18:
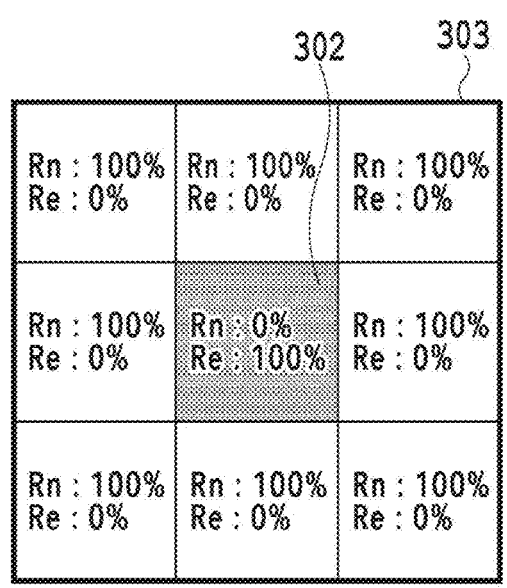
FIG. 18 is a diagram showing a result of calculation of an applied noise use rate Rn and an applied error use rate Re for a pixel to be quantized.
Figure 19A:
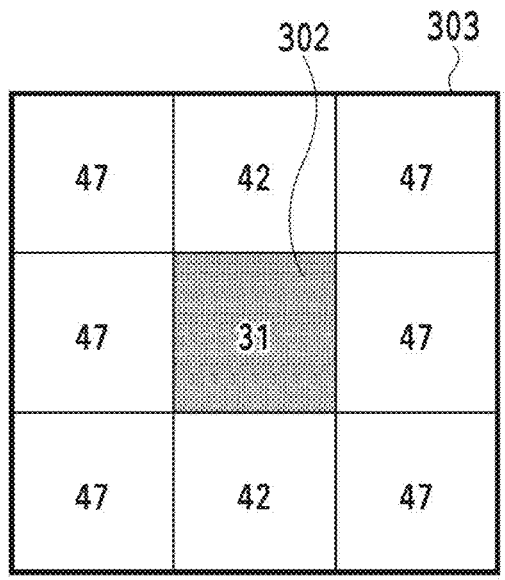
FIGS. 19A to 19D are diagrams showing results of calculation of the degree of variation.

A 3×3-pixel area 303 indicated by the bold line in FIG. 3A is an area for calculating the degree of variation in use rate in this embodiment in a case where the quantization-target pixel is the pixel 302 in FIG. 3A, and includes the quantization-target pixel and peripheral pixels around it. In this example, a standard deviation is calculated as the degree of variation from the error use rate for each pixel in the area 303. Firstly, the error use rate Re for each pixel in the area 303 is calculated through the use of the above-described method shown in FIG. 6. FIG. 18 is a diagram showing a calculation result of the use rates of each pixel among the 3×3 pixels, and indicates the noise use rate Rn (0% to 100%) in addition to the error use rate Re (0% to 100%). Then, a standard deviation is calculated from the error use rate Re for each pixel in the area 303. FIG. 19A shows the calculated standard deviation. As shown in FIG. 19A, the standard deviation for the pixel 302 to be quantized is 31 (in this embodiment, the calculation results in the following are results rounded to the nearest integer). FIGS. 19A to 19D indicate the values of the standard deviation in cases where the peripheral pixels around the pixel 302 are pixels to be quantized.

Figure 17A:
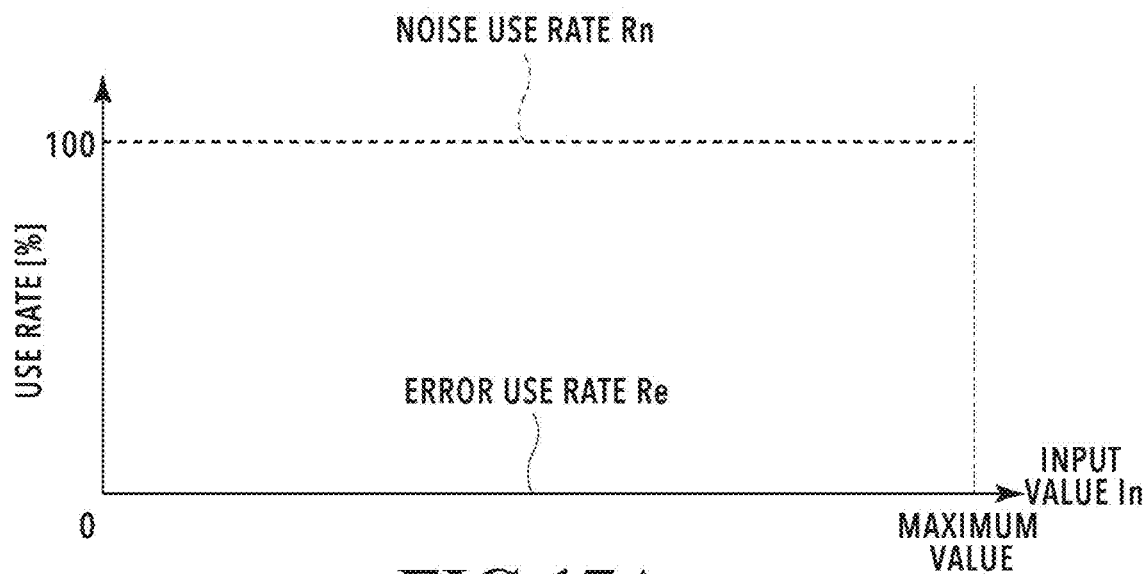
FIGS. 17A and 17B are diagrams showing an error use rate Re and a noise use rate Rn in a case where the degree of variation is the maximum value.
Figure 17B:
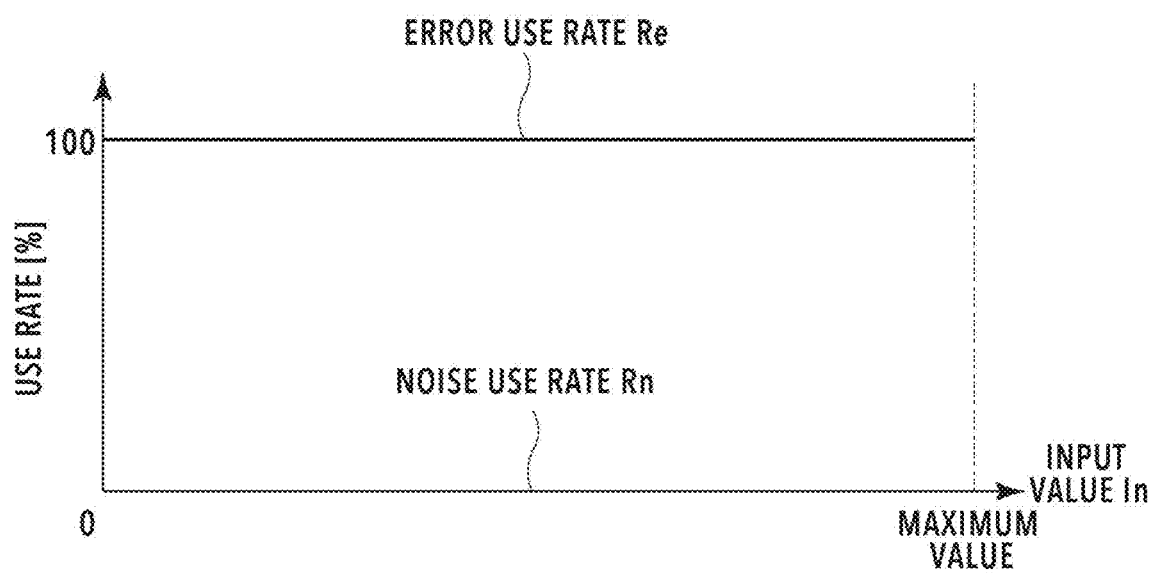

Then, the noise use rate Rn and the error use rate Re to be applied to the pixel to be quantized are determined based on the degree of variation and the density value of the pixel to be quantized. In this example, in a case where the degree of variation is the minimum value, use rates are applied which are obtained by changing the noise use rate Rn and the error use rate Re according to the density value, which is the input value, as shown in FIG. 6. On the other hand, in a case where the degree of variation is the maximum value, single (uniform) use rates are applied as shown in FIGS. 17A and 17B regardless of the density value. Specifically, as shown in FIG. 17A, 100% and 0% are used respectively as the noise use rate Rn and the error use rate Re corresponding to the input value, which is the density value. Also, as shown in FIG. 17B, 0% and 100% are used respectively as the noise use rate Rn and the error use rate Re corresponding to the input value, which is the density value. Thus, FIGS. 17A and 17B show relationships between the input value and the use rates. In this embodiment, as long as the use rates are single use rates, the use rates in any one of FIGS. 17A and 17B may be used, but the use rates in FIG. 17A are used in a case where the degree of variation is the maximum value. Now, a description will be given of an example of calculating the use rates in a case where the degree of variation is an intermediate value by a calculation using the use rates in a case where the degree of variation is the maximum value and the use rates in a case where the degree of variation is the minimum value. Note that the concept of the present disclosure is not limited to this example and information on a noise use rate and an error use rate corresponding to a density value may be held for each degree of variation in a table or in the form of a calculation equation, in which case the use rates are calculated from that information.

In this embodiment, the density value of the pixel 302 to be quantized is 125. Thus, in this embodiment, with the minimum value of the standard deviation set to 0, the noise use rate Rn and the error use rate Re for 0 are 0% and 100%, respectively, in a case where the density value is 125 based on the above calculation method. On the other hand, in this embodiment, with the maximum value of the standard deviation set to 50, the noise use rate Rn and the error use rate Re for 50 are 100% and 0%, respectively, in a case where the density value is 125, as shown in FIGS. 17A and 17B. Since the standard deviation is 31 for the pixel 302 in this embodiment, the noise use rate Rn is 62% (=0+(100−0)×(31−0)÷(50−0)) and the error use rate Re is 38% (=100+(0−100)×(31−0)÷(50−0)).

In the conventional technology, the noise use rate and the error use rate to be applied in the quantization of the pixel 302 in FIG. 3 are 0% and 100%, respectively. By applying the method of this embodiment, the noise use rate and the error use rate are 62% and 38%, respectively. Since the value of the dither matrix for the pixel 302 is −64 and the initial threshold value is 128, the noise-corrected threshold value is 88 (=−64×0.62+128). As a result, the input value of 125 and the threshold value of 88 are compared with each other. Since the input value is more than the threshold value, the quantization result is 255.

As described above, the lower the degree of variation in an area, the closer the applied use rates are to the use rates shown in FIG. 6. In this way, it is possible to obtain a quantization result that can appropriately suppress the generation or occurrence of texture, a dot delay, a pattern noise, and the like. On the other hand, the higher the degree of variation in an area, the closer the applied use rates are to the uniform use rates shown in FIGS. 17A and 17B. In this way, it is possible to obtain a quantization result in which the density in the area is maintained. As a result, it is possible to obtain a quantization result in which the density in the area is maintained as compared to the conventional technology as shown Reference sign (c) of FIG. 2 and FIG. 3D.

That is, in a case where the degree of variation is smallest and there are a first pixel value lighter (or darker) than an intermediate value and a second pixel value closer to the intermediate value than the first pixel value is, the error use rate for the first pixel value is lower than the error use rate for the second pixel value. In addition, there are such combinations of pixels that the noise use rate for the first pixel value is higher than the noise use rate for the second pixel value. On the other hand, in a case where the degree of variation is largest, the average error use rate in a range available for the pixel value and the two-dimensional matrix value use rate in the range available for the pixel value are respectively higher and lower than those in the case where the degree of variation is smallest, or the average error use rate in the range available for the pixel value and the two-dimensional matrix value use rate in the range available for the pixel value are respectively lower and higher. As for the intermediate value, in a case where the input value is in the range of 0 to 255 as in this embodiment, 128, for example, which is the median of that range, is set as the intermediate value.

Figure 19B:
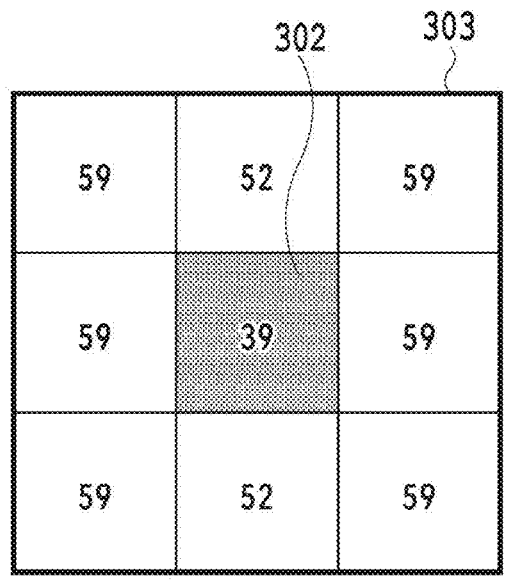

In this embodiment, the degree of variation is calculated with the error use rate. Alternatively, the degree of variation may be calculated by using only the noise use rate or using both the noise use rate and the error use rate while taking into account the noise use rate and the error use rate with respect to the density value shown in FIG. 6. Also, since the error use rate and the noise use rate are determined based on the density value, which is the input value, as shown in FIG. 6, the degree of variation may be calculated using the density value, instead of the use rate(s). FIG. 19B shows the result of deriving the standard deviation using the density value instead of the error use rate. In the case of calculating the degree of variation by using the density value, the density difference with which the variation in use rate is maximum is set to 128, and the maximum value and the minimum value of the standard deviation are set to 64 and 0, respectively. That is, the use rates in FIGS. 17A and 17B are applied in a case where the standard deviation is any value in the range of 64 to 128. Since the standard deviation is 39 for the pixel 302 in this embodiment, the noise use rate Rn is 61% (=0+(100−0)×(39−0)÷(64−0)) and the error use rate Re is 38% (=100+(0−100)×(39−0)÷(64−0)). Since the value of the dither matrix for the pixel 302 is −64 and the initial threshold value is 128, the noise-corrected threshold value is 89 (=−64×0.61+128). As a result, the input value of 125 and the threshold value of 89 are compared with each other. Since the input value is more than the threshold value, the quantization result is 255. In this embodiment, a standard deviation is calculated as the degree of variation, but the degree of variation does not have to be limited to this as long as a degree of variation within the area can be evaluated. In any case, it is possible to calculate a degree of variation taking into account the variation in use rate within the area.

<Error Distributing Process>

The error distributing process in this embodiment is similar to that in the first embodiment, and description thereof is therefore omitted (see FIGS. 10A and 10B and FIG. 11).

Advantageous Effects of this Embodiment

According to this embodiment, it is possible to, for example, appropriately suppress a dot delay in a highlighted part and a shadowed part. It is also possible to appropriately prevent the generation of texture, the generation of a boundary line due to switching, and the like in a halftone part. Hence, according to this embodiment, it is possible to more appropriately perform the quantization process.

In addition, in this embodiment, the degree of variation is calculated from a use rate(s) in an area including the pixel to be quantized and peripheral pixels around it. The noise use rate and the error use rate to be applied to the pixel to be quantized are determined based on the degree of variation and the density value of the pixel to be quantized. In this way, it is possible to apply a noise use rate and an error use rate taking into account the maintaining of the density in the area. Accordingly, even in a case of an image of a high-frequency pattern, such as a hatching pattern, with such a halftone value that the noise use rate and the error use rate vary within an area, it is possible to maintain density as an area as compared to the conventional technology.

Fourth Embodiment

In a fourth embodiment, a description will be given of an example of calculating the degree of difference in use rate between the pixel to be quantized and the peripheral pixels around it as the degree of variation in the variation degree calculating process S1602 in FIG. 16 by using the filter in FIG. 3B. While the degree of variation is calculated using a use rate in the third embodiment, it is calculated using the density value in the fourth embodiment. Specifically, in the fourth embodiment, an example of calculating the degree of variation by calculating the edge strength of the pixel 302 to be quantized will be described. In the following, description of similar contents to the third embodiment is omitted.

Figure 19C:
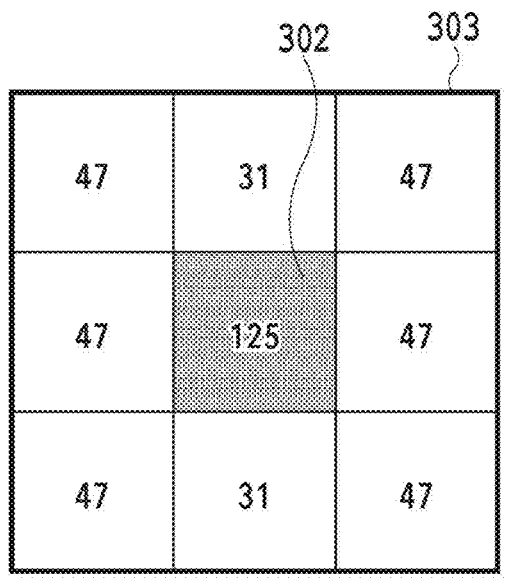

Edge strength is calculated as the degree of variation from the density value of each pixel in the area 303 by using the filter in FIG. 3B. Specifically, the absolute value of the sum of a value derived by multiplying the density value of the pixel to be quantized by −1 and values derived by multi- plying the density values of the peripheral pixels by ⅛ is calculated as the edge strength. FIG. 19C shows the result of the calculation of the edge strength in this embodiment. The edge strength in a case of quantizing the pixel 302 in FIG. 3 is 125. FIG. 19C also indicates the values of the edge strength of the peripheral pixels around the pixel 302 included in the area 303 in a case where the peripheral pixels are pixels to be quantized. In this embodiment, the filter in FIG. 3B is used to calculate the edge strength, but this embodiment does not have to be limited to this manner as long as the edge strength can be calculated.

Subsequently, the noise use rate Rn and the error use rate Re to be applied to the pixel to be quantized are determined based on the degree of variation and the density value of the pixel to be quantized. In this embodiment, the density value of the pixel 302 to be quantized is 125. Thus, in this embodiment, with the minimum value of the edge strength set to 0, the noise use rate Rn and the error use rate Re for 0 are 0% and 100%, respectively, in a case where the density value is 125 based on the above calculation method. On the other hand, in this embodiment, with the maximum value of the edge strength set to 128, the noise use rate Rn and the error use rate Re for 128 are 100% and 0%, respectively, in a case where the density value is 125, as shown in FIGS. 17A and 17B. The density difference with which the variation in use rate is maximum is set to 128, and the maximum value of the edge strength is set to 128. That is, the use rates in FIGS. 17A and 17B are applied in a case where the edge strength is any value in the range of 128 to 255. Since the edge strength is 125 for the pixel 302 in this embodiment, the noise use rate Rn is 97% (=0+(100−0)×(125−0)÷(128−0)) and the error use rate Re is 2% (=100+(0−100)×(125−0)÷(128−0)).

In the conventional technology, the noise use rate and the error use rate to be applied in the quantization of the pixel 302 in FIG. 3A are 0% and 100%, respectively. By applying the method of this embodiment, the noise use rate and the error use rate are 97% and 2%, respectively. Since the value of the dither matrix for the pixel 302 is −64 and the initial threshold value is 128, the noise-corrected threshold value is 66 (=−64×0.97+128). As a result, the input value of 125 and the threshold value of 66 are compared with each other. Since the input value is more than the threshold value, the quantization result is 255.

According to this embodiment, as in the third embodiment, the lower the degree of variation in an area, the closer the applied use rates are to the use rates shown in FIG. 6. In this way, it is possible to obtain a quantization result that can appropriately suppress the generation or occurrence of texture, a dot delay, a pattern noise, and the like. On the other hand, the higher the degree of variation in an area, the closer the applied use rates are to the uniform use rates shown in FIGS. 17A and 17B. In this way, it is possible to obtain a quantization result in which the density in the area is maintained. As a result, it is possible to obtain a quantization result in which the density in the area is maintained as compared to the conventional technology as shown Reference Sign (c) of FIG. 2 and FIG. 3D.

Figure 19D:
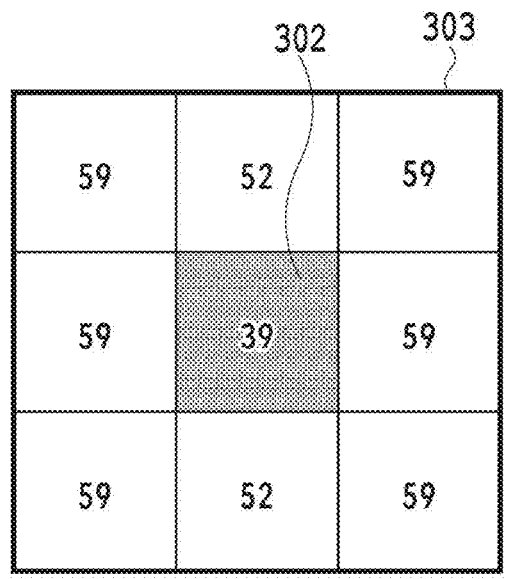

In this embodiment, the degree of variation is calculated from the edge strength, but this embodiment does not have to be limited to this manner as long as the degree of difference in use rate between the pixel to be quantized and the peripheral pixels around it can be evaluated. For example, a value calculated from a use rate of each pixel in the area by using the filter in FIG. 3B may be used. As for the use rate, only the error use rate, only the noise use rate, or both the noise use rate and the error use rate may be used taking into account the noise use rate and the error use rate with respect to the density value in FIG. 6. FIG. 19D shows the result of calculating the degree of difference in use rate between the pixel to be quantized and the peripheral pixels around it based on the error use rate in this embodiment. The maximum value and the minimum value of the degree of difference in this case are 100 and 0, respectively. Since the degree of difference in use rate for the pixel 302 is 100, the noise use rate Rn 100% (=0+(100−0)×(100−0)÷(100−0)) and the error use rate Re is 0% (=100+(0−100)×(100−0)÷(100−0)). In this embodiment, the degree of difference in use rate between the pixel to be quantized and the peripheral pixels around it is calculated as the degree of variation, but this embodiment does not have to be limited to this manner as long as a degree of variation within the area can be evaluated. In any case, it is possible to calculate a degree of variation taking into account the variation in use rate within the area.

According to this embodiment, the degree of difference in use rate between a pixel to be quantized and peripheral pixels around it is calculated. The noise use rate and the error use rate to be applied to the pixel to be quantized are determined based on the degree of difference and the density value of the pixel to be quantized. In this way, it is possible to apply a noise use rate and an error use rate taking into account the maintaining of the density in the area. Accordingly, even in a case of an image of a high-frequency pattern, such as a hatching pattern, with such a halftone value that the noise use rate and the error use rate vary within an area, it is possible to maintain density as an area as compared to the conventional technology.

The fourth embodiment has been described above using a specific embodiment. However, the technical scope of the fourth embodiment is not limited to the scope described in the above embodiment. It is apparent to those skilled in the art that the above embodiment may be modified or improved in various forms. It is apparent from the description of the claims that the modified or improved embodiments are included in the technical scope of the fourth embodiment.

Also, as for the quantization process in the above embodiment, a case where the number of tones after the quantization is two has been described. However, quantization by a similar method is applicable to processing in a case where the number of tones is three or more, for example. The case where the number of tones is three or more means, for example, a case where three or more dot sizes are used.

In this case, for example, quantization processes for the respective dot sizes are each performed using both a dither matrix noise and an accumulated error according to a noise use rate and an error use rate in an identical or similar manner to the case of using two tones. Then, the output results corresponding to the dots of the respective sizes are compared with one another, and the dot with the largest size is determined as the final output. In this way, it is possible to more appropriately perform the quantization process, for example, even in the case where the number of tones is three or more.

In the above embodiment, processing on a highlight-side image in which pixels with no density (0) and pixels with density are arranged in a staggered pattern as shown in Reference Signs (a)-(c) of FIG. 2 has been exemplarily described. The processing is not limited to this manner, and a quantization result in which the density in an area is maintained as compared to the conventional technology can be obtained even in a case of processing of other tone patterns including processing of a shadow-side image as shown in Reference Signs (e)-(f) of FIG. 2.

In the above embodiment, the use rates to be applied are calculated from a 3×3 area. However, the area may be of any size as long as it includes peripheral pixels around the pixel to be quantized, and may not be rectangular as in the above embodiment. By using a size corresponding to the error diffusion range, it is possible to use applied use rates taking the influence of error diffusion into account. This may improve the reproducibility of the density in the area. Moreover, by handling the area as processed pixels, it may also be possible to save the memory capacity in the processing and speed up the processing.

Fifth Embodiment

Problem in this Embodiment

In a case of an image with a high-frequency pattern, such as a hatching pattern, with a halftone value, the noise use rate and the error use rate vary within an area. For this reason, there is a case where the image is processed by error diffusion but the degree of error propagation is low or no error propagation occurs depending on the error use rate. This may result in a failure to maintain density as an area.

An object of this embodiment is therefore to provide a technology which makes it possible to maintain density as an area in a quantization process even with an image of a high-frequency pattern.

<Configuration of Printing System>

The configuration of the printing system in this embodiment is similar to that in the first embodiment (see FIG. 1A).

<Overview of Quantization>

Figure 20:
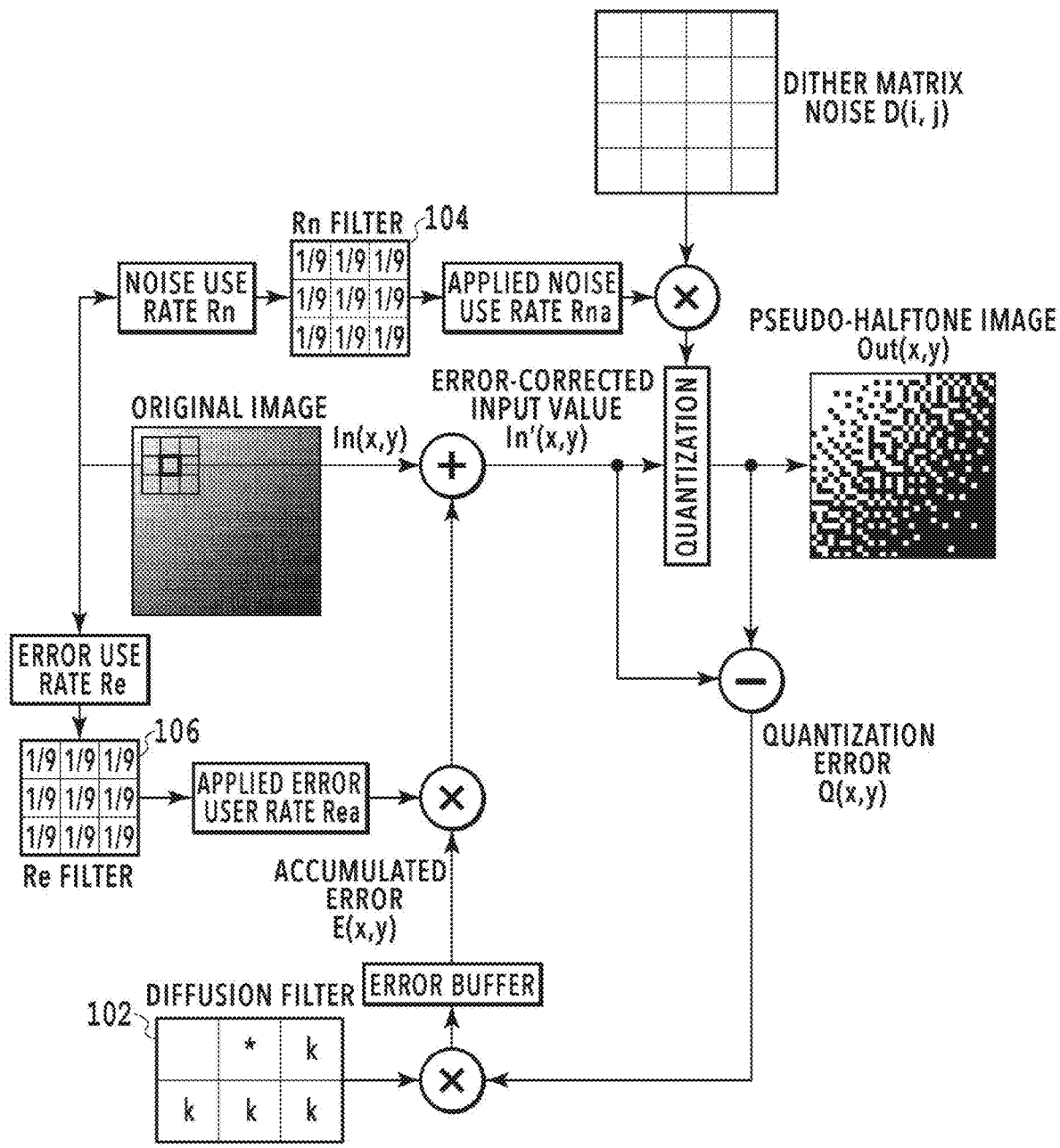
FIG. 20 is a diagram showing an overview of a quantization process executed by an image processing apparatus.

Next, an overview of the quantization process executed by the image processing apparatus 11 will be described. FIG. 20 is a diagram showing an overview of the quantization process executed by the image processing apparatus 11 according to this embodiment. The image processing apparatus 11 quantizes an original image for each process color to form a pseudo-halftone image, which is a halftone image. The quantization is a process of converting a density value In(x, y) at each set of coordinates in the original image into a quantized value out(x, y) at the same set of coordinates in the pseudo-halftone image.

The image processing apparatus 11 performs a hybrid error diffusion process that uses both a dither matrix noise D(i, j) and an accumulated error E(x, y) as the quantization. The image processing apparatus 11 also uses a noise use rate Rn and an error use rate Re each of which is set to a value in the range of 0 to 1, i.e., 0% to 100%, as parameters associated with the dither matrix noise D(i, j) and the accumulated error E(x, y).

The noise use rate Rn is a parameter indicating the degree of influence of the dither matrix noise D(i, j), which is a two-dimensional matrix, on the quantization process. This noise use rate Rn is determined based on the density value. In this embodiment, the image processing apparatus 11 obtains an applied noise use rate Rna to be applied to the pixel to be quantized. The applied noise use rate Rna is calculated from the noise use rates Rn corresponding to the density values In(x, y) of the pixel to be quantized and peripheral pixels around it. The image processing apparatus 11 performs the quantization by using the product of the dither matrix noise D(i, j) and the applied noise use rate Rna, instead of using the dither matrix noise D(i, j) as is. That is, the image processing apparatus 11 uses the dither matrix noise D(i, j) according to the applied noise use rate Rna for the pixel to be quantized.

The error use rate Re is a parameter indicating the degree of influence of the accumulated error E(x, y) on the quantization process. This error use rate Re is determined based on the density value. In this embodiment, the image processing apparatus 11 obtains an applied error use rate Rea to be applied to the pixel to be quantized. The applied error use rate Rea is calculated from the error use rates Re corresponding to the density values In(x, y) of the pixel to be quantized and the peripheral pixels around it. The image processing apparatus 11 calculates an error-corrected input value In'(x, y) of each pixel corresponding to its density value In(x, y) by using the product of the accumulated error E(x, y) and the applied error use rate Rea, instead of using the accumulated error E(x, y) as is. The image processing apparatus 11 then uses the calculated error-corrected input value In'(x, y) to perform the quantization process, specifically, uses the accumulated error E(x, y) according to the applied error use rate Rea for the pixel to be quantized.

Overview of Technology According to this Embodiment

In this embodiment, the applied noise use rate Rna and the applied error use rate Rea to be applied to the pixel to be quantized are determined from the noise use rates Rn and the error use rates Re corresponding to the density values of the pixel to be quantized and the peripheral pixels around it. The determined applied noise use rate Rna and applied error use rate Rea are then used to execute the quantization process of the target pixel.

Accordingly, for example, it is possible to impose influence of the spatial frequency characteristic of the dither process (dither characteristic) on the spatial frequency characteristic of the error diffusion process (error diffusion characteristic). Moreover, the quantization process can be performed, for example, through the use of a method in which the dither characteristic is combined into the error diffusion characteristic. In this case, unlike the case of simply switching between the dither process and the error diffusion process or the like, it is possible to appropriately suppress the generation of a boundary line due to the switching of the processes and the like.

Moreover, the applied noise use rate Rna and the applied error use rate Rea taking into account the maintaining of the density in the area can be applied to the pixel to be quantized. Accordingly, even in a case of an image of a high-frequency pattern, such as a hatching pattern, with such a halftone value that the noise use rate Rn and the error use rate Re vary within an area, it is possible to maintain density as an area. It is therefore possible to, for example, perform the quantization process so as to make appropriate use of the specialty of each of the error diffusion process and the dither process and also maintain the density in the area.

<Quantization Process>

Figure 21:
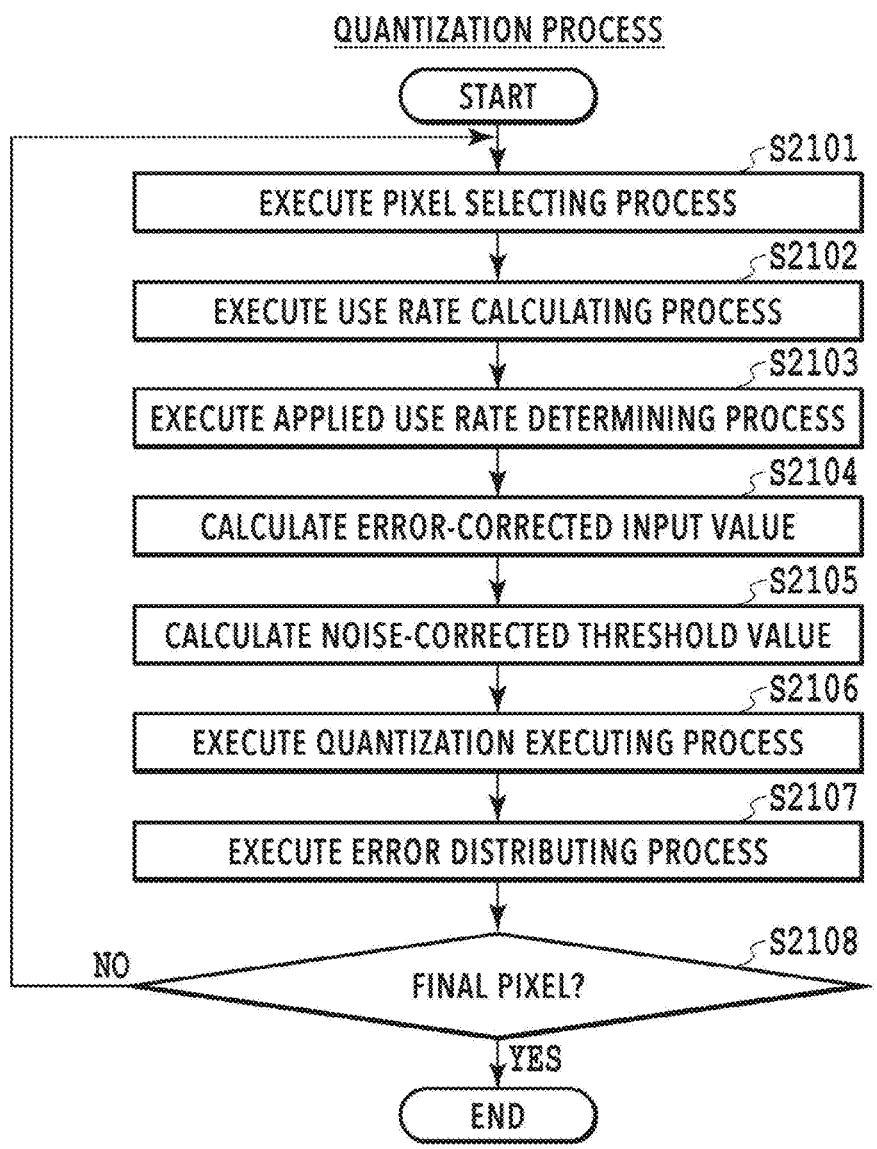
FIG. 21 is a flowchart showing a processing routine of the quantization process.

Next, the quantization process executed by the image processing apparatus 11 in this embodiment will be described. The quantization process is a process of executing quantization on each pixel in an original image. FIG. 21 is a flowchart showing a specific processing routine of the quantization process executed by the image processing apparatus 11. The image processing apparatus 11 executes the quantization process in FIG. 21 for each process color.

Upon start of the quantization process, firstly in S2101, the CPU executes a pixel selecting process of selecting a pixel of interest, which is a pixel to be quantized, from the original image. Thus, in this embodiment, the CPU of the image processing apparatus 11 functions as a pixel-of-interest selecting unit. Then, in S2102, for each pixel in a target area including the pixel to be quantized, the CPU executes a use rate calculating process of calculating the noise use rate Rn and the error use rate Re corresponding to the density value of the pixel, which is its pixel value. Thus, in this embodiment, the CPU of the image processing apparatus 11 functions as a use rate determining unit configured to determine the noise use rate Rn and the error use rates Re corresponding to the density values of the pixels. Then, in S2103, the CPU executes an applied use rate determining process of determining the applied noise use rate Rna and the applied error use rate Rea to be applied to the pixel to be quantized by using the calculated noise use rates Rn and error use rates Re. Thus, in this embodiment, the CPU of the image processing apparatus 11 functions as an applied use rate determining unit configured to determine the applied noise use rate Rna and the applied error use rate Rea for the pixel to be quantized from the noise use rate Rn and the error use rate Re for each pixel in the target area. Details of the above-mentioned pixel selecting process, use rate calculating process, and applied use rate determining process will be described later.

Then, in S2104, the CPU calculates the error-corrected input value In'(x, y), which is a density value after performing correction with the accumulated error E(x, y). In this process, the CPU, for example, adds an applied error value, which is the product of the applied error use rate Rea for the pixel selected in the pixel selecting process in S2101 and the accumulated error E(x, y), to the density value In(x, y) of that pixel. The CPU obtains the value after the addition as the error-corrected input value In'(x, y), which is an accumulated pixel value. Thus, in this embodiment, the CPU of the image processing apparatus 11 functions as an applied error value obtaining unit configured to obtain the applied error value. In this embodiment, the CPU of the image processing apparatus 11 also functions as an accumulated pixel value obtaining unit (error-corrected input value calculating unit) configured to obtain the accumulated pixel value (error-corrected input value).

Further, in S2105, the CPU calculates a noise-corrected threshold value Th', which is a threshold value reflecting the dither matrix noise D(i, j), as a threshold value to be used in the quantization. In this process, the CPU, for example, adds the product of the applied noise use rate Rna for the pixel selected in the pixel selecting process in S2101 and the dither matrix noise D(i, j) to a preset initial threshold value Th. The CPU obtains the value after the addition as the noise-corrected threshold value Th', which is a quantization threshold value. Thus, in this embodiment, the CPU of the image processing apparatus 11 functions as a threshold value obtaining unit (noise-corrected threshold value calculating unit) configured to obtain the quantization threshold value (noise-corrected threshold value).

Then, in S2106, the CPU performs a quantization executing process of comparing the calculated noise-corrected threshold value Th' and error-corrected input value In'(x, y) with each other and executing quantization on the pixel selected in the pixel selecting process in S2101 to thereby calculate a quantized value. In S2106, the CPU calculates a quantization error Q(x, y) as well. Then, in S2107, the CPU performs an error distributing process of diffusing the quantization error Q(x, y) resulting from the quantization of this pixel to peripheral pixels through the use of a diffusion filter. In this error distributing process, the CPU integrates the quantization error Q(x, y) with the values in the diffusion filter corresponding to the distribution destination coordinates of the peripheral pixels and updates the values of the accumulated errors E(x, y) for the peripheral pixels. Thus, in this embodiment, the CPU of the image processing apparatus 11 functions as a quantized value obtaining unit configured to obtain the quantized value and the quantization error value.

Then, in S2108, the CPU determines whether the pixel subjected to the quantization is the final pixel in the original image. If determining in S2108 that the pixel is the final pixel, the CPU ends this quantization process. If determining in S2108 that the pixel is not the final pixel, the CPU returns to the pixel selecting process in S2101 to select the next pixel, and executes the subsequent processes. Details of the quantization executing process and the error distributing process will be described later.

<Pixel Selecting Process>

The pixel selecting process in this embodiment (S2101) is similar to that in the first embodiment (see FIG. 5).

<Use Rate Determining Process (Use Rate Calculating Process)>

Next, the use rate determining process executed in S2102 will be described with reference to FIGS. 6 to 8. The use rate determining process in this embodiment (S2102) is basically similar to that in the first embodiment (see FIGS. 6 to 8).

The error use rate Re and the noise use rate Rn are calculated based on a function that continuously changes according to the density value in a range equal to or more than a minimum input value MinIn, which is 0, and equal to or less than a maximum input value MaxIn. The maximum input value MaxIn and the minimum input value MinIn are, for example, the maximum value and the minimum value in a range available for the density value, which is the input value, respectively. In this function, the following three values are used as references indicating density ranges in a highlighted part.

Highlight-side minimum error use rate density value Hes as an example of the third highlight reference value Highlight-side maximum noise use rate density value Hn as an example of the first highlight reference value Highlight-side maximum error use rate density value He as an example of the second highlight reference value Moreover, the following three values are used as references indicating density ranges in a shadowed part.

Shadow-side maximum error use rate density value Se as an example of the first shadow reference value Shadow-side maximum noise use rate density value Sn as an example of the second shadow reference value Shadow-side minimum error use rate density value Ses as an example of the third shadow reference value Furthermore, a highlight-side 0% noise use rate density value Hnz, a shadow-side 0% noise use rate density value Snz, a first halftone reference value C1, and a second halftone reference value C2 are used as references indicating density ranges on both sides of the initial threshold value Th at the center of a halftone part.

These parameters are set to satisfy at least Hes≤Hn<He<Se<Sn≤Ses and Hn<Hnz<Snz<Sn. In this embodiment, these parameters are also set to satisfy the magnitude relationship shown in the graph, i.e., 0 (MinIn) <Hes≤Hn<He<C1<Hnz<Th<Snz<C2<Se<Sn≤Ses<MaxIn.

The error use rate Re and the noise use rate Rn are obtained based on the calculation equations shown in FIG. 6. In a case where the noise use rate Rn calculated through the use of the corresponding calculation equation shown in FIG. 6 is less than a predetermined lowest noise use rate RnMin, the noise use rate Rn is set to the lowest noise use rate RnMin. In this way, the noise use rate Rn is set to a value equal to or more than the lowest noise use rate RnMin regardless of the density value of the pixel.

The error use rate Re and the noise use rate Rn are obtained such that the noise use rate Rn is high and the error use rate Re is low in the highlighted part (light part) and the shadowed part (dark part), in which a dot delay tends to occur in a case where the influence of the error diffusion characteristic is strong, for example. Accordingly, in the highlighted part and the shadowed part, the influence of the dither characteristic, which enables dots to be arranged in a scattered fashion, is large, thus making it possible to suppress the occurrence of the dot delay. Also, in a case where there are a first pixel value lighter (or darker) than an intermediate value and a second pixel value closer to the intermediate value than the first pixel value is, the error use rate for the first pixel value is lower than the error use rate for the second pixel value. In addition, there are such combinations of pixels that the noise use rate for the first pixel value is higher than the noise use rate for the second pixel value. As for the intermediate value, in a case where the input value is in the range of 0 to 255 as in this embodiment, 128, for example, which is the median of that range, is set as the intermediate value. Specifically, in this embodiment, the value of the noise use rate Rn is higher in a case where the pixel value is the first pixel value, which is different from the intermediate value, than in a case where the pixel value is the second pixel value closer to the intermediate value than the first pixel value is, and the value of the error use rate Re is lower in the case where the pixel value is the first pixel value than in the case where the pixel value is the second pixel value.

The process of calculating the error use rate Re in this embodiment and the process of calculating the noise use rate Rn in this embodiment are similar to those in the first embodiment (see FIGS. 7 and 8).

<Quantization Executing Process>

The quantization executing process in this embodiment (S2106) is similar to that in the first embodiment (see FIG. 9).

<Applied Use Rate Determining Process>

Figure 22:
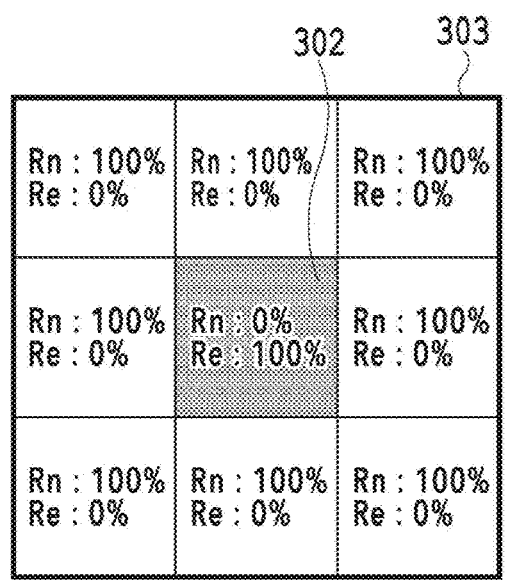
FIG. 22 is a diagram showing a noise use rate and an error use rate for each pixel in a target area.

Next, the applied use rate determining process executed in S2103 will be described. FIG. 22 is a diagram showing the noise use rates Rn and the error use rates Re in the 3×3-pixel area shown in FIG. 3A. The applied noise use rate Rna and the applied error use rate Rea are calculated from the noise use rates Rn and the error use rates Re corresponding to the density values of the respective pixels in the target area including the pixel to be quantized and peripheral pixels around this pixel. In this embodiment, the target area is the 3×3 pixels including the pixel to be quantized and the first peripheral pixels around this pixel. Thus, as shown in FIG. 3A, the target area in a case where the pixel to be quantized is the pixel 302 is the area 303.

Thus, the noise use rates Rn and the error use rates Re for all pixels in the area 303 are used in order to determine the applied noise use rate Rna and the applied error use rate Rea for the pixel 302. The noise use rate Rn and the error use rate Re for each pixel are calculated in the use rate calculating process. The noise use rate Rn and the error use rate Re for each pixel in the area 303 are as shown in FIG. 22. Specifically, the noise use rate Rn and the error use rate Re for the pixel 302 are 0% and 100%, respectively. The noise use rate Rn and the error use rate Re for each peripheral pixel around the pixel 302 are 100% and 0%, respectively.

In this embodiment, the applied noise use rate Rna and the applied error use rate Rea are calculated from the averages of the noise use rates Rn and the error use rates Re for all pixels, respectively. Specifically, the applied noise use rate Rna and the applied error use rate Rea are values obtained by multiplying the noise use rates Rn and the error use rates Re for all pixels in the target area by, for example, 1/9 as shown in FIG. 20 and summing the resulting values, respectively. In FIG. 20, an Rn filter 104 and an Re filter 106 are shown since the operations are similar to filter operations. Specifically, the applied noise use rate Rna for the pixel 302 is (100×1/9)×8+0×1/9=89% (in this embodiment, the calculation result is rounded to the nearest integer). The applied error use rate Rea for the pixel 302 is (0×1/9)×8+100× 1/9=11% (in this embodiment, the calculation result is rounded to the nearest integer).

In a case of performing quantization on the pixel 302, a noise use rate Rn of 0% and an error use rate Re of 100% are applied in the publicly known technology whereas an applied noise use rate of 89% and an applied error use rate of 11% are applied in this embodiment. Thus, in the publicly known technology, in a case where the value of the dither matrix for the pixel 302 is −64 and the initial threshold value is 128, the noise-corrected threshold value is 128 (=−64× 0.0+128). As a result, the input value of 125 (the density value of the pixel 302) and the threshold value of 128 are compared with each other. Since the input value is less than the threshold value, the quantization result is 0 (see FIG. 3B). In this embodiment, on the other hand, the noise-corrected threshold value is 71 (=−64×0.89+128). As a result, the input value of 125 and the threshold value of 71 are compared with each other. Since the input value is more than the threshold value, the quantization result is 255 (see FIG. 3C). Thus, in a case where the input image is Reference Sign (a) of FIG. 2 and FIG. 3A, the quantization result will be as shown in Reference Sign (b) of FIG. 2 and FIG. 3C with the publicly known technology whereas the quantization result will be as shown in Reference Sign (c) of FIG. 2 and FIG. 3D with the technology according to this embodiment. That is, with the technology according to this embodiment, it is possible to obtain a quantization result in which the density in an area is maintained as compared to the publicly known technology.

The average values of the noise use rates Rn and the error use rates Re for the pixel to be quantized and peripheral pixels around it (i.e., all pixels in the target area) are used as the applied noise use rate Rna and the applied error use rate Rea, respectively. However, the method of determining the applied noise use rate Rna and the applied error use rate Rea is not limited to this method. Specifically, any method may be employed as long as it can derive an applied noise use rate Rna and an applied error use rate Rea corresponding to the density in the target area including the pixel to be quantized and the peripheral pixels around it. For example, the median of the noise use rates Rn for the pixels in the target area arranged in a given order may be used as the applied noise use rate Rna, or the most frequent value, i.e., the value appearing most frequently, among these noise use rates Rn may be used as the applied noise use rate Rna. Similarly, the median of the error use rates Re for the pixels in the target area arranged in a given order may be used as the applied error use rate Rea, or the most frequent value among these error use rates Re may be used as the applied error use rate Rea. Alternatively, as shown in FIG. 20, individual filters in the size of an area may be created and used.

<Error Distributing Process>

The error distributing process according to this embodiment (S2107) is similar to that according to the first embodiment (see FIGS. 10 and 11).

In this embodiment, the accumulated error E multiplied by the applied error use rate Rea obtained based on the density values In of the pixel to be quantized and the peripheral pixels around it is added to the density value In of the pixel to be quantized to thereby adjust the degree of influence of the error diffusion characteristic. The dither matrix noise D multiplied by the applied noise use rate Rna obtained based on the density values of the pixel to be quantized and the peripheral pixels around it is added to the initial threshold value Th to thereby adjust the degree of influence of the dither characteristic. In this way, it is possible to set the degrees of influence of the error diffusion characteristic and the dither characteristic, for example, based on the density value In(x, y) and the density values of the peripheral pixels, which are input values. It is also possible to perform a quantization process which makes appropriate use of the specialty of each of the error diffusion process and the dither process.

In a case of performing only a typical error diffusion process, a problem such as a dot delay occurs, for example, in a highlighted part or a shadowed part. In a case of performing only a dither process, a problem such as texture specific to the dither process occurs, for example. In a case of simply switching from the dither process to the error diffusion process and vice versa between a highlighted part and a halftone part and between a halftone part and a shadowed part, the switching causes a problem such as generation of a boundary line, for example. However, in this embodiment, in which a switching process to gradually change the noise use rate and the error use rate is executed, it is possible to appropriately suppress, for example, a dot delay in a highlighted part or a shadowed part. It is also possible to appropriately prevent the generation of texture, the generation of a boundary line due to switching, and the like in a halftone part. Hence, according to this embodiment, it is possible to more appropriately perform the quantization process.

In this embodiment, the applied noise use rate and the applied error use rate for the pixel to be quantized are determined from the noise use rates and the error use rates corresponding to the density values of the pixel to be quantized and the peripheral pixels around it. Thus, in the quantization of a pixel, it is possible to apply an applied noise use rate and an applied error use rate taking into account the maintaining of the density in an area. Accordingly, even in a case of an image of a high-frequency pattern, such as a hatching pattern, with such a halftone value that the noise use rate and the error use rate vary within an area, it is possible to obtain a quantization result maintaining density as an area as compared to the conventional technology.

The above description of the quantization process has been given based on a case where the number of tones after the quantization is two. However, quantization by a similar method is applicable to processing in a case where the number of tones is three or more, for example. The case where the number of tones is three or more means, for example, a case where three or more dot sizes are used. In this case, for example, quantization processes for the respective dot sizes are each performed using both a dither matrix noise and an accumulated error according to the applied noise use rate Rna and the applied error use rate Rea in an identical or similar manner to the case of using two tones. Then, the output results corresponding to the dots of the respective sizes are compared with one another, and the dot with the largest size is determined as the final output. In this way, it is possible to perform the quantization process so as to maintain the density in an area, for example, even in the case where the number of tones is three or more.

Figure 23:
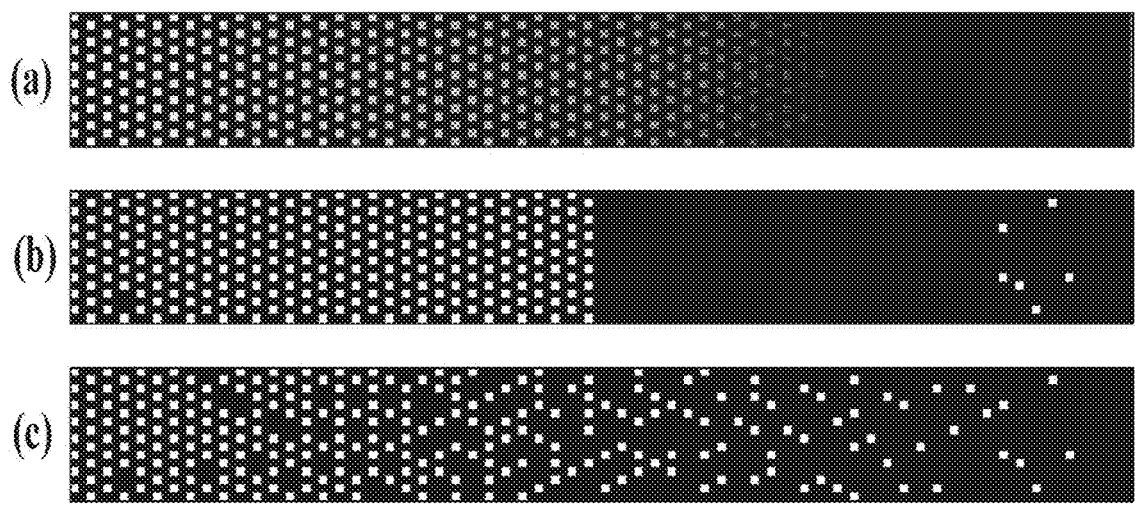
FIG. 23 is a diagram showing another example of an input image and images after quantization processes.

In this embodiment, processing on a highlight-side image in which pixels with no density (0) and pixels with density are arranged in a staggered pattern as shown in Reference Signs (a)-(c) of FIG. 2 has been exemplarily described. The technology according to this embodiment is not limited to this and can obtain a quantization result in which the density in an area is maintained as compared to the conventional technology even in a case of processing of other tone patterns including processing of a shadow-side image as shown in Reference Signs (a)-(c) of FIG. 23.

In this embodiment, the applied noise use rate and the applied error use rate are calculated from the 3×3-pixel target area centered at the pixel to be quantized, but this embodiment is not limited to this manner. Specifically, the target area may be of any size as long as it includes the pixel to be quantized and peripheral pixels around it, and may not be rectangular as in this embodiment. By using a size corresponding to the error diffusion range, it is possible to use an applied noise use rate and an applied error use rate taking the influence of error diffusion into account. This may improve the reproducibility of the density in the area. Moreover, by handling the area as processed pixels, it may also be possible to save the memory capacity in the processing and speed up the processing.

In this embodiment, the calculation of the use rates (error use rate Re and noise use rate Rn) for the pixel to be quantized involves calculating the use rates for the pixel to be quantized and the peripheral pixels around it. However, this embodiment is not limited to this manner. For example, the use rates for all pixels may be calculated and saved in advance and, in a case of calculating the use rates for a pixel to be quantized, the calculated use rates for each required pixel may be referred to.

Sixth Embodiment

Problem in this Embodiment

In a case of an image with a high-frequency pattern, such as a hatching pattern, with a halftone value, the noise use rate and the error use rate vary within an area. For this reason, there is a case where the image is processed by error diffusion but the degree of error propagation is low or no error propagation occurs depending on the error use rate. This may result in a failure to maintain density as an area.

An object of this embodiment is therefore to provide a technology which makes it possible to maintain density as an area in a quantization process even with an image of a high-frequency pattern.

<Configuration of Printing System>

The configuration of the printing system in this embodiment is similar to that in the first embodiment (see FIG. 1A).

<Overview of Quantization>

Figure 24:
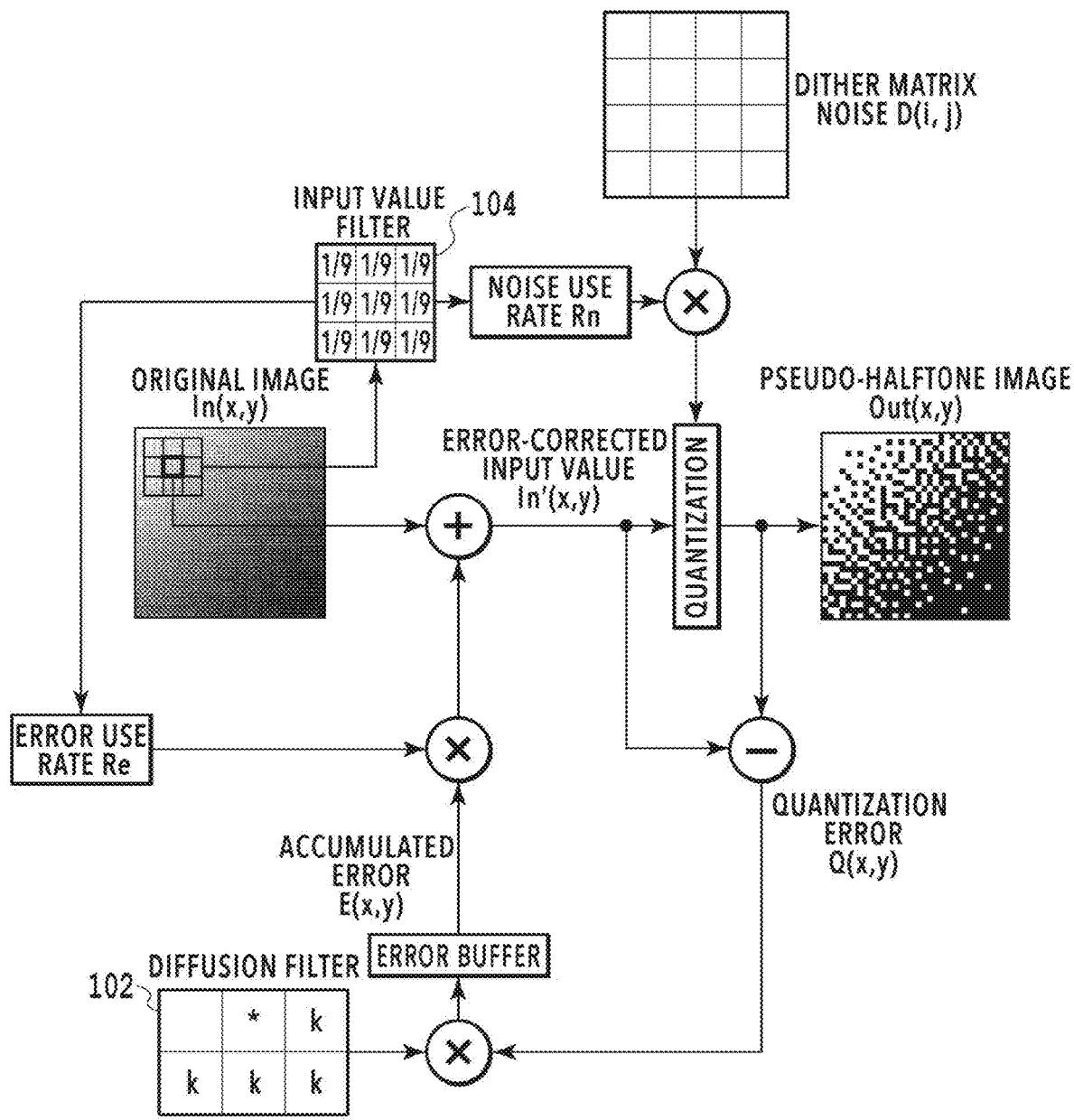
FIG. 24 is a diagram showing an overview of a quantization process executed by an image processing apparatus.

Next, an overview of the quantization process executed by the image processing apparatus 11 will be described. FIG. 24 is a diagram showing an overview of the quantization process executed by the image processing apparatus 11. The image processing apparatus 11 quantizes an original image for each process color to form a pseudo-halftone image, which is a halftone image. The quantization is a process of converting a density value In(x, y) at each set of coordinates in the original image into a quantized value out(x, y) at the same set of coordinates in the pseudo-halftone image.

The image processing apparatus 11 performs a hybrid error diffusion process that uses both a dither matrix noise D(i, j) and an accumulated error E(x, y) as the quantization. The image processing apparatus 11 also uses a noise use rate Rn and an error use rate Re each of which is set to a value in the range of 0 to 1, i.e., 0% to 100%, as parameters associated with the dither matrix noise D(i, j) and the accumulated error E(x, y).

The noise use rate Rn is a parameter indicating the degree of influence of the dither matrix noise D(i, j), which is a two-dimensional matrix, on the quantization process. The noise use rate Rn to be applied to the pixel to be quantized is calculated based on an area value calculated from the density value of each pixel in an area including the pixel to be quantized and peripheral pixels around it. The image processing apparatus 11 performs the quantization by using the product of the dither matrix noise D(i, j) and the noise use rate Rn, instead of using the dither matrix noise D(i, j) as is. That is, the image processing apparatus 11 uses the dither matrix noise D(i, j) according to the noise use rate Rn for the pixel to be quantized.

The error use rate Re is a parameter indicating the degree of influence of the accumulated error E(x, y) on the quantization process. The error use rate Re to be applied to the pixel to be quantized is calculated based on the area value calculated from the density value of each pixel in the area including the pixel to be quantized and the peripheral pixels around it. The image processing apparatus 11 calculates an error-corrected input value In'(x, y) of each pixel corresponding to its density value In(x, y) by using the product of the accumulated error E(x, y) and the error use rate Re, instead of using the accumulated error E(x, y) as is. The image processing apparatus 11 then uses the calculated error-corrected input value In'(x, y) to perform the quantization process, specifically, uses the accumulated error E(x, y) according to the error use rate Re for the pixel to be quantized.

Overview of Technology According to this Embodiment

In this embodiment, the area value for the pixel to be quantized is calculated from the density value of each pixel in the area including the pixel to be quantized and the peripheral pixels around it. Then, the noise use rate Rn and the error use rate Re for the pixel to be quantized are determined based on the calculated area value.

Accordingly, for example, it is possible to impose influence of the spatial frequency characteristic of the dither process (dither characteristic) on the spatial frequency characteristic of the error diffusion process (error diffusion characteristic). Moreover, the quantization process can be performed, for example, through the use of a method in which the dither characteristic is combined into the error diffusion characteristic. In this case, unlike the case of simply switching between the dither process and the error diffusion process or the like, it is possible to appropriately suppress the generation of a boundary line due to the switching of the processes and the like.

Moreover, the noise use rate Rn and the error use rate Re taking into account the maintaining of the density in the area can be applied to the pixel to be quantized. Accordingly, even in a case of an image of a high-frequency pattern, such as a hatching pattern, with such a halftone value that the noise use rate Rn and the error use rate Re vary within an area, it is possible to maintain density as an area. It is therefore possible to, for example, perform the quantization process so as to make appropriate use of the specialty of each of the error diffusion process and the dither process and also maintain the density in the area.

<Quantization Process>

Figure 25:
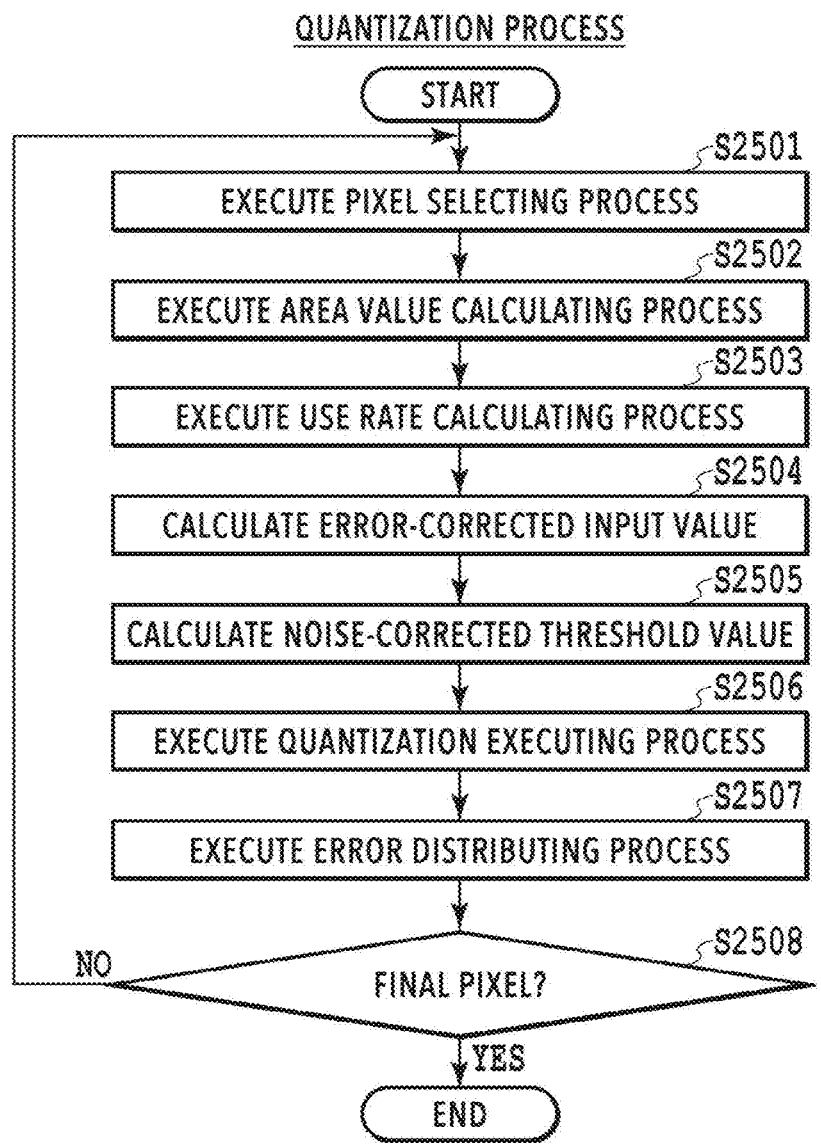
FIG. 25 is a flowchart showing a processing routine of the quantization process.

Next, the quantization process executed by the image processing apparatus 11 in this embodiment will be described. The quantization process is a process of executing quantization on each pixel in an original image. FIG. 25 is a flowchart showing a specific processing routine of the quantization process executed by the image processing apparatus 11. The image processing apparatus 11 executes the quantization process in FIG. 25 for each process color. The CPU performs the series of processes shown in the flowchart of FIG. 25 by loading program code stored in the ROM to the RAM and executing it. Alternatively, the functions of some or all of the steps in FIG. 25 may be implemented with hardware such as an application-specific integrated circuit (ASIC) or an electric circuit. Meanwhile, the symbol S in the description of each process means a step in the flowchart (the same applies below herein).

Upon start of the quantization process, firstly in S2501, the CPU executes a pixel selecting process of selecting a pixel of interest, which is a pixel to be quantized, from the original image. Thus, in this embodiment, the CPU of the image processing apparatus 11 functions as a pixel-of-interest selecting unit. Then, in S2502, the CPU executes an area value calculating process of calculating the area value for the pixel to be quantized from the density value of each pixel in the target area including the pixel to be quantized, which is the pixel value of the pixel. Thus, in this embodiment, the CPU of the image processing apparatus 11 functions as an area value obtaining unit configured to obtain the area value for the pixel to be quantized. Then, in S2503, the CPU executes a use rate calculating process of calculating the noise use rate Rn and the error use rate Re for the pixel to be quantized based on the calculated area value. Thus, in this embodiment, the CPU of the image processing apparatus 11 functions as a use rate determining unit configured to determine the noise use rate Rn and the error use rate Re for the pixel to be quantized based on the area value. Details of the above-mentioned pixel selecting process, area value calculating process, and use rate calculating process will be described later.

Then, in S2504, the CPU calculates the error-corrected input value In'(x, y), which is a density value after performing correction with the accumulated error E(x, y). In this process, the CPU, for example, adds an applied error value, which is the product of the error use rate Re for the pixel selected in the pixel selecting process in S2501 and the accumulated error E(x, y), to the density value In(x, y) of that pixel. The CPU obtains the value after the addition as the error-corrected input value In'(x, y), which is an accumulated pixel value. Thus, in this embodiment, the CPU of the image processing apparatus 11 functions as an applied error value obtaining unit configured to obtain the applied error value. In this embodiment, the CPU of the image processing apparatus 11 also functions as an accumulated pixel value obtaining unit (error-corrected input value calculating unit) configured to obtain the accumulated pixel value (error-corrected input value).

Further, in S2505, the CPU calculates a noise-corrected threshold value Th', which is a threshold value reflecting the dither matrix noise D(i, j), as a threshold value to be used in the quantization. In this process, the CPU, for example, adds the product of the noise use rate Rn for the pixel selected in the pixel selecting process in S2501 and the dither matrix noise D(i, j) to a preset initial threshold value Th. The CPU obtains the value after the addition as the noise-corrected threshold value Th', which is a quantization threshold value. Thus, in this embodiment, the CPU of the image processing apparatus 11 functions as a threshold value obtaining unit (noise-corrected threshold value calculating unit) configured to obtain the quantization threshold value (noise-corrected threshold value).

Then, in S2506, the CPU performs a quantization executing process of comparing the calculated noise-corrected threshold value Th' and error-corrected input value In'(x, y) with each other and executing quantization on the pixel selected in the pixel selecting process in S2501 to thereby calculate a quantized value. In S2506, the CPU calculates a quantization error Q(x, y) as well. Then, in S2507, the CPU performs an error distributing process of diffusing the quantization error Q(x, y) resulting from the quantization of this pixel to peripheral pixels through the use of a diffusion filter. In this error distributing process, the CPU integrates the quantization error Q(x, y) with the values in the diffusion filter corresponding to the distribution destination coordinates of the peripheral pixels and updates the values of the accumulated errors E(x, y) for the peripheral pixels. Thus, in this embodiment, the CPU of the image processing apparatus 11 functions as a quantized value obtaining unit configured to obtain the quantized value and the quantization error value.

Then, in S2508, the CPU determines whether the pixel subjected to the quantization is the final pixel in the original image. If determining in S2508 that the pixel is the final pixel, the CPU ends this quantization process. If determining in S2508 that the pixel is not the final pixel, the CPU returns to the pixel selecting process in S2501 to select the next pixel, and executes the subsequent processes. Details of the quantization executing process and the error distributing process will be described later.

<Pixel Selecting Process>

The pixel selecting process in this embodiment (S2101) is similar to that in the first embodiment (see FIG. 5).

<Use Rate Determining Process (Use Rate Calculating Process)>

Figure 26:
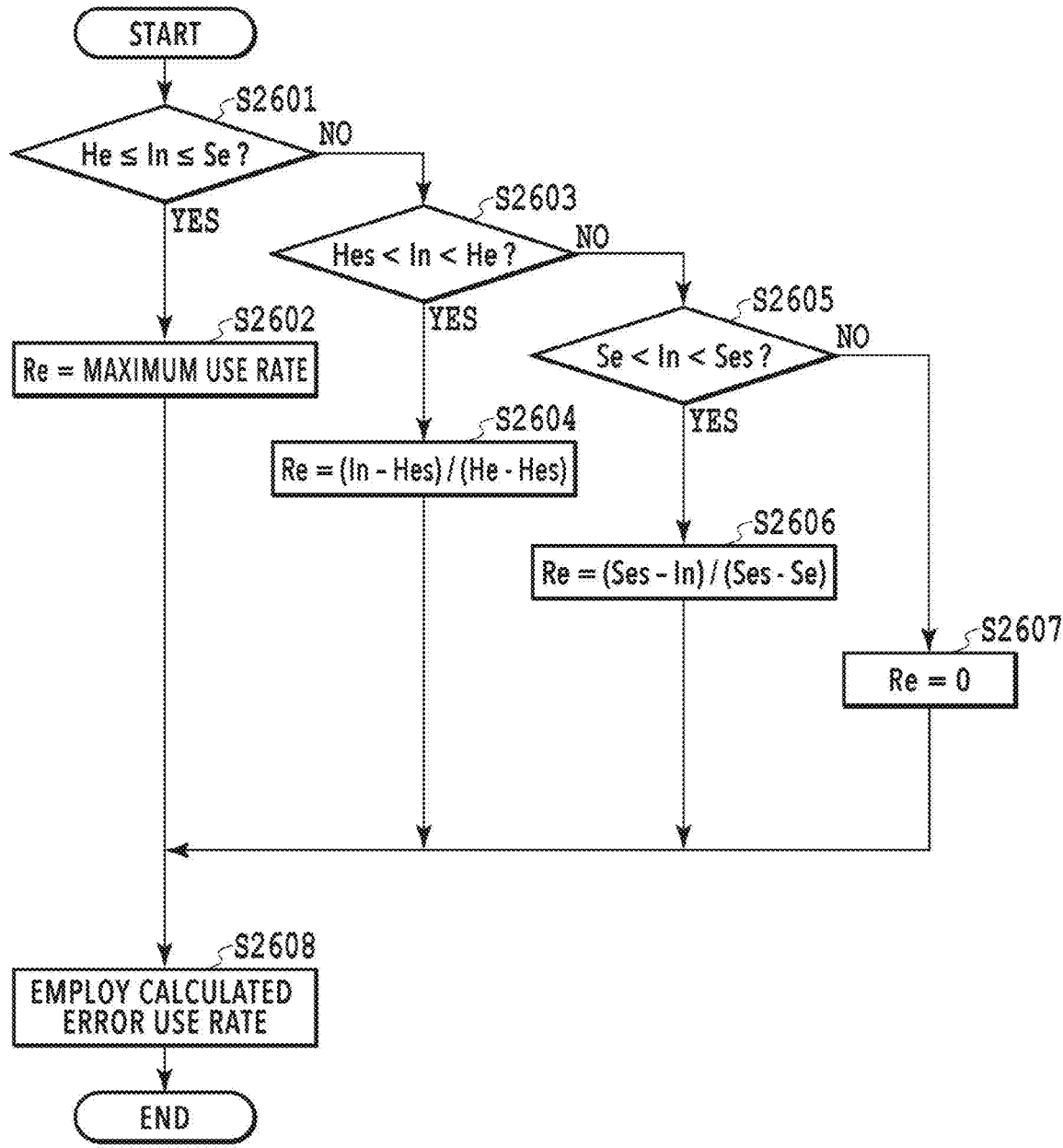
FIG. 26 is a flowchart showing a processing routine of a first calculating process.
Figure 27:
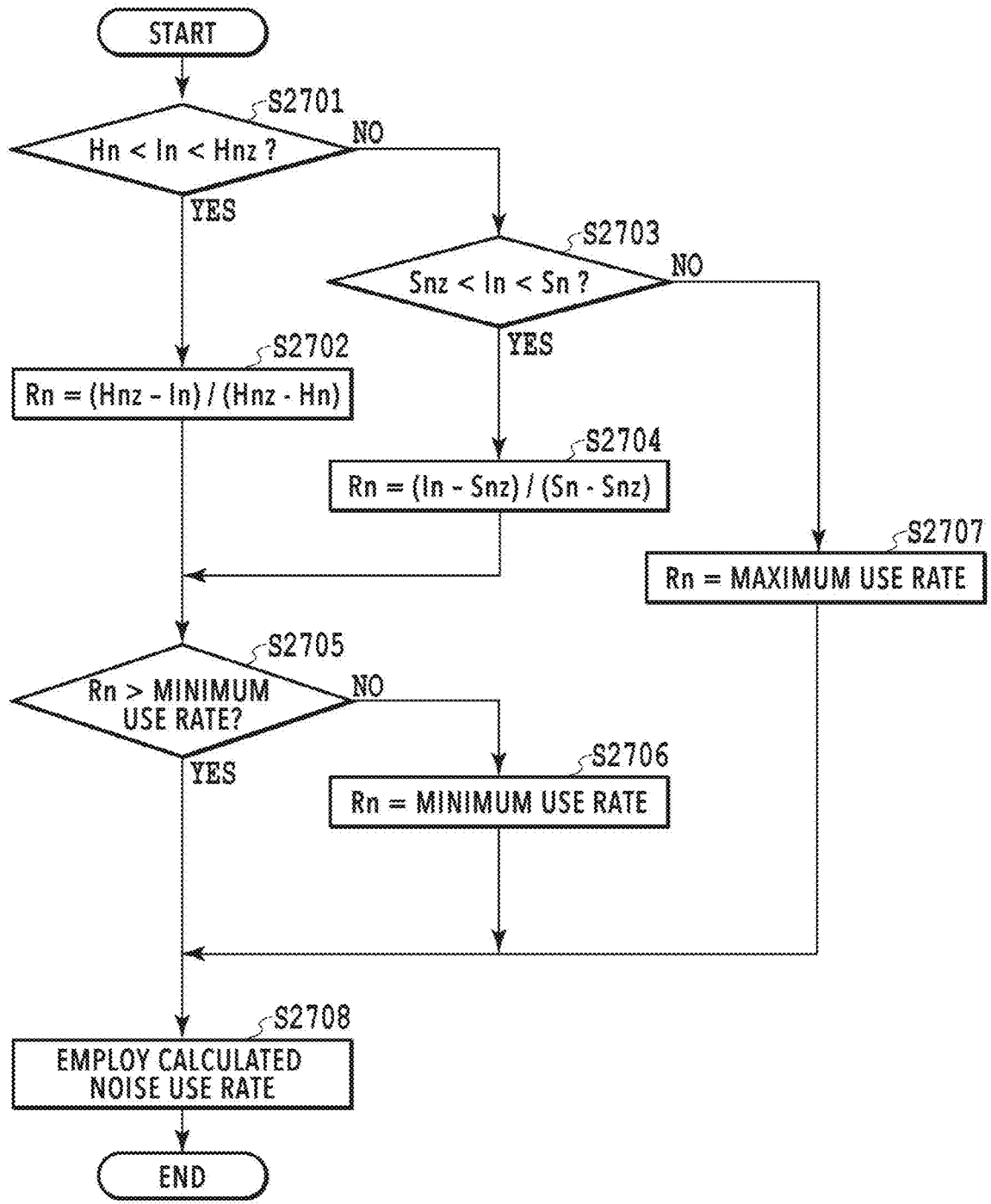
FIG. 27 is a flowchart showing a processing routine of a second calculating process.

Next, the use rate calculating process executed in S2503 will be described with reference to FIGS. 6, 26, and 27. FIG. 26 is a flowchart showing a specific processing routine of a first calculating process of calculating the error use rate Re. FIG. 27 is a flowchart showing a specific processing routine of a second calculating process of calculating the noise use rate Rn. The CPU performs the series of processes shown in the flowcharts of FIGS. 26 and 27 by loading program code stored in the ROM to the RAM and executing it. Alternatively, the functions of some or all of the steps in FIGS. 26 and 27 may be implemented with hardware such as an application-specific integrated circuit (ASIC) or an electric circuit.

The error use rate Re and the noise use rate Rn are calculated based on a function that continuously changes according to the area value in a range equal to or more than a minimum input value MinIn, which is 0, and equal to or less than a maximum input value MaxIn. The maximum input value MaxIn and the minimum input value MinIn are, for example, the maximum value and the minimum value in a range available for the area value, which is the input value, respectively. In this function, the following three values are used as references indicating area value ranges in a highlighted part.

Highlight-side minimum error use rate area value Hes as an example of the third highlight reference value Highlight-side maximum noise use rate area value Hn as an example of the first highlight reference value Highlight-side maximum error use rate area value He as an example of the second highlight reference value Moreover, the following three values are used as references indicating area value ranges in a shadowed part.

Shadow-side maximum error use rate area value Se as an example of the first shadow reference value Shadow-side maximum noise use rate area value Sn as an example of the second shadow reference value Shadow-side minimum error use rate area value Ses as an example of the third shadow reference value Furthermore, a highlight-side 0% noise use rate area value Hnz, a shadow-side 0% noise use rate area value Snz, a first halftone reference value C1, and a second halftone reference value C2 are used as references indicating density ranges on both sides of the initial threshold value Th at the center of a halftone part.

These parameters are set to satisfy at least Hes≤Hn<He<Se<Sn≤Ses and Hn<Hnz<Snz<Sn. In this embodiment, these parameters are also set to satisfy the magnitude relationship shown in the graph, i.e., 0 (MinIn) <Hes≤Hn<He<C1<Hnz<Th<Snz<C2<Se<Sn≤Ses<MaxIn.

The error use rate Re and the noise use rate Rn are obtained based on the calculation equations shown in FIG. 6. In a case where the noise use rate Rn calculated through the use of the corresponding calculation equation shown in FIG. 6 is less than a predetermined lowest noise use rate RnMin, the noise use rate Rn is set to the lowest noise use rate RnMin. In this way, the noise use rate Rn is set to a value equal to or more than the lowest noise use rate RnMin regardless of the input value.

The lowest noise use rate RnMin is set to a value more than 0 in advance, for example, at the time of making an adjustment during the setting of parameters or the like. The lowest noise use rate RnMin may be set to a value equal to or more than 0.1 (10%), for example. The lowest noise use rate RnMin is preferably set to be, for example, in the range of 0.1 to 0.2 (10% to 20%). As can be seen from the graph in FIG. 6, in a case where the input value In is equal to the first halftone reference value C1 or the second halftone reference value C2, the noise use rate Rn calculated through the use of the calculation equation is equal to the lowest noise use rate RnMin.

With the above method, in a case where the input value In is, for example, equal to or more than the highlight-side maximum error use rate area value He and equal to or less than the shadow-side maximum error use rate area value Se, the error use rate Re is set to 1 (100%). In a case where the input value In is, for example, equal to or less than the highlight-side minimum error use rate area value Hes, the error use rate Re is set to 0. In a case where the input value In is equal to or more than the highlight-side minimum error use rate area value Hes and equal to or less than the highlight-side maximum error use rate area value He, the error use rate Re is set to a value calculated by (In−Hes)/(He−Hes). In this way, in a case where the input value In is, for example, equal to or less than the highlight-side maximum error use rate area value He, the error use rate Re is set to a value which is in the range of 0 to 1 (100%) and which is gradually decreased from 1 according to the difference between the highlight-side maximum error use rate area value He and the input value In.

In a case where the input value In is, for example, equal to or more than the shadow-side maximum error use rate area value Se and equal to or less than the shadow-side minimum error use rate area value Ses, the error use rate Re is set to a value calculated by (Ses−In)/(Ses−Se). In a case where the input value In is equal to or more than the shadow-side minimum error use rate area value Ses, the error use rate Re is set to 0. In this way, in a case where the input value In is, for example, equal to or more than the shadow-side maximum error use rate area value Se, the error use rate Re is set to a value which is in the range of 0 to 1 (100%) and which is gradually decreased from 1 according to the difference between the input value In and the shadow-side maximum error use rate area value Se.

In this case, the error use rate Re from the highlighted part to the halftone part gradually increases, for example, from the highlight-side minimum error use rate area value Hes with respect to the input value In and reaches the maximum value at the highlight-side maximum error use rate area value He. The error use rate Re from the halftone part to the shadowed part gradually decreases from the shadow-side maximum error use rate area value Se with respect to the input value In and reaches the minimum value at the shadow-side minimum error use rate area value Ses.

In this way, for example, the error use rate Re in a case where the input value In is an area value corresponding to the highlighted part or the shadowed part is set to a value which is less than the error use rate Re in a case where the input value In is an area value corresponding to the halftone part. In this case, the error use rate Re is, for example, at a value of 0 (0%) at both ends of its area value range, and changes so as to be at a value of 1 (100%) within texture-generated parts Hd and Sd, each of which is an area value range in which the texture specific to the dither process will be generated. By employing this constitution, for example, it is possible to appropriately achieve a constitution in which the error use rate Re is mainly used for the halftone part.

In a case where, for example, the input value In is equal to or less than the highlight-side maximum noise use rate area value Hn or equal to or more than the shadow-side maximum noise use rate area value Sn, the noise use rate Rn is set to 1 (100%). In a case where the input value In is equal to or more than the first halftone reference value C1 and equal to or less than the second halftone reference value C2, the noise use rate Rn is set to the lowest noise use rate RnMin. In a case where the input value In is, for example, equal to or more than the highlight-side maximum noise use rate area value Hn and equal to or less than the first halftone reference value C1, the noise use rate Rn is set to a value equal to or more than the lowest noise use rate RnMin and equal to or less than to 1 (100%). The noise use rate Rn is set to a value gradually decreased from 1 according to the difference between the input value In and the highlight-side maximum noise use rate area value Hn. In a case where the input value In is, for example, equal to or more than the second halftone reference value C2 and equal to or less than the shadow-side maximum noise use rate area value Sn, the noise use rate Rn is set to a value equal to or more than the lowest noise use rate RnMin and equal to or less than 1 (100%). The noise use rate Rn is set to a value gradually increased from the lowest noise use rate RnMin according to the difference between the input value In and the second halftone reference value C2.

The error use rate Re and the noise use rate Rn are obtained such that the noise use rate Rn is high and the error use rate Re is low in the highlighted part (light part) and the shadowed part (dark part), in which a dot delay tends to occur in a case where the influence of the error diffusion characteristic is strong, for example. Accordingly, in the highlighted part and the shadowed part, the influence of the dither characteristic, which enables dots to be arranged in a scattered fashion, is large, thus making it possible to suppress the occurrence of the dot delay. Further, the following conditions are satisfied in a case where there are a first area value with which the pixel values of all pixels in an area including the pixel of interest and peripheral pixels around it are a first pixel value lighter (or darker) than an intermediate value, and a second area value with which the pixel values are a second pixel value closer to the intermediate value than the first pixel value is. Specifically, there are such combinations of pixels that the error use rate for the first area value is lower than the error use rate for the second area value and the noise use rate for the first area value is higher than the noise use rate for the second area value. As for the intermediate value, in a case where the input value is in the range of 0 to 255 as in this embodiment, 128, for example, which is the median of that range, is set as the intermediate value. Specifically, in this embodiment, the value of the noise use rate Rn is higher with the first area value, with which the pixel values of all pixels in the target area are the first pixel value different from the intermediate value, than with the second area value, with which the pixel values are the second pixel value closer to the intermediate value than the first pixel value is. The error use rate Re is lower with the first area value than with the second area value.

By performing the quantization process for the halftone part with the influence of the error diffusion characteristic increased, it is possible to obtain, for example, a more natural pseudo-gradation. Moreover, by, for example, setting the noise use rate Rn low and setting the error use rate Re high in the area value ranges corresponding to the texture-generated parts, it is possible to make a change to the arrangement of dots. As a result, it is also possible to suppress the generation of the texture. Further, by providing the lowest noise use rate RnMin so as not to set the noise use rate Rn to 0, it is possible to, for example, make the influence of the error diffusion characteristic large in the halftone part while also allowing the dither characteristic to impose slight influence in the halftone part. This makes it possible to suppress the generation of a pattern noise.

The magnitude of influence of the dither characteristic and the magnitude of influence of the error diffusion characteristic are gradually changed based on the calculation equations for calculating the error use rate Re and the noise use rate Rn. In this way, it is possible to suppress the generation of a boundary line at a switching part between an area where the dither characteristic is dominant and an area where the error diffusion characteristic is dominant. Accordingly, it is possible to smoothly switch the method of the quantization process. Therefore, according to this embodiment, it is possible to appropriately set the error use rate Re and the noise use rate Rn, for example, based on the area value. Accordingly, it is possible to execute a quantization process making more appropriate use of the specialty of each of the error diffusion process and the dither process.

<First Calculating Process and Second Calculating Process>

Now, details of the processing in the processes of calculating the error use rate Re and the noise use rate Rn will be described. In S2502, the first calculating process and the second calculating process are executed to calculate the error use rate Re and the noise use rate Rn for the pixel to be quantized corresponding to its area value, respectively.

First, the first calculating process of calculating the error use rate Re will be described. Upon start of the first calculating process, the CPU firstly determines in S2601 whether the input value In of the target pixel, which is its area value, is in a range equal to or more than the highlight-side maximum error use rate area value He and equal to or less than the shadow-side maximum error use rate area value Se. If determining in S2601 that the input value In is in the range, that is, the input value In satisfies He≤In≤Se, the CPU proceeds to S2602 and sets the error use rate Re to 1 (100%), which is the maximum use rate.

If determining in S2601 that the input value In is not in the range, that is, the input value In does not satisfy He≤In≤Se, the CPU proceeds to S2603. In S2603, the CPU determines whether the input value In is in a range more than the highlight-side minimum error use rate area value Hes and less than the highlight-side maximum error use rate area value He. If determining in S2603 that the input value In is in the range, that is, the input value In satisfies Hes<In<He, the CPU proceeds to S2604 and sets the error use rate Re to a value calculated by (In−Hes)/(He−Hes).

If determining in S2603 that the input value In is not in the range, that is, the input value In does not satisfy Hes≤In≤He, the CPU proceeds to S2605. In S2605, the CPU determines whether the input value In is in a range more than the shadow-side maximum error use rate area value Se and less than the shadow-side minimum error use rate area value Ses. If determining in S2605 that the input value In is in the range, that is, the input value In satisfies Se<In<Ses, the CPU proceeds to S2606 and sets the error use rate Re to a value calculated by (Ses−In)/(Ses−Se).

If determining in S2605 that the input value In is not in the range, that is, the input value In does not satisfy Se≤In≤Ses, the CPU proceeds to S2607 and sets the error use rate Re to 0 (0%). After setting the error use rate Re in S2602, S2604, S2606, or S2607, the CPU proceeds to S2608 and employs the set error use rate Re as the error use rate Re corresponding to the input value In, i.e., the error use rate Re for the pixel given an area value as the input value In.

Next, the second calculating process of calculating the noise use rate Rn will be described. Upon start of the second calculating process, the CPU firstly determines in S2701 whether the input value In of the target pixel, which is its area value, is in a range more than the highlight-side maximum noise use rate area value Hn and less than the highlight-side 0% noise use rate area value Hnz. If determining in S2701 that the input value In is in the range, that is, the input value In satisfies Hn<In<Hnz, the CPU proceeds to S2702 and sets the noise use rate Rn to a value calculated by (Hnz−In)/(Hnz−Hn).

If determining in S2701 that the input value In is not in the range, that is, the input value In does not satisfy Hn<In<Hnz, the CPU proceeds to S2703. In S2703, the CPU determines whether the input value In is in a range more than the shadow-side 0% noise use rate area value Snz and less than the shadow-side maximum noise use rate area value Sn. If determining in S2703 that the input value In is in the range, that is, the input value In satisfies Snz<In<Sn, the CPU proceeds to S2704 and sets the noise use rate Rn to a value calculated by (In−Snz)/(Sn−Snz).

After setting the noise use rate Rn in S2702 or S2704, the CPU proceeds to S2705 and determines whether the set noise use rate Rn is more than the lowest noise use rate RnMin, which is the minimum use rate. If determining in S2705 that the set noise use rate Rn satisfies Rn>RnMin, the CPU proceeds to S2708 to be described later. If determining in S2705 that the set noise use rate Rn does not satisfy Rn>RnMin, the CPU proceeds to S2706 and changes the noise use rate Rn to the lowest noise use rate RnMin, and then proceeds to S2708.

If determining in S2703 that the input value In is not in the above-mentioned range, that is, the input value In does not satisfy Snz<In<Sn, the CPU proceeds to S2707 and sets the noise use rate Rn to 1 (100%), which is the maximum use rate. In S2708, the CPU employs the set noise use rate Rn as the noise use rate Rn corresponding to the input value In, i.e., the error use rate Re for the pixel given an area value as the input value In.

<Quantization Executing Process>

The quantization executing process in this embodiment (S2506) is similar to that in the first embodiment (see FIG. 9).

<Area Value Calculating Process>

Next, the area value calculating process executed in S2502 will be described. The area value for the pixel to be quantized is calculated based on the density value of each pixel in the target area including the pixel to be quantized and peripheral pixels around that pixel. In this embodiment, the target area is the 3×3 pixels including the pixel to be quantized and the first peripheral pixels around this pixel. Thus, as shown in FIG. 3A, the target area in a case where the pixel to be quantized is the pixel 302 is the area 303.

Hence, the density values of all pixels in the area 303 are used in order to calculate the area value for the pixel 302. In this embodiment, the average value of the density values of the pixels is set as the area value, and the noise use rate Rn and the error use rate Re are then calculated from the calculated area value through the use of the method described above.

Specifically, the area value is, for example, a value obtained by multiplying the density values of all pixels in the target area by 1/9 as shown in FIG. 24 and summing the resulting values. In FIG. 24, an input value filter 104 is shown since the operation is similar to a filter operation. Specifically, the area value for the pixel 302 is (0×1/9)×8+ 125×1/9=14 (in this embodiment, the calculation result is rounded to the nearest integer). Then, with the area value of 14 as the input value, the noise use rate Rn and the error use rate Re for the pixel 302 are calculated through the use of the method described above. As a result, the noise use rate Rn and the error use rate Re are set to 100% and 0%, respectively. In a case of using the publicly known technology, the density value of 125 is the input value, and the noise use rate Rn and the error use rate Re are set to 0% and 100%, respectively.

Thus, in the publicly known technology, in a case where the value of the dither matrix for the pixel 302 is −64 and the initial threshold value is 128, the noise-corrected threshold value is 128 (=−64×0.0+128). As a result, the input value of 125 (the density value of the pixel 302) and the threshold value of 128 are compared with each other. Since the input value is less than the threshold value, the quantization result is 0 (see FIG. 3C). In this embodiment, on the other hand, the noise-corrected threshold value is 64 (=−64×1.0+128). As a result, the input value of 125 and the threshold value of 64 are compared with each other. Since the input value is more than the threshold value, the quantization result is 255 (see FIG. 3D). Thus, in a case where the input image is Reference Sign (a) of FIG. 2 and FIG. 3A, the quantization result will be as shown in Reference Sign (b) of FIG. 2 and FIG. 3C with the publicly known technology whereas the quantization result will be as shown in Reference Sign (c) of FIG. 2 and FIG. 3D with the technology according to this embodiment. That is, with the technology according to this embodiment, it is possible to obtain a quantization result in which the density in an area is maintained as compared to the publicly known technology.

The average value of the density values of all pixels in the target area including the pixel to be quantized and the peripheral pixels around it is used as the area value. However, the area value is not limited to this value. Specifically, any method may be used as long as it can smooth the density values of all pixels in the target area. For example, the median among the density values of all pixels in the target area arranged in a given order may be used as the area value, or the most frequent value, i.e., the value appearing most frequently, among these density values may be used as the area value. Alternatively, as shown in FIG. 24, an individual filter in the size of an area may be created and used.

<Error Distributing Process>

The error distributing process in this embodiment is similar to that in the first embodiment, and description thereof is therefore omitted (see FIGS. 10A and 10B and FIG. 11).

In this embodiment, the area value calculated from the density values of all pixels in the target area including the pixel to be quantized and the peripheral pixels around it is used to determine the noise use rate Rn and the error use rate Re for the pixel to be quantized. The accumulated error E multiplied by the error use rate Re thus determined is added to the density value In to thereby adjust the degree of influence of the error diffusion characteristic. The dither matrix noise D multiplied by the determined noise use rate Rn is added to the initial threshold value Th to thereby adjust the degree of influence of the dither characteristic. In this way, it is possible to set the degrees of influence of the error diffusion characteristic and the dither characteristic, for example, based on the density value In(x, y) and the density values of the peripheral pixels, which are input values. It is also possible to perform a quantization process which makes appropriate use of the specialty of each of the error diffusion process and the dither process.

In this embodiment, the density values of all pixels in the target area are smoothed to thereby obtain the area value, and the noise use rate and the error use rate for the pixel to be quantized are determined based on this area value. Thus, in the quantization of a pixel, it is possible to apply an applied noise use rate and an applied error use rate taking into account the maintaining of the density in an area. Accordingly, even in a case of an image of a high-frequency pattern, such as a hatching pattern, with such a halftone value that the noise use rate and the error use rate vary within an area with the publicly known technology, it is possible to obtain a quantization result maintaining density as an area as compared to the conventional technology.

Seventh Embodiment

Figure 28:
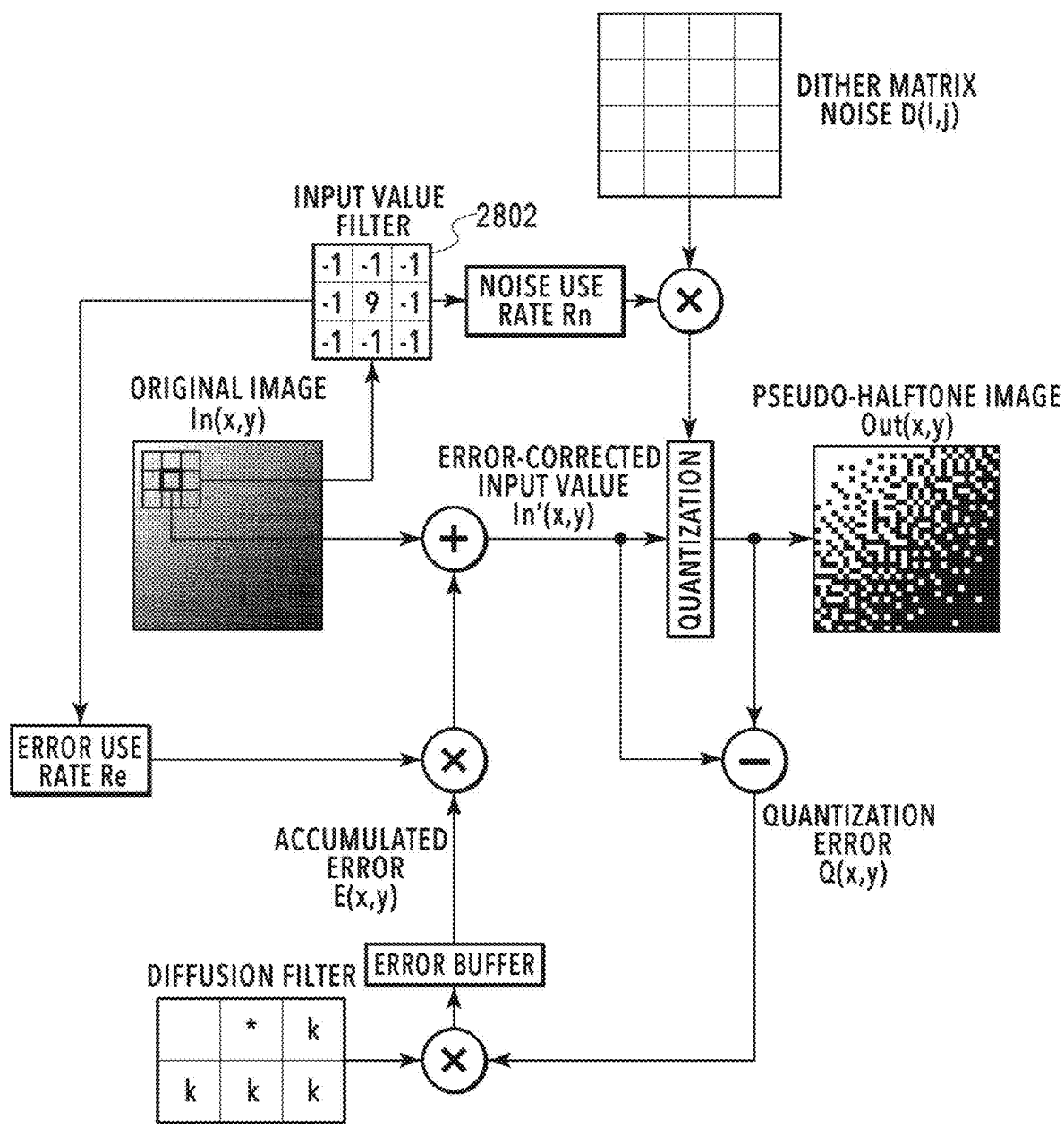
FIG. 28 is a diagram showing an overview of a quantization process executed by an image processing apparatus in another embodiment.

Next, a printing system including an image processing apparatus according to a seventh embodiment will be described with reference to FIG. 28. In the following description, for identical or corresponding components to those in the image processing apparatus according to the above six embodiment, specific description thereof is omitted by using identical reference signs to those used in the sixth embodiment.

In the sixth embodiment, the area value is obtained by smoothing the density values of all pixels in the target area. In the seventh embodiment, the area value is obtained from the density values of all pixels in the target area with the density value of the pixel to be quantized amplified. FIG. 28 is a diagram showing an overview of the quantization process executed by the image processing apparatus according to the seventh embodiment. In this embodiment, the input value filter is an edge enhancement filter 2802. The area value is obtained using this edge enhancement filter 2802, and the noise use rate and the error use rate are determined based on this area value. This embodiment differs from the sixth embodiment only in that an edge enhancement filter is used as the input value filter for obtaining the area value. Features other than the method of obtaining the area value are the same as those of the sixth embodiment, and description of those features is omitted in the following description.

In this embodiment, the area value is obtained by converting the density values of all pixels in the area 303 with an edge enhancement filter and summing the resulting values. Specifically, the area value is obtained by multiplying the density value of the pixel to be quantized by 9 and multiplying the density values of the peripheral pixels by −1 through the use of the edge enhancement filter 2802, and summing the resulting values. More specifically, although the area value for the pixel 302 is calculated to be 9×125+ (0×−1)×8=1125, it is set to 255 since the calculation result is rounded to the nearest integer and is clipped to 255 in a case where the calculation result exceeds 255.

Then, with the area value of 255 as the input value, the noise use rate Rn and the error use rate Re for the pixel 302 are calculated. As a result, the noise use rate Rn and the error use rate Re are set to 100% and 0%, respectively. In a case of using the publicly known technology, the density value of 125 is the input value, and the noise use rate Rn and the error use rate Re are set to 0% and 100%, respectively.

Thus, in the publicly known technology, in a case where the value of the dither matrix for the pixel 302 is −64 and the initial threshold value is 128, the noise-corrected threshold value is 128 (=−64×0.0+128). As a result, the input value of 125 (the density value of the pixel 304) and the threshold value of 128 are compared with each other. Since the input value is less than the threshold value, the quantization result is 0 (see FIG. 3C). In this embodiment, on the other hand, the noise-corrected threshold value is 64 (=−64×1.0+128). As a result, the input value of 125 and the threshold value of 64 are compared with each other. Since the input value is more than the threshold value, the quantization result is 255 (see FIG. 3D). Thus, in a case where the input image is Reference Sign (a) of FIG. 2 and FIG. 3A, the quantization result will be as shown in Reference Sign (b) of FIG. 2 and FIG. 3C with the publicly known technology whereas the quantization result will be as shown in Reference Sign (c) of FIG. 2 and FIG. 3D with the technology according to this embodiment. That is, with the technology according to this embodiment, it is possible to obtain a quantization result in which the density in an area is maintained as compared to the publicly known technology.

In this embodiment, the edge enhancement filter 2802 is used to calculate the area value. However, this embodiment is not limited to this manner as long as the area value can be obtained from the density values of all pixels in the target area with the density value of the pixel to be quantized amplified.

As described above, in this embodiment, the area value for the pixel to be quantized in the target area is obtained with the density value of the pixel amplified, and the noise use rate Rn and the error use rate Re for the pixel to be quantized are determined based on this area value. In this way, advantageous effects similar to those of the first embodiment are achieved.

The above description of the quantization process has been given based on a case where the number of tones after the quantization is two. However, quantization by a similar method is applicable to processing in a case where the number of tones is three or more, for example. The case where the number of tones is three or more means, for example, a case where three or more dot sizes are used. In this case, for example, quantization processes for the respective dot sizes are each performed using both a dither matrix noise and an accumulated error according to the applied noise use rate Rna and the applied error use rate Rea in an identical or similar manner to the case of using two tones. Then, the output results corresponding to the dots of the respective sizes are compared with one another, and the dot with the largest size is determined as the final output. In this way, it is possible to perform the quantization process so as to maintain the density in an area, for example, even in the case where the number of tones is three or more.

In this embodiment, processing on a highlight-side image in which pixels with no density (0) and pixels with density are arranged in a staggered pattern as shown in Reference Signs (a)-(c) of FIG. 2 has been exemplarily described. The technology according to this embodiment is not limited to this and can obtain a quantization result in which the density in an area is maintained as compared to the conventional technology even in a case of processing of other tone patterns including processing of a shadow-side image as shown in Reference Signs (a)-(c) of FIG. 23.

In this embodiment, the area value for the pixel to be quantized is obtained from the pixel values of all pixels in the 3×3-pixel target area centered at the pixel to be quantized. However, this embodiment is not limited to this manner. Specifically, the target area may be of any size as long as it includes the pixel to be quantized and peripheral pixels around it, and may not be rectangular as in this embodiment. By using a size corresponding to the error diffusion range, it is possible to use a noise use rate and an error use rate taking the influence of error diffusion into account. This may improve the reproducibility of the density in the area. Moreover, by handling the area as processed pixels, it may also be possible to save the memory capacity in the processing and speed up the processing.

OTHER EMBODIMENTS

Embodiments of the present disclosure include the following multiple configurations.

(configuration 1) A non-transitory computer readable storage medium storing a program for causing a computer to function as an image processing apparatus for performing quantization on a pixel value of each pixel in an input image, wherein the computer is caused to function as:

a pixel selecting unit configured to select a pixel of interest;

a first calculating unit configured to calculate a degree of variation in use rate in an area including the pixel of interest and peripheral pixels around the pixel of interest;

a first determining unit configured to determine a noise use rate to be applied to the pixel of interest based on the pixel value of the pixel of interest and the degree of variation, the noise use rate indicating a degree of influence of a dither matrix noise on processing of the quantization, the dither matrix noise being a noise designated by a preset dither matrix;

a second determining unit configured to determine an error use rate to be applied to the pixel of interest based on the pixel value of the pixel of interest and the degree of variation, the error use rate indicating a degree of influence of an accumulated error on the processing of the quantization, the accumulated error being obtained by accumulating quantization errors being errors resulting from the quantization of the peripheral pixels;

a second calculating unit configured to calculate an accumulated pixel value of the pixel of interest by adding an applied error value determined using the accumulated error and the error use rate to the pixel value of the pixel of interest;

a third calculating unit configured to calculate a quantization threshold value to be applied to the pixel of interest based on the dither matrix and the noise use rate; and an executing unit configured to execute quantization for obtaining a quantized value and a quantization error value as the quantization of the pixel of interest by using the accumulated pixel value and the quantization threshold value, wherein the degree of variation is calculated using at least one of the noise use rate, the error use rate, or the pixel values of pixels in the input image.

(configuration 2) The storage medium according to configuration 1, wherein in a case where the degree of variation is a minimum value, the noise use rate corresponding to a first pixel value different from an intermediate value is higher than the noise use rate corresponding to a second pixel value closer to the intermediate value than the first pixel value is, and the error use rate corresponding to the first pixel value is lower than the error use rate corresponding to the second pixel value.

(configuration 3) The storage medium according to configuration 2, wherein the error use rate and the noise use rate in a range available for the pixel value are each uniform in a case where the degree of variation is a maximum value.

(configuration 4) The storage medium according to configuration 3, wherein in a case where the degree of variation is the maximum value, an average value of the error use rate and an average value of the noise use rate in the range available for the pixel value are respectively higher and lower than those in the case where the degree of variation is the minimum value, or the average value of the error use rate and the average value of the noise use rate in the range available for the pixel value are respectively lower and higher than those in the case where the degree of variation is the minimum value.

(configuration 5) The storage medium according to configuration 4, wherein the degree of variation is calculated using a standard deviation based on the error use rates for pixels in the input image.

(configuration 6) The storage medium according to configuration 4, wherein the degree of variation is edge strength calculated from the pixel values of pixels in the input image by using a predetermined filter.

(configuration 7) An image processing apparatus for performing quantization on a pixel value of each pixel in an input image, comprising:

a pixel selecting unit configured to select a pixel of interest;

a first calculating unit configured to calculate a degree of variation in use rate in an area including the pixel of interest and peripheral pixels around the pixel of interest;

a first determining unit configured to determine a noise use rate to be applied to the pixel of interest based on the pixel value of the pixel of interest and the degree of variation, the noise use rate indicating a degree of influence of a dither matrix noise on processing of the quantization, the dither matrix noise being a noise designated by a preset dither matrix;

a second determining unit configured to determine an error use rate to be applied to the pixel of interest based on the pixel value of the pixel of interest and the degree of variation, the error use rate indicating a degree of influence of an accumulated error on the processing of the quantization, the accumulated error being obtained by accumulating quantization errors being errors resulting from the quantization of the peripheral pixels;

a second calculating unit configured to calculate an accumulated pixel value of the pixel of interest by adding an applied error value determined using the accumulated error and the error use rate to the pixel value of the pixel of interest;

a third calculating unit configured to calculate a quantization threshold value to be applied to the pixel of interest based on the dither matrix and the noise use rate; and an executing unit configured to execute quantization for obtaining a quantized value and a quantization error value as the quantization of the pixel of interest by using the accumulated pixel value and the quantization threshold value, wherein the degree of variation is calculated using at least one of the noise use rate, the error use rate, or the pixel values of pixels in the input image.

(configuration 8) An image processing method for performing quantization on a pixel value of each pixel in an input image, comprising:

selecting a pixel of interest;

calculating a degree of variation in use rate in an area including the pixel of interest and peripheral pixels around the pixel of interest;

determining a noise use rate to be applied to the pixel of interest based on the pixel value of the pixel of interest and the degree of variation, the noise use rate indicating a degree of influence of a dither matrix noise on processing of the quantization, the dither matrix noise being a noise designated by a preset dither matrix;

determining an error use rate to be applied to the pixel of interest based on the pixel value of the pixel of interest and the degree of variation, the error use rate indicating a degree of influence of an accumulated error on the processing of the quantization, the accumulated error being obtained by accumulating quantization errors being errors resulting from the quantization of the peripheral pixels;

calculating an accumulated pixel value of the pixel of interest by adding an applied error value determined using the accumulated error and the error use rate to the pixel value of the pixel of interest;

calculating a quantization threshold value to be applied to the pixel of interest based on the dither matrix and the noise use rate; and executing quantization for obtaining a quantized value and a quantization error value as the quantization of the pixel of interest by using the accumulated pixel value and the quantization threshold value, wherein the degree of variation is calculated using at least one of the noise use rate, the error use rate, or the pixel values of pixels in the input image.

(configuration 9) A non-transitory computer readable storage medium storing a program for causing a computer to perform quantization on a density value of each pixel in an image, the density value indicating density of a color, the program causing the computer to execute:

a pixel selecting process of sequentially selecting a pixel of interest to be subjected to the quantization;

a calculating process of calculating a degree of variation in use rate in an area including the pixel of interest and peripheral pixels around the pixel of interest;

a use rate determining process of determining a noise use rate and an error use rate, the use rate determining process being a process of determining the noise use rate and the error use rate to be applied to the pixel of interest based on the degree of variation and the density value of the pixel of interest, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of the peripheral pixels; and a quantization executing process of performing the quantization on the density value of the pixel of interest, the quantization executing process being a process of performing the quantization by using a dither matrix noise according to the noise use rate for the pixel of interest, and using the accumulated error according to the error use rate for the pixel of interest, the program causing the computer to additionally execute, on the pixel of interest:

an error-corrected input value calculating process of calculating an error-corrected input value, the error-corrected input value calculating process being a process of calculating a value, as the error-corrected input value, by adding a product of the error use rate for the pixel of interest and the accumulated error to the density value of the pixel of interest, the error-corrected input value being a density value corrected based on the accumulated error; and a noise-corrected threshold value calculating process of calculating a noise-corrected threshold value as a threshold value to be used in the quantization, the noise-corrected threshold value calculating process being a process of calculating a value, as the noise-corrected threshold value, by adding a product of the noise use rate for the pixel of interest and the dither matrix noise to a preset initial threshold value, the noise-corrected threshold value being a threshold value reflecting the dither matrix noise, wherein the quantization executing process performs the quantization by comparing the noise-corrected threshold value and the error-corrected input value with each other, in determining the noise use rate and the error use rate, the use rate determining process if the degree of variation is smallest,
sets the noise use rate in a case where the density value of the pixel of interest is a density value corresponding to a highlighted part or a shadowed part to a value which is more than the noise use rate in a case where the density value of the pixel of interest is a density value corresponding to a halftone part between the highlighted part and the shadowed part, and sets the error use rate in a case where the density value of the pixel of interest is a density value corresponding to the highlighted part or the shadowed part to a value which is less than the error use rate in a case where the density value of the pixel of interest is a density value corresponding to the halftone part, and if the degree of variation is largest,
an average error use rate in a range available for the density value, which is a pixel value, and the noise use rate in the range available for the density value are respectively higher and lower than those in the case where the degree of variation is smallest, or the average error use rate in the range available for the density value and the noise use rate in the range available for the density value are respectively lower and higher than those in the case where the degree of variation is smallest.

(configuration 10) The storage medium according to configuration 9, wherein the quantization executing process includes:
a maximum value determining process of determining whether the density value of the pixel of interest, which is an input value of the quantization, is equal to a maximum value in the range available for the density value;
a minimum value determining process of determining whether the density value of the pixel of interest is equal to a minimum value in the range available for the density value; and
a quantized value obtaining process of obtaining a quantized value being a result of the quantization, if it is determined in the maximum value determining process that the input value is equal to the maximum value, the quantized value obtaining process obtains a value to be output in a case where the density value is more than the threshold value as the quantized value, and if it is determined in the minimum value determining process that the input value is equal to the minimum value, the quantized value obtaining process obtains a value to be output in a case where the density value is less than the threshold value as the quantized value.

(configuration 11) The storage medium according to configuration 9, wherein the use rate determining process sets the noise use rate to a value equal to or more than a lowest noise use rate regardless of the density value of the pixel of interest, the lowest noise use rate being set to a value more than 0 in advance.

(configuration 12) The storage medium according to configuration 11, wherein the use rate determining process in the case where the degree of variation is smallest:

uses a preset first highlight reference value and a preset second highlight reference value which is more than the first highlight reference value as references indicating a density range in the highlighted part;

uses a preset first shadow reference value and a preset second shadow reference value which is more than the first shadow reference value as references indicating a density range in the shadowed part;

uses a first halftone reference value which is more than the second highlight reference value and less than the first shadow reference value and a second halftone reference value which is more than the first halftone reference value and less than the first shadow reference value as references indicating a density range at a center of the halftone part;

sets the noise use rate to 1 in a case where the density value of the pixel of interest is equal to or less than the first highlight reference value or equal to or more than the second shadow reference value;

sets the noise use rate to the lowest noise use rate in a case where the density value of the pixel of interest is equal to or more than the first halftone reference value and equal to or less than the second halftone reference value;

sets the noise use rate to a value which is equal to or more than the lowest noise use rate and equal to or less than 1 and which is gradually decreased from 1 according to a difference between the density value of the pixel of interest and the first highlight reference value in a case where the density value of the pixel of interest is equal to or more than the first highlight reference value and equal to or less than the first halftone reference value;

sets the noise use rate to a value which is equal to or more than the lowest noise use rate and equal to or less than 1 and which is gradually increased from the lowest noise use rate according to a difference between the density value of the pixel of interest and the second halftone reference value in a case where the density value of the pixel of interest is equal to or more than the second halftone reference value and equal to or less than the second shadow reference value;

sets the error use rate to 1 in a case where the density value of the pixel of interest is equal to or more than the second highlight reference value and equal to or less than the first shadow reference value;

sets the error use rate to a value which is equal to or more than 0 and equal to or less than 1 and which is gradually decreased from 1 according to a difference between the second highlight reference value and the density value of the pixel of interest in a case where the density value is equal to or less than the second highlight reference value; and sets the error use rate to a value which is equal to or more than 0 and equal to or less than 1 and which is gradually decreased from 1 according to a difference between the density value of the pixel of interest and the first shadow reference value in a case where the density value of the pixel of interest is equal to or more than the first shadow reference value.

(configuration 13) The storage medium according to configuration 12, wherein the use rate determining process in the case where the degree of variation is smallest:

additionally uses a third highlight reference value which is more than 0 and equal to or less than the first highlight reference value as a reference indicating a density range in the highlighted part;

additionally uses a third shadow reference value which is equal to or more than the second shadow reference value and less than a maximum value in a range available for the density value as a reference indicating a density range in the shadowed part;

sets the error use rate to 0 in a case where the density value of the pixel of interest is equal to or less than the third highlight reference value;

sets the error use rate to a value obtained by dividing a difference between the density value of the pixel of interest and the third highlight reference value by a difference between the second highlight reference value and the third highlight reference value in a case where the density value is equal to or more than the third highlight reference value and equal to or less than the second highlight reference value;

sets the error use rate to a value obtained by dividing a difference between the third shadow reference value and the density value of the pixel of interest by a difference between the third shadow reference value and the first shadow reference value in a case where the density value is equal to or more than the first shadow reference value and equal to or less than the third shadow reference value; and sets the error use rate to 0 in a case where the density value of the pixel of interest is equal to or more than the third shadow reference value.

(configuration 14) An image processing apparatus for performing quantization on a density value of each pixel in an image, the density value indicating density of a color, the image processing apparatus comprising:

a pixel selecting unit configured to sequentially select a pixel of interest to be subjected to the quantization;

a calculating unit configured to calculate a degree of variation in use rate in an area including the pixel of interest and peripheral pixels around the pixel of interest;

a use rate determining unit configured to determine a noise use rate and an error use rate, the use rate determining unit being a unit configured to determine the noise use rate and the error use rate to be applied to the pixel of interest based on the degree of variation and the density value of the pixel of interest, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of the peripheral pixels;

a quantization executing unit configured to perform the quantization on the density value of the pixel of interest, the quantization executing unit being a unit configured to perform the quantization by using a dither matrix noise according to the noise use rate for the pixel of interest, and using the accumulated error according to the error use rate for the pixel of interest;

an error-corrected input value calculating unit configured to calculate an error-corrected input value of the pixel of interest, the error-corrected input value calculating unit being a unit configured to calculate a value, as the error-corrected input value, by adding a product of the error use rate for the pixel of interest and the accumulated error to the density value of the pixel of interest, the error-corrected input value being a density value corrected based on the accumulated error; and a noise-corrected threshold value calculating unit configured to calculate a noise-corrected threshold value for the pixel of interest as a threshold value to be used in the quantization, the noise-corrected threshold value calculating unit being a unit configured to calculate a value, as the noise-corrected threshold value, by adding a product of the noise use rate for the pixel of interest and the dither matrix noise to a preset initial threshold value, the noise-corrected threshold value being a threshold value reflecting the dither matrix noise, wherein the quantization executing unit performs the quantization by comparing the noise-corrected threshold value and the error-corrected input value with each other, in determining the noise use rate and the error use rate, the use rate determining unit if the degree of variation is smallest,
sets the noise use rate in a case where the density value of the pixel of interest is a density value corresponding to a highlighted part or a shadowed part to a value which is more than the noise use rate in a case where the density value of the pixel of interest is a density value corresponding to a halftone part between the highlighted part and the shadowed part, and sets the error use rate in a case where the density value of the pixel of interest is a density value corresponding to the highlighted part or the shadowed part to a value which is less than the error use rate in a case where the density value of the pixel of interest is a density value corresponding to the halftone part, and if the degree of variation is largest, an average error use rate in a range available for the density value, which is a pixel value, and the noise use rate in the range available for the density value are respectively higher and lower than those in the case where the degree of variation is smallest, or the average error use rate in the range available for the density value and the noise use rate in the range available for the density value are respectively lower and higher than those in the case where the degree of variation is smallest.

(configuration 15) An image processing method for performing quantization on a density value of each pixel in an image, the density value indicating density of a color, the image processing method comprising:

a pixel selecting step of sequentially selecting a pixel of interest to be subjected to the quantization;

a calculating step of calculating a degree of variation in use rate in an area including the pixel of interest and peripheral pixels around the pixel of interest;

a use rate determining step of determining a noise use rate and an error use rate, the use rate determining step being a step of determining the noise use rate and the error use rate to be applied to the pixel of interest based on the degree of variation and the density value of the pixel of interest, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of the peripheral pixels;

a quantization executing step of performing the quantization on the density value of the pixel of interest, the quantization executing step being a step of performing the quantization by using a dither matrix noise according to the noise use rate for the pixel of interest, and using the accumulated error according to the error use rate for the pixel of interest;

an error-corrected input value calculating step of calculating an error-corrected input value of the pixel of interest, the error-corrected input value calculating step being a step of calculating a value, as the error-corrected input value, by adding a product of the error use rate for the pixel of interest and the accumulated error to the density value of the pixel of interest, the error-corrected input value being a density value corrected based on the accumulated error; and a noise-corrected threshold value calculating step of calculating a noise-corrected threshold value for the pixel of interest as a threshold value to be used in the quantization, the noise-corrected threshold value calculating step being a step of calculating a value, as the noise-corrected threshold value, by adding a product of the noise use rate for the pixel of interest and the dither matrix noise to a preset initial threshold value, the noise-corrected threshold value being a threshold value reflecting the dither matrix noise, wherein the quantization executing step performs the quantization by comparing the noise-corrected threshold value and the error-corrected input value with each other, in determining the noise use rate and the error use rate, the use rate determining step if the degree of variation is smallest, sets the noise use rate in a case where the density value of the pixel of interest is a density value corresponding to a highlighted part or a shadowed part to a value which is more than the noise use rate in a case where the density value of the pixel of interest is a density value corresponding to a halftone part between the highlighted part and the shadowed part, and sets the error use rate in a case where the density value of the pixel of interest is a density value corresponding to the highlighted part or the shadowed part to a value which is less than the error use rate in a case where the density value of the pixel of interest is a density value corresponding to the halftone part, and if the degree of variation is largest, an average error use rate in a range available for the density value, which is a pixel value, and the noise use rate in the range available for the density value are respectively higher and lower than those in the case where the degree of variation is smallest, or the average error use rate in the range available for the density value and the noise use rate in the range available for the density value are respectively lower and higher than those in the case where the degree of variation is smallest.

(configuration 16) A non-transitory computer readable storage medium storing a program for causing a computer to function as an image processing apparatus for performing quantization on a pixel value of each pixel in an input image, wherein the computer is caused to function as:

a pixel selecting unit configured to select a pixel of interest to be subjected to the quantization;

a use rate determining unit configured to determine a first use rate and a second use rate at least for each of pixels located in a target area including the pixel of interest based on the pixel value of the pixel, the first use rate indicating a degree of influence of a two-dimensional matrix on the quantization, the second use rate indicating a degree of influence of an accumulated error on the quantization, the accumulated error being an accumulated value of quantization error values resulting from the quantization of peripheral pixels around the pixel of interest;

an applied use rate determining unit configured to determine a first applied use rate to be applied in the quantization of the pixel of interest based on the first use rate of each of the pixels located in the target area, and determine a second applied use rate to be applied in the quantization of the pixel of interest based on the second use rate of each of the pixels located in the target area;

an applied error value obtaining unit configured to obtain an applied error value to be applied in the quantization of the pixel of interest based on the accumulated error and the second applied use rate for the pixel of interest;

an accumulated pixel value obtaining unit configured to obtain an accumulated pixel value based on the applied error value and the pixel value of the pixel of interest;

a threshold value obtaining unit configured to obtain a quantization threshold value based on the two-dimensional matrix and the first applied use rate, the quantization threshold value being a threshold value to be applied in the quantization of the pixel of interest; and a quantized value obtaining unit configured to obtain a quantized value and a quantization error value based on the accumulated pixel value and the quantization threshold value.

(configuration 17) The storage medium according to configuration 16, wherein a value of the first use rate for a first pixel value different from an intermediate value is higher than a value of the first use rate for a second pixel value closer to the intermediate value than the first pixel value is, and a value of the second use rate for the first pixel value is lower than a value of the second use rate for the second pixel value.

(configuration 18) The storage medium according to configurations 16 or 17 wherein the target area includes at least 3×3 pixels centered at the pixel of interest.

(configuration 19) The storage medium according to configurations 16 or 17, wherein the first applied use rate is an average value of the first use rates for the pixels in the target area, and the second applied use rate is an average value of the second use rates for the pixels in the target area.

(configuration 20) The storage medium according to configurations 16 or 17, wherein the first applied use rate is a median of the first use rates for the pixels in the target area, and the second applied use rate is a median of the second use rates for the pixels in the target area.

(configuration 21) The storage medium according to configurations 16 or 17, wherein the first applied use rate is a value appearing most frequently among the first use rates for the pixels in the target area, and the second applied use rate is a value appearing most frequently among the second use rates for the pixels in the target area.

(configuration 22) An image processing apparatus comprising:

a pixel-of-interest selecting unit configured to select a pixel of interest to be subjected to quantization from among pixels in an input image;

a use rate determining unit configured to determine a first use rate and a second use rate at least for each of pixels located in a target area including the pixel of interest based on the pixel value of the pixel, the first use rate indicating a degree of influence of a two-dimensional matrix on the quantization, the second use rate indicating a degree of influence of an accumulated error on the quantization, the accumulated error being an accumulated value of quantization error values resulting from the quantization of peripheral pixels around the pixel of interest;

an applied use rate determining unit configured to determine a first applied use rate to be applied in the quantization of the pixel of interest based on the first use rate of each of the pixels located in the target area, and determine a second applied use rate to be applied in the quantization of the pixel of interest based on the second use rate of each of the pixels located in the target area;

an applied error value obtaining unit configured to obtain an applied error value to be applied in the quantization of the pixel of interest based on the accumulated error and the second applied use rate for the pixel of interest;

an accumulated pixel value obtaining unit configured to obtain an accumulated pixel value based on the applied error value and the pixel value of the pixel of interest;

a threshold value obtaining unit configured to obtain a quantization threshold value based on the two-dimensional matrix and the first applied use rate, the quantization threshold value being a threshold value to be applied in the quantization of the pixel of interest; and a quantized value obtaining unit configured to obtain a quantized value and a quantization error value based on the accumulated pixel value and the quantization threshold value.

(configuration 23) An image processing method for an image processing apparatus for performing quantization on a pixel value of each pixel in an input image, the image processing method comprising:

selecting a pixel of interest to be subjected to the quantization;

determining a first use rate and a second use rate at least for each of pixels located in a target area including the pixel of interest based on the pixel value of the pixel, the first use rate indicating a degree of influence of a two-dimensional matrix on the quantization, the second use rate indicating a degree of influence of an accumulated error on the quantization, the accumulated error being an accumulated value of quantization error values resulting from the quantization of peripheral pixels around the pixel of interest;

determining a first applied use rate to be applied in the quantization of the pixel of interest based on the first use rate of each of the pixels located in the target area, and determine a second applied use rate to be applied in the quantization of the pixel of interest based on the second use rate of each of the pixels located in the target area;

obtaining an applied error value to be applied in the quantization of the pixel of interest based on the accumulated error and the second applied use rate for the pixel of interest;

obtaining an accumulated pixel value based on the applied error value and the pixel value of the pixel of interest;

obtaining a quantization threshold value based on the two-dimensional matrix and the first applied use rate, the quantization threshold value being a threshold value to be applied in the quantization of the pixel of interest; and obtaining a quantized value and a quantization error value based on the accumulated pixel value and the quantization threshold value.

(configuration 24) A non-transitory computer readable storage medium storing a program for causing a computer to perform quantization on a density value of each pixel in an image, the density value indicating density of a color, the program causing the computer to execute:

a pixel selecting process of sequentially selecting a pixel to be subjected to the quantization;

a use rate determining process of determining a noise use rate and an error use rate, the use rate determining process being a process of determining the noise use rate and the error use rate corresponding to the density value of the pixel sequentially selected through the pixel selecting process, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of peripheral pixels;

an applied use rate determining process of determining an applied noise use rate and an applied error use rate to be applied in the quantization of the pixel selected through the pixel selecting process from the noise use rates and the error use rates for the pixel selected through the pixel selecting process and the peripheral pixels therearound; and a quantization executing process of performing the quantization on the density value of the pixel sequentially selected through the pixel selecting process, the quantization executing process being a process of performing the quantization by using a dither matrix noise according to the applied noise use rate for the pixel, and using the accumulated error according to the applied error use rate for the pixel, the program causing the computer to additionally execute, on the pixel sequentially selected through the pixel selecting process:

an error-corrected input value calculating process of calculating an error-corrected input value, the error-corrected input value calculating process being a process of calculating a value, as the error-corrected input value, by adding a product of the applied error use rate for the pixel and the accumulated error to the density value of the pixel, the error-corrected input value being a density value corrected based on the accumulated error; and a noise-corrected threshold value calculating process of calculating a noise-corrected threshold value as a threshold value to be used in the quantization, the noise-corrected threshold value calculating process being a process of calculating a value, as the noise-corrected threshold value, by adding a product of the applied noise use rate for the pixel and the dither matrix noise to a preset initial threshold value, the noise-corrected threshold value being a threshold value reflecting the dither matrix noise, wherein the quantization executing process performs the quantization by comparing the noise-corrected threshold value and the error-corrected input value with each other, in determining the noise use rate and the error use rate, the use rate determining process sets the noise use rate in a case where the density value of the pixel is a density value corresponding to a highlighted part or a shadowed part to a value which is more than the noise use rate in a case where the density value of the pixel is a density value corresponding to a halftone part between the highlighted part and the shadowed part, and sets the error use rate in a case where the density value of the pixel is a density value corresponding to the highlighted part or the shadowed part to a value which is less than the error use rate in a case where the density value of the pixel is a density value corresponding to the halftone part.

(configuration 25) The storage medium according to configuration 24, wherein the quantization executing process includes:

a maximum value determining process of determining whether the density value of the pixel, which is an input value of the quantization, is equal to a maximum value in a range available for the density value;

a minimum value determining process of determining whether the density value of the pixel, which is the input value, is equal to a minimum value in the range available for the density value; and a quantized value obtaining process of obtaining a quantized value being a result of the quantization, if it is determined in the maximum value determining process that the input value is equal to the maximum value, the quantized value obtaining process obtains a value to be output in a case where the density value is more than the threshold value as the quantized value, and if it is determined in the minimum value determining process that the input value is equal to the minimum value, the quantized value obtaining process obtains a value to be output in a case where the density value is less than the threshold value as the quantized value.

(configuration 26) The storage medium according to configurations 24 or 25, wherein the use rate determining process sets the noise use rate to a value equal to or more than a lowest noise use rate regardless of the density value of the pixel, the lowest noise use rate being set to a value more than 0 in advance.

(configuration 27) The storage medium according to configuration 26, wherein the use rate determining process:

uses a preset first highlight reference value and a preset second highlight reference value which is more than the first highlight reference value as references indicating a density range in the highlighted part;

uses a preset first shadow reference value and a preset second shadow reference value which is more than the first shadow reference value as references indicating a density range in the shadowed part;

uses a first halftone reference value which is more than the second highlight reference value and less than the first shadow reference value and a second halftone reference value which is more than the first halftone reference value and less than the first shadow reference value as references indicating a density range at a center of the halftone part;

sets the noise use rate to 1 in a case where the density value of the pixel is equal to or less than the first highlight reference value or equal to or more than the second shadow reference value;

sets the noise use rate to the lowest noise use rate in a case where the density value of the pixel is equal to or more than the first halftone reference value and equal to or less than the second halftone reference value;

sets the noise use rate to a value which is equal to or more than the lowest noise use rate and equal to or less than 1 and which is gradually decreased from 1 according to a difference between the density value of the pixel and the first highlight reference value in a case where the density value of the pixel is equal to or more than the first highlight reference value and equal to or less than the first halftone reference value;

sets the noise use rate to a value which is equal to or more than the lowest noise use rate and equal to or less than 1 and which is gradually increased from the lowest noise use rate according to a difference between the density value of the pixel and the second halftone reference value in a case where the density value of the pixel is equal to or more than the second halftone reference value and equal to or less than the second shadow reference value;

sets the error use rate to 1 in a case where the density value of the pixel is equal to or more than the second highlight reference value and equal to or less than the first shadow reference value;

sets the error use rate to a value which is equal to or more than 0 and equal to or less than 1 and which is gradually decreased from 1 according to a difference between the second highlight reference value and the density value of the pixel in a case where the density value is equal to or less than the second highlight reference value; and sets the error use rate to a value which is equal to or more than 0 and equal to or less than 1 and which is gradually decreased from 1 according to a difference between the density value of the pixel and the first shadow reference value in a case where the density value of the pixel is equal to or more than the first shadow reference value.

(configuration 28) The storage medium according to configuration 27, wherein the use rate determining process:

additionally uses a third highlight reference value which is more than 0 and equal to or less than the first highlight reference value as a reference indicating a density range in the highlighted part;

additionally uses a third shadow reference value which is equal to or more than the second shadow reference value and less than a maximum value in a range available for the density value as a reference indicating a density range in the shadowed part;

sets the error use rate to 0 in a case where the density value of the pixel is equal to or less than the third highlight reference value;

sets the error use rate to a value obtained by dividing a difference between the density value of the pixel and the third highlight reference value by a difference between the second highlight reference value and the third highlight reference value in a case where the density value is equal to or more than the third highlight reference value and equal to or less than the second highlight reference value;

sets the error use rate to a value obtained by dividing a difference between the third shadow reference value and the density value of the pixel by a difference between the third shadow reference value and the first shadow reference value in a case where the density value is equal to or more than the first shadow reference value and equal to or less than the third shadow reference value; and sets the error use rate to 0 in a case where the density value of the pixel is equal to or more than the third shadow reference value.

(configuration 29) An image processing apparatus for performing quantization on a density value of each pixel in an image, the density value indicating density of a color, the image processing apparatus comprising:

a pixel selecting unit configured to sequentially select a pixel to be subjected to the quantization;

a use rate determining unit configured to determine a noise use rate and an error use rate, the use rate determining unit being a unit configured to determine the noise use rate and the error use rate corresponding to the density value of the pixel sequentially selected by the pixel selecting unit, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of peripheral pixels;

an applied use rate determining unit configured to determine an applied noise use rate and an applied error use rate to be applied in the quantization of the pixel selected by the pixel selecting unit from the noise use rates and the error use rates for the pixel selected by the pixel selecting unit and the peripheral pixels therearound;

a quantization executing unit configured to perform the quantization on the density value of the pixel sequentially selected by the pixel selecting unit, the quantization executing unit being a unit configured to perform the quantization by using a dither matrix noise according to the applied noise use rate for the pixel, and using the accumulated error according to the applied error use rate for the pixel;

an error-corrected input value calculating unit configured to calculate an error-corrected input value of the pixel sequentially selected by the pixel selecting unit, the error-corrected input value calculating unit being a unit configured to calculate a value, as the error-corrected input value, by adding a product of the applied error use rate for the pixel and the accumulated error to the density value of the pixel, the error-corrected input value being a density value corrected based on the accumulated error; and a noise-corrected threshold value calculating unit configured to calculate a noise-corrected threshold value for the pixel sequentially selected by the pixel selecting unit as a threshold value to be used in the quantization, the noise-corrected threshold value calculating unit being a unit configured to calculate a value, as the noise-corrected threshold value, by adding a product of the applied noise use rate for the pixel and the dither matrix noise to a preset initial threshold value, the noise-corrected threshold value being a threshold value reflecting the dither matrix noise, wherein the quantization executing unit performs the quantization by comparing the noise-corrected threshold value and the error-corrected input value with each other, in determining the noise use rate and the error use rate, the use rate determining unit sets the noise use rate in a case where the density value of the pixel is a density value corresponding to a highlighted part or a shadowed part to a value which is more than the noise use rate in a case where the density value of the pixel is a density value corresponding to a halftone part between the highlighted part and the shadowed part, and sets the error use rate in a case where the density value of the pixel is a density value corresponding to the highlighted part or the shadowed part to a value which is less than the error use rate in a case where the density value of the pixel is a density value corresponding to the halftone part.

(configuration 30) An image processing method for performing quantization on a density value of each pixel in an image, the density value indicating density of a color, the image processing method comprising:

a pixel selecting step of sequentially selecting a pixel to be subjected to the quantization;

a use rate determining step of determining a noise use rate and an error use rate, the use rate determining step being a step of determining the noise use rate and the error use rate for the pixel sequentially selected in the pixel selecting step based on the density value of the pixel, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of peripheral pixels;

an applied use rate determining step of determining an applied noise use rate and an applied error use rate to be applied in the quantization of the pixel selected in the pixel selecting step from the noise use rates and the error use rates for the pixel selected in the pixel selecting step and the peripheral pixels therearound;

a quantization executing step of performing the quantization on the density value of the pixel sequentially selected in the pixel selecting step, the quantization executing step being a step of performing the quantization by using a dither matrix noise according to the applied noise use rate for the pixel, and using the accumulated error according to the applied error use rate for the pixel;

an error-corrected input value calculating step of calculating an error-corrected input value of the pixel sequentially selected in the pixel selecting step, the error-corrected input value calculating step being a step of calculating a value, as the error-corrected input value, by adding a product of the applied error use rate for the pixel and the accumulated error to the density value of the pixel, the error-corrected input value being a density value corrected based on the accumulated error; and a noise-corrected threshold value calculating step of calculating a noise-corrected threshold value for the pixel sequentially selected in the pixel selecting step as a threshold value to be used in the quantization, the noise-corrected threshold value calculating step being a step of calculating a value, as the noise-corrected threshold value, by adding a product of the applied noise use rate for the pixel and the dither matrix noise to a preset initial threshold value, the noise-corrected threshold value being a threshold value reflecting the dither matrix noise, wherein the quantization executing step performs the quantization by comparing the noise-corrected threshold value and the error-corrected input value with each other, in determining the noise use rate and the error use rate, the use rate determining step sets the noise use rate in a case where the density value of the pixel is a density value corresponding to a highlighted part or a shadowed part to a value which is more than the noise use rate in a case where the density value of the pixel is a density value corresponding to a halftone part between the highlighted part and the shadowed part, and sets the error use rate in a case where the density value of the pixel is a density value corresponding to the highlighted part or the shadowed part to a value which is less than the error use rate in a case where the density value of the pixel is a density value corresponding to the halftone part.

(configuration 31) A non-transitory computer readable storage medium storing a program for causing a computer to function as an image processing apparatus for performing quantization on a pixel value of each pixel in an input image, wherein the computer is caused to function as:

a pixel selecting unit configured to select a pixel of interest to be subjected to the quantization;

an area value obtaining unit configured to obtain an area value for the pixel of interest based on the pixel values of pixels located in a target area including the pixel of interest;

a use rate determining unit configured to determine a first use rate and a second use rate based on the area value, the first use rate indicating a degree of influence of a two-dimensional matrix on the quantization, the second use rate indicating a degree of influence of an accumulated error on the quantization, the accumulated error being an accumulated value of quantization error values resulting from the quantization of peripheral pixels around the pixel of interest;

an applied error value obtaining unit configured to obtain an applied error value to be applied in the quantization of the pixel of interest based on the accumulated error and the second use rate for the pixel of interest;

an accumulated pixel value obtaining unit configured to obtain an accumulated pixel value based on the applied error value and the pixel value of the pixel of interest;

a threshold value obtaining unit configured to obtain a quantization threshold value based on the two-dimensional matrix and the first use rate, the quantization threshold value being a threshold value to be applied in the quantization of the pixel of interest; and a quantized value obtaining unit configured to obtain a quantized value and a quantization error value based on the accumulated pixel value and the quantization threshold value.

(configuration 32) The storage medium according to configuration 31, wherein a value of the first use rate for a first area value with which the pixel values of all of the pixels in the target area are a first pixel value different from an intermediate value is higher than a value of the first use rate for a second area value with which the pixel values are a second pixel value closer to the intermediate value than the first pixel value is, and a value of the second use rate for the first area value is lower than a value of the second use rate for the second area value.

(configuration 33) The storage medium according to configurations 31 or 32, wherein the target area includes at least 3×3 pixels centered at the pixel of interest.

(configuration 34) The storage medium according to configurations 31 or 32, wherein the area value is a value obtained by smoothing the pixel values of the pixels in the target area.

(configuration 35) The storage medium according to configuration 34, wherein the area value is an average value of the pixel values of the pixels in the target area.

(configuration 36) The storage medium according to configuration 34, wherein the area value is a median of the pixel values of the pixels in the target area.

(configuration 37) The storage medium according to configuration 34, wherein the area value is a value appearing most frequently among the pixel values of the pixels in the target area.

(configuration 38) The storage medium according to configurations 31 or 32, wherein the area value is a value obtained from the pixel values of the pixels in the target area with the density value of the pixel of interest amplified.

(configuration 39) The storage medium according to configuration 38, wherein the area value is obtained using an edge enhancement filter.

(configuration 40) An image processing apparatus comprising:
- a pixel-of-interest selecting unit configured to select a pixel of interest to be subjected to quantization from among pixels in an input image;
- an area value obtaining unit configured to obtain an area value for the pixel of interest based on the pixel values of pixels located in a target area including the pixel of interest;
- a use rate determining unit configured to determine a first use rate and a second use rate based on the area value, the first use rate indicating a degree of influence of a two-dimensional matrix on the quantization, the second use rate indicating a degree of influence of an accumulated error on the quantization, the accumulated error being an accumulated value of quantization error values resulting from the quantization of peripheral pixels around the pixel of interest;
- an applied error value obtaining unit configured to obtain an applied error value to be applied in the quantization of the pixel of interest based on the accumulated error and the second use rate for the pixel of interest;
- an accumulated pixel value obtaining unit configured to obtain an accumulated pixel value based on the applied error value and the pixel value of the pixel of interest;
- a threshold value obtaining unit configured to obtain a quantization threshold value based on the two-dimensional matrix and the first use rate, the quantization threshold value being a threshold value to be applied in the quantization of the pixel of interest; and
- a quantized value obtaining unit configured to obtain a quantized value and a quantization error value based on the accumulated pixel value and the quantization threshold value.

(configuration 41) An image processing method for an image processing apparatus for performing quantization on a pixel value of each pixel in an input image, the image processing method comprising:
- selecting a pixel of interest to be subjected to the quantization;
- obtaining an area value for the pixel of interest based on the pixel values of pixels located in a target area including the pixel of interest;
- determining a first use rate and a second use rate based on the area value, the first use rate indicating a degree of influence of a two-dimensional matrix on the quantization, the second use rate indicating a degree of influence of an accumulated error on the quantization, the accumulated error being an accumulated value of quantization error values resulting from the quantization of peripheral pixels around the pixel of interest;
- obtaining an applied error value to be applied in the quantization of the pixel of interest based on the accumulated error and the second use rate for the pixel of interest;
- obtaining an accumulated pixel value based on the applied error value and the pixel value of the pixel of interest;
- obtaining a quantization threshold value based on the two-dimensional matrix and the first use rate, the quantization threshold value being a threshold value to be applied in the quantization of the pixel of interest; and
- obtaining a quantized value and a quantization error value based on the accumulated pixel value and the quantization threshold value.

(configuration 42) A non-transitory computer readable storage medium storing a program for causing a computer to perform quantization on a density value of each pixel in an image, the density value indicating density of a color, the program causing the computer to execute:
- a pixel selecting process of sequentially selecting a pixel to be subjected to the quantization;
- an area value obtaining process of obtaining an area value for the pixel sequentially selected through the pixel selecting process based on the density values of pixels located in a target area including the pixel sequentially selected through the pixel selecting process;
- a use rate determining process of determining a noise use rate and an error use rate, the use rate determining process being a process of determining the noise use rate and the error use rate for the pixel sequentially selected through the pixel selecting process based on the area value obtained through the area value obtaining process, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of peripheral pixels; and
- a quantization executing process of performing the quantization on the density value of the pixel sequentially selected through the pixel selecting process, the quantization executing process being a process of performing the quantization by using a dither matrix noise according to the noise use rate for the pixel, and using the accumulated error according to the error use rate for the pixel, the program causing the computer to additionally execute, on the pixel sequentially selected through the pixel selecting process:
- an error-corrected input value calculating process of calculating an error-corrected input value, the error-corrected input value calculating process being a process of calculating a value, as the error-corrected input value, by adding a product of the error use rate for the pixel and the accumulated error to the density value of the pixel, the error-corrected input value being a density value corrected based on the accumulated error; and
- a noise-corrected threshold value calculating process of calculating a noise-corrected threshold value as a threshold value to be used in the quantization, the noise-corrected threshold value calculating process being a process of calculating a value, as the noise-corrected threshold value, by adding a product of the noise use rate for the pixel and the dither matrix noise to a preset initial threshold value, the noise-corrected threshold value being a threshold value reflecting the dither matrix noise, wherein the quantization executing process performs the quantization by comparing the noise-corrected threshold value and the error-corrected input value with each other, in determining the noise use rate and the error use rate, the use rate determining process sets the noise use rate that is based on the area value with which the density values of the pixels in the target area are a density value corresponding to a highlighted part or a shadowed part to a value which is more than the noise use rate that is based on the area value with which the density values of the pixels in the target area are a density value corresponding to a halftone part between the highlighted part and the shadowed part, and sets the error use rate that is based on the area value with which the density values of the pixels in the target area are a density value corresponding to a highlighted part or a shadowed part to a value which is less than the error use rate that is based on the area value with which the density values of the pixels in the target area are a density value corresponding to the halftone part.

(configuration 43) The storage medium according to configuration 42, wherein the area value obtaining process obtains a value obtained by smoothing the density values of the pixels located in the target area as the area value.

(configuration 44) The storage medium according to configuration 42, wherein the area value obtaining process obtains a value as the area value from the density values of the pixels located in the target area with the density value of the pixel sequentially selected through the pixel selecting process amplified.

(configuration 45) The storage medium according to any one of configurations 42 to 44, wherein the quantization executing process includes:
  a maximum value determining process of determining whether the density value of the pixel, which is an input value of the quantization, is equal to a maximum value in a range available for the density value;
  a minimum value determining process of determining whether the density value of the pixel, which is the input value, is equal to a minimum value in the range available for the density value; and
  a quantized value obtaining process of obtaining a quantized value being a result of the quantization,
if it is determined in the maximum value determining process that the input value is equal to the maximum value, the quantized value obtaining process obtains a value to be output in a case where the density value is more than the threshold value as the quantized value, and
if it is determined in the minimum value determining process that the input value is equal to the minimum value, the quantized value obtaining process obtains a value to be output in a case where the density value is less than the threshold value as the quantized value.

(configuration 46) The storage medium according to any one of configurations 42 to 44, wherein the use rate determining process sets the noise use rate to a value equal to or more than a lowest noise use rate regardless of the area value, the lowest noise use rate being set to a value more than 0 in advance.

(configuration 47) The storage medium according to configuration 46, wherein the use rate determining process:
  uses a preset first highlight reference value and a preset second highlight reference value which is more than the first highlight reference value as references indicating a range of the area value in the highlighted part;
  uses a preset first shadow reference value and a preset second shadow reference value which is more than the first shadow reference value as references indicating a range of the area value in the shadowed part;
  uses a first halftone reference value which is more than the second highlight reference value and less than the first shadow reference value and a second halftone reference value which is more than the first halftone reference value and less than the first shadow reference value as references indicating a range of the area value at a center of the halftone part;
  sets the noise use rate to 1 in a case where the area value is equal to or less than the first highlight reference value or equal to or more than the second shadow reference value;
  sets the noise use rate to the lowest noise use rate in a case where the area value is equal to or more than the first halftone reference value and equal to or less than the second halftone reference value;
  sets the noise use rate to a value which is equal to or more than the lowest noise use rate and equal to or less than 1 and which is gradually decreased from 1 according to a difference between the area value and the first highlight reference value in a case where the area value is equal to or more than the first highlight reference value and equal to or less than the first halftone reference value;
  sets the noise use rate to a value which is equal to or more than the lowest noise use rate and equal to or less than 1 and which is gradually increased from the lowest noise use rate according to a difference between the area value and the second halftone reference value in a case where the area value is equal to or more than the second halftone reference value and equal to or less than the second shadow reference value;
  sets the error use rate to 1 in a case where the area value is equal to or more than the second highlight reference value and equal to or less than the first shadow reference value;
  sets the error use rate to a value which is equal to or more than 0 and equal to or less than 1 and which is gradually decreased from 1 according to a difference between the second highlight reference value and the area value in a case where the area value is equal to or less than the second highlight reference value; and
  sets the error use rate to a value which is equal to or more than 0 and equal to or less than 1 and which is gradually decreased from 1 according to a difference between the area value and the first shadow reference value in a case where the area value is equal to or more than the first shadow reference value.

(configuration 48) The storage medium according to configuration 47, wherein the use rate determining process:
  additionally uses a third highlight reference value which is more than 0 and equal to or less than the first highlight reference value as a reference indicating a range of the area value in the highlighted part;
  additionally uses a third shadow reference value which is equal to or more than the second shadow reference value and less than a maximum value in a range available for the area value as a reference indicating a range of the area value in the shadowed part;
  sets the error use rate to 0 in a case where the area value is equal to or less than the third highlight reference value;
  sets the error use rate to a value obtained by dividing a difference between the area value and the third highlight reference value by a difference between the second highlight reference value and the third highlight reference value in a case where the area value is equal to or more than the third highlight reference value and equal to or less than the second highlight reference value;

sets the error use rate to a value obtained by dividing a difference between the third shadow reference value and the area value by a difference between the third shadow reference value and the first shadow reference value in a case where the area value is equal to or more than the first shadow reference value and equal to or less than the third shadow reference value; and sets the error use rate to 0 in a case where the area value is equal to or more than the third shadow reference value.

(configuration 49) An image processing apparatus for performing quantization on a density value of each pixel in an image, the density value indicating density of a color, the image processing apparatus comprising:

a pixel selecting unit configured to sequentially select a pixel to be subjected to the quantization;

an area value obtaining unit configured to obtain an area value for the pixel sequentially selected by the pixel selecting unit based on the density values of pixels located in a target area including the pixel sequentially selected by the pixel selecting unit;

a use rate determining unit configured to determine a noise use rate and an error use rate, the use rate determining unit being a unit configured to determine the noise use rate and the error use rate for the pixel sequentially selected by the pixel selecting unit based on the area value obtained by the area value obtaining unit, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of peripheral pixels;

a quantization executing unit configured to perform the quantization on the density value of the pixel sequentially selected by the pixel selecting unit, the quantization executing unit being a unit configured to perform the quantization by using a dither matrix noise according to the noise use rate for the pixel, and using the accumulated error according to the error use rate for the pixel;

an error-corrected input value calculating unit configured to calculate an error-corrected input value of the pixel sequentially selected by the pixel selecting unit, the error-corrected input value calculating unit being a unit configured to calculate a value, as the error-corrected input value, by adding a product of the error use rate for the pixel and the accumulated error to the density value of the pixel, the error-corrected input value being a density value corrected based on the accumulated error; and a noise-corrected threshold value calculating unit configured to calculate a noise-corrected threshold value for the pixel sequentially selected by the pixel selecting unit as a threshold value to be used in the quantization, the noise-corrected threshold value calculating unit being a unit configured to calculate a value, as the noise-corrected threshold value, by adding a product of the noise use rate for the pixel and the dither matrix noise to a preset initial threshold value, the noise-corrected threshold value being a threshold value reflecting the dither matrix noise, wherein the quantization executing unit performs the quantization by comparing the noise-corrected threshold value and the error-corrected input value with each other, in determining the noise use rate and the error use rate, the use rate determining unit sets the noise use rate that is based on the area value with which the density values of the pixels in the target area are a density value corresponding to a highlighted part or a shadowed part to a value which is more than the noise use rate that is based on the area value with which the density values of the pixels in the target area are a density value corresponding to a halftone part between the highlighted part and the shadowed part, and sets the error use rate that is based on the area value with which the density values of the pixels in the target area are a density value corresponding to a highlighted part or a shadowed part to a value which is less than the error use rate that is based on the area value with which the density values of the pixels in the target area are a density value corresponding to the halftone part.

(configuration 50) An image processing method for performing quantization on a density value of each pixel in an image, the density value indicating density of a color, the image processing method comprising:

a pixel selecting step of sequentially selecting a pixel to be subjected to the quantization;

an area value obtaining step of obtaining an area value for the pixel sequentially selected in the pixel selecting step based on the density values of pixels located in a target area including the pixel selected in the pixel selecting step;

a use rate determining step of determining a noise use rate and an error use rate, the use rate determining step being a step of determining the noise use rate and the error use rate for the pixel sequentially selected in the pixel selecting step based on the area value obtained in the area value obtaining step, the noise use rate indicating a degree of influence of a dither matrix noise on processing of the quantization, the dither matrix noise being a noise designated by a preset dither matrix, the error use rate indicating a degree of influence of an accumulated error on the processing of the quantization, the accumulated error being obtained by accumulating quantization errors being errors resulting from the quantization of peripheral pixels;

a quantization executing step of performing the quantization on the density value of the pixel sequentially selected in the pixel selecting step, the quantization executing step being a step of performing the quantization by using a dither matrix noise according to the noise use rate for the pixel, and using the accumulated error according to the error use rate for the pixel;

an error-corrected input value calculating step of calculating an error-corrected input value of the pixel sequentially selected in the pixel selecting step, the error-corrected input value calculating step being a step of calculating a value, as the error-corrected input value, by adding a product of the error use rate for the pixel and the accumulated error to the density value of the pixel, the error-corrected input value being a density value corrected based on the accumulated error; and a noise-corrected threshold value calculating step of calculating a noise-corrected threshold value for the pixel sequentially selected in the pixel selecting step as a threshold value to be used in the quantization, the noise-corrected threshold value calculating step being a step of calculating a value, as the noise-corrected threshold value, by adding a product of the noise use rate for the pixel and the dither matrix noise to a preset initial threshold value, the noise-corrected threshold value being a threshold value reflecting the dither matrix noise, wherein the quantization executing step performs the quantization by comparing the noise-corrected threshold value and the error-corrected input value with each other, in determining the noise use rate and the error use rate, the use rate determining step sets the noise use rate that is based on the area value with which the density values of the pixels in the target area are a density value corresponding to a highlighted part or a shadowed part to a value which is more than the noise use rate that is based on the area value with which the density values of the pixels in the target area are a density value corresponding to a halftone part between the highlighted part and the shadowed part, and sets the error use rate that is based on the area value with which the density values of the pixels in the target area are a density value corresponding to a highlighted part or a shadowed part to a value which is less than the error use rate that is based on the area value with which the density values of the pixels in the target area are a density value corresponding to the halftone part.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to maintain density as an area as compared to the conventional technology even in a case where the quantization target is an image of a high-frequency pattern, such as a hatching pattern, with a halftone value to be subjected to an error diffusion process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-122675, No. 2022-122595, No. 2022-122596, and No. 2022-122729, filed Aug. 1, 2022, which are hereby incorporated by reference wherein in its entirety.

What is claimed is:

1. A non-transitory computer readable storage medium storing a program for causing a computer to perform quantization on a density value of each pixel in an input image, the density value indicating density of a color, the quantization comprising:

a pixel selecting process of sequentially selecting a pixel of interest to be subjected to the quantization;

a use rate determining process of determining a first use rate and a second use rate based on the density value of the pixel of interest, the first use rate indicating a degree of influence of a dither matrix noise on the quantization of the pixel of interest, the dither matrix noise being a noise designated by a preset dither matrix, the second use rate indicating a degree of influence of an accumulated error on the quantization of the pixel of interest, the accumulated error being obtained by accumulating quantization errors resulting from the quantization of peripheral pixels;

a quantization executing process of quantizing the density value of the pixel of interest by using a dither matrix noise according to the first use rate for the pixel of interest and using the accumulated error according to the second use rate for the pixel of interest; and an adding process of adding at least part of the accumulated error not used in the quantization of the pixel of interest to a quantization error resulting from the quantization of the pixel of interest.

2. The storage medium according to claim 1, wherein the adding process adds an entire part of the accumulated error not used in the quantization of the pixel of interest to the quantization error resulting from the quantization of the pixel of interest.

3. The storage medium according to claim 1, wherein the quantization executing process:

obtains a threshold value to be used in the quantization of the pixel of interest based on the dither matrix and the first use rate;

obtains an applied error value to be applied in the quantization of the pixel of interest based on the accumulated error and the second use rate for the pixel of interest; and executes the quantization based on the threshold value, the applied error value, and a pixel value of the pixel of interest.

4. The storage medium according to claim 3, wherein the quantization executing process calculates a quantized value based on a comparison between a corrected pixel value and the threshold value, the corrected pixel value obtained by correcting the pixel value of the pixel of interest by using the applied error value.

5. The storage medium according to claim 4, wherein in the quantization executing process, the quantization error resulting from the quantization of the pixel of interest is a difference between the corrected pixel value and the threshold value.

6. The storage medium according to claim 1, wherein in the quantization executing process, the accumulated error not used in the quantization of the pixel of interest is a product of an error non-use rate and the accumulated error, the error non-use rate being obtained by subtracting the second use rate from 1.

7. The storage medium according to claim 1, wherein a value of the first use rate in a case where the density value of the pixel of interest is a first pixel value differing from an intermediate value is more than a value of the first use rate in a case where the density value of the pixel of interest is a second pixel value closer to the intermediate value than the first pixel value is.

8. The storage medium according to claim 1, wherein a value of the second use rate in a case where the density value of the pixel of interest is a first pixel value differing from an intermediate value is less than a value of the second use rate in a case where the density value of the pixel of interest is a second pixel value closer to the intermediate value than the first pixel value is.

9. The storage medium according to claim 1, wherein
in determining the first use rate and the second use rate, the use rate determining process
sets the first use rate in a case where the density value of the pixel of interest is a density value corresponding to a highlighted part or a shadowed part to a value which is more than the first use rate in a case where the density value of the pixel of interest is a density value corresponding to a halftone part between the highlighted part and the shadowed part, and
sets the second use rate in a case where the density value of the pixel of interest is a density value corresponding to the highlighted part or the shadowed part to a value which is less than the second use rate in a case where the density value of the pixel is a density value corresponding to the halftone part, and
the quantization executing process additionally adds at least part of a difference between the accumulated error and a product of the second use rate and the accumulated error to the quantization error resulting from the quantization of the pixel of interest.

10. The storage medium according to claim 1, wherein the quantization executing process includes:
a maximum value determining process of determining whether the density value of the pixel of interest, which is an input value of the quantization of the pixel of interest, is equal to a maximum value in a range available for the density value;
a minimum value determining process of determining whether the density value of the pixel of interest, which is the input value, is equal to a minimum value in the range available for the density value; and
a quantized value obtaining process of obtaining a quantized value being a result of the quantization,
if it is determined in the maximum value determining process that the input value is equal to the maximum value, the quantized value obtaining process obtains a value to be output in a case where the density value is more than the threshold value as the quantized value, and
if it is determined in the minimum value determining process that the input value is equal to the minimum value, the quantized value obtaining process obtains a value to be output in a case where the density value is less than the threshold value as the quantized value.

11. The storage medium according to claim 1, wherein the use rate determining process sets the first use rate to a value equal to or more than a lowest first use rate regardless of the density value of the pixel of interest, the lowest first use rate being set to a value more than 0 in advance.

12. The storage medium according to claim 11, wherein the use rate determining process:
uses a preset first highlight reference value and a preset second highlight reference value which is more than the first highlight reference value as references indicating a density range in the highlighted part;
uses a preset first shadow reference value and a preset second shadow reference value which is more than the first shadow reference value as references indicating a density range in the shadowed part;
uses a first halftone reference value which is more than the second highlight reference value and less than the first shadow reference value and a second halftone reference value which is more than the first halftone reference value and less than the first shadow reference value as references indicating a density range at a center of the halftone part;
sets the noise use rate to 1 in a case where the density value of the pixel of interest is equal to or less than the first highlight reference value or equal to or more than the second shadow reference value;
sets the first use rate to the lowest first use rate in a case where the density value of the pixel of interest is equal to or more than the first halftone reference value and equal to or less than the second halftone reference value;
sets the first use rate to a value which is equal to or more than the lowest first use rate and equal to or less than 1 and which is gradually decreased from 1 according to a difference between the density value of the pixel of interest and the first highlight reference value in a case where the density value of the pixel of interest is equal to or more than the first highlight reference value and equal to or less than the first halftone reference value;
sets the first use rate to a value which is equal to or more than the lowest first use rate and equal to or less than 1 and which is gradually increased from the lowest first use rate according to a difference between the density value of the pixel of interest and the second halftone reference value in a case where the density value of the pixel of interest is equal to or more than the second halftone reference value and equal to or less than the second shadow reference value;
sets the second use rate to 1 in a case where the density value of the pixel of interest is equal to or more than the second highlight reference value and equal to or less than the first shadow reference value;
sets the second use rate to a value which is equal to or more than 0 and equal to or less than 1 and which is gradually decreased from 1 according to a difference between the second highlight reference value and the density value of the pixel of interest in a case where the density value is equal to or less than the second highlight reference value; and
sets the second use rate to a value which is equal to or more than 0 and equal to or less than 1 and which is gradually decreased from 1 according to a difference between the density value of the pixel of interest and the first shadow reference value in a case where the density value of the pixel of interest is equal to or more than the first shadow reference value.

13. The storage medium according to claim 12, wherein the use rate determining process:
   additionally uses a third highlight reference value which is more than 0 and equal to or less than the first highlight reference value as a reference indicating a density range in the highlighted part;
   additionally uses a third shadow reference value which is equal to or more than the second shadow reference value and less than a maximum value in a range available for the density value as a reference indicating a density range in the shadowed part;
   sets the error use rate to 0 in a case where the density value of the pixel is equal to or less than the third highlight reference value;
   sets the second use rate to a value obtained by dividing a difference between the density value of the pixel of interest and the third highlight reference value by a difference between the second highlight reference value and the third highlight reference value in a case where the density value is equal to or more than the third highlight reference value and equal to or less than the second highlight reference value;
   sets the second use rate to a value obtained by dividing a difference between the third shadow reference value and the density value of the pixel of interest by a difference between the third shadow reference value and the first shadow reference value in a case where the density value is equal to or more than the first shadow reference value and equal to or less than the third shadow reference value; and
   sets the second use rate to 0 in a case where the density value of the pixel of interest is equal to or more than the third shadow reference value.

14. The storage medium according to claim 13, wherein the use rate determining process is a process of additionally determining an error propagation rate indicating a degree of influence of the quantization error being an error resulting from the quantization of the pixel of interest on the quantization of the peripheral pixels, and the use rate determining process
   determines the error propagation rate for the pixel of interest based on the density value of the pixel of interest, and
   in determining the error propagation rate, sets the error propagation rate in a case where the density value of the pixel of interest is a density value corresponding to the highlighted part or the shadowed part to a value which is less than the error propagation rate in a case where the density value of the pixel of interest is a density value corresponding to the halftone part.

15. An image processing apparatus for performing quantization on a density value of each pixel in an input image, the density value indicating density of a color, the image processing apparatus comprising:
   a pixel selecting unit configured to sequentially select a pixel of interest to be subjected to the quantization;
   a use rate determining unit configured to determine a first use rate and a second use rate based on the density value of the pixel of interest, the first use rate indicating a degree of influence of a dither matrix noise on the quantization of the pixel of interest, the dither matrix noise being a noise designated by a preset dither matrix, the second use rate indicating a degree of influence of an accumulated error on the quantization of the pixel of interest, the accumulated error being obtained by accumulating quantization errors resulting from the quantization of peripheral pixels;
   a quantization executing unit configured to quantize the density value of the pixel of interest by using a dither matrix noise according to the first use rate for the pixel of interest and using the accumulated error according to the second use rate for the pixel of interest; and
   an adding unit configured to add at least part of the accumulated error not used in the quantization of the pixel of interest to a quantization error resulting from the quantization of the pixel of interest.

16. The image processing apparatus according to claim 15, wherein the adding unit adds an entire part of the accumulated error not used in the quantization of the pixel of interest to the quantization error resulting from the quantization of the pixel of interest.

17. The image processing apparatus according to claim 15, wherein in the quantization executing unit:
   obtains a threshold value to be used in the quantization of the pixel of interest based on the dither matrix and the first use rate;
   obtains an applied error value to be applied in the quantization of the pixel of interest based on the accumulated error and the second use rate for the pixel of interest; and
   executes the quantization based on the threshold value, the applied error value, and a pixel value of the pixel of interest.

18. The image processing apparatus according to claim 17, wherein the quantization executing unit calculates a quantized value based on a comparison between a corrected pixel value and the threshold value, the corrected pixel value obtained by correcting the pixel value of the pixel of interest by using the applied error value.

19. The image processing apparatus according to claim 18, wherein the quantization error resulting from the quantization of the pixel of interest is a difference between the corrected pixel value and the threshold value.

20. The image processing apparatus according to claim 15, wherein the accumulated error not used in the quantization of the pixel of interest is a product of an error non-use rate and the accumulated error, the error non-use rate being obtained by subtracting the second use rate from 1.

21. The image processing apparatus according to claim 15, wherein a value of the first use rate in a case where the density value of the pixel of interest is a first pixel value differing from an intermediate value is more than a value of the first use rate in a case where the density value of the pixel of interest is a second pixel value closer to the intermediate value than the first pixel value is.

22. The image processing apparatus according to claim 15, wherein a value of the second use rate in a case where the density value of the pixel of interest is a first pixel value differing from an intermediate value is less than a value of the second use rate in a case where the density value of the pixel of interest is a second pixel value closer to the intermediate value than the first pixel value is.

23. The image processing apparatus according to claim 15, wherein
   in determining the first use rate and the second use rate, the use rate determining unit
      sets the first use rate in a case where the density value of the pixel of interest is a density value corresponding to a highlighted part or a shadowed part to a value which is more than the first use rate in a case where the density value of the pixel of interest is a density value corresponding to a halftone part between the highlighted part and the shadowed part, and sets the second use rate in a case where the density value of the pixel of interest is a density value corresponding to the highlighted part or the shadowed part to a value which is less than the second use rate in a case where the density value of the pixel is a density value corresponding to the halftone part, and the quantization executing unit additionally adds at least part of a difference between the accumulated error and a product of the second use rate and the accumulated error to the quantization error resulting from the quantization of the pixel of interest.

24. The image processing apparatus according to claim 23, wherein the quantization executing unit includes:
a maximum value determining unit configured to determine whether the density value of the pixel of interest, which is an input value of the quantization of the pixel of interest, is equal to a maximum value in a range available for the density value;
a minimum value determining unit configured to determine whether the density value of the pixel of interest, which is the input value, is equal to a minimum value in the range available for the density value; and
a quantized value obtaining unit configured to obtain a quantized value being a result of the quantization,
if the maximum value determining unit determines that the input value is equal to the maximum value, the quantized value obtaining unit obtains a value to be output in a case where the density value is more than the threshold value as the quantized value, and
if the minimum value determining unit determines that the input value is equal to the minimum value, the quantized value obtaining unit obtains a value to be output in a case where the density value is less than the threshold value as the quantized value.

25. The image processing apparatus according to claim 23, wherein the use rate determining unit sets the first use rate to a value equal to or more than a lowest first use rate regardless of the density value of the pixel of interest, the lowest first use rate being set to a value more than 0 in advance.

26. The image processing apparatus according to claim 25, wherein the use rate determining unit:
uses a preset first highlight reference value and a preset second highlight reference value which is more than the first highlight reference value as references indicating a density range in the highlighted part;
uses a preset first shadow reference value and a preset second shadow reference value which is more than the first shadow reference value as references indicating a density range in the shadowed part;
uses a first halftone reference value which is more than the second highlight reference value and less than the first shadow reference value and a second halftone reference value which is more than the first halftone reference value and less than the first shadow reference value as references indicating a density range at a center of the halftone part;
sets the noise use rate to 1 in a case where the density value of the pixel of interest is equal to or less than the first highlight reference value or equal to or more than the second shadow reference value;
sets the first use rate to the lowest first use rate in a case where the density value of the pixel of interest is equal to or more than the first halftone reference value and equal to or less than the second halftone reference value;
sets the first use rate to a value which is equal to or more than the lowest first use rate and equal to or less than 1 and which is gradually decreased from 1 according to a difference between the density value of the pixel of interest and the first highlight reference value in a case where the density value of the pixel of interest is equal to or more than the first highlight reference value and equal to or less than the first halftone reference value;
sets the first use rate to a value which is equal to or more than the lowest first use rate and equal to or less than 1 and which is gradually increased from the lowest first use rate according to a difference between the density value of the pixel of interest and the second halftone reference value in a case where the density value of the pixel of interest is equal to or more than the second halftone reference value and equal to or less than the second shadow reference value;
sets the second use rate to 1 in a case where the density value of the pixel of interest is equal to or more than the second highlight reference value and equal to or less than the first shadow reference value;
sets the second use rate to a value which is equal to or more than 0 and equal to or less than 1 and which is gradually decreased from 1 according to a difference between the second highlight reference value and the density value of the pixel of interest in a case where the density value is equal to or less than the second highlight reference value; and
sets the second use rate to a value which is equal to or more than 0 and equal to or less than 1 and which is gradually decreased from 1 according to a difference between the density value of the pixel of interest and the first shadow reference value in a case where the density value of the pixel of interest is equal to or more than the first shadow reference value.

27. The image processing apparatus according to claim 26, wherein the use rate determining unit:
additionally uses a third highlight reference value which is more than 0 and equal to or less than the first highlight reference value as a reference indicating a density range in the highlighted part;
additionally uses a third shadow reference value which is equal to or more than the second shadow reference value and less than a maximum value in a range available for the density value as a reference indicating a density range in the shadowed part;
sets the error use rate to 0 in a case where the density value of the pixel is equal to or less than the third highlight reference value;
sets the second use rate to a value obtained by dividing a difference between the density value of the pixel of interest and the third highlight reference value by a difference between the second highlight reference value and the third highlight reference value in a case where the density value is equal to or more than the third highlight reference value and equal to or less than the second highlight reference value;
sets the second use rate to a value obtained by dividing a difference between the third shadow reference value and the density value of the pixel of interest by a difference between the third shadow reference value and the first shadow reference value in a case where the density value is equal to or more than the first shadow reference value and equal to or less than the third shadow reference value; and sets the second use rate to 0 in a case where the density value of the pixel of interest is equal to or more than the third shadow reference value.

28. The image processing apparatus according to claim 27, wherein the use rate determining unit is a unit configured to additionally determine an error propagation rate indicating a degree of influence of the quantization error being an error resulting from the quantization of the pixel of interest on the quantization of the peripheral pixels, and the use rate determining unit determines the error propagation rate for the pixel of interest based on the density value of the pixel of interest, and in determining the error propagation rate, sets the error propagation rate in a case where the density value of the pixel of interest is a density value corresponding to the highlighted part or the shadowed part to a value which is less than the error propagation rate in a case where the density value of the pixel of interest is a density value corresponding to the halftone part.

29. An image processing method for performing quantization on a density value of each pixel in an input image, the density value indicating density of a color, the image processing method comprising:

a pixel selecting step of sequentially selecting a pixel of interest to be subjected to the quantization;

a use rate determining step of determining a first use rate and a second use rate based on the density value of the pixel of interest, the first use rate indicating a degree of influence of a dither matrix noise on the quantization of the pixel of interest, the dither matrix noise being a noise designated by a preset dither matrix, the second use rate indicating a degree of influence of an accumulated error on the quantization of the pixel of interest, the accumulated error being obtained by accumulating quantization errors resulting from the quantization of peripheral pixels;

a quantization executing step of quantizing the density value of the pixel of interest by using a dither matrix noise according to the first use rate for the pixel of interest and using the accumulated error according to the second use rate for the pixel of interest; and an adding step of adding at least part of the accumulated error not used in the quantization of the pixel of interest to a quantization error resulting from the quantization of the pixel of interest.

30. The image processing method according to claim 29, wherein the adding step adds an entire part of the accumulated error not used in the quantization of the pixel of interest to the quantization error resulting from the quantization of the pixel of interest.

31. The image processing method according to claim 29, wherein the quantization executing step:

obtains a threshold value to be used in the quantization of the pixel of interest based on the dither matrix and the first use rate;

obtains an applied error value to be applied in the quantization of the pixel of interest based on the accumulated error and the second use rate for the pixel of interest; and executes the quantization based on the threshold value, the applied error value, and a pixel value of the pixel of interest.

32. The image processing method according to claim 31, wherein the quantization executing step calculates a quantized value based on a comparison between a corrected pixel value and the threshold value, the corrected pixel value obtained by correcting the pixel value of the pixel of interest by using the applied error value.

33. The image processing method according to claim 32, wherein in the quantization executing step, the quantization error resulting from the quantization of the pixel of interest is a difference between the corrected pixel value and the threshold value.

34. The image processing method according to claim 29, wherein in the quantization executing step, the accumulated error not used in the quantization of the pixel of interest is a product of an error non-use rate and the accumulated error, the error non-use rate being obtained by subtracting the second use rate from 1.

35. The image processing method according to claim 29, wherein a value of the first use rate in a case where the density value of the pixel of interest is a first pixel value differing from an intermediate value is more than a value of the first use rate in a case where the density value of the pixel of interest is a second pixel value closer to the intermediate value than the first pixel value is.

36. The image processing method according to claim 29, wherein a value of the second use rate in a case where the density value of the pixel of interest is a first pixel value differing from an intermediate value is less than a value of the second use rate in a case where the density value of the pixel of interest is a second pixel value closer to the intermediate value than the first pixel value is.

37. The image processing method according to claim 29, wherein in determining the first use rate and the second use rate, the use rate determining step sets the first use rate in a case where the density value of the pixel of interest is a density value corresponding to a highlighted part or a shadowed part to a value which is more than the first use rate in a case where the density value of the pixel of interest is a density value corresponding to a halftone part between the highlighted part and the shadowed part, and sets the second use rate in a case where the density value of the pixel of interest is a density value corresponding to the highlighted part or the shadowed part to a value which is less than the second use rate in a case where the density value of the pixel is a density value corresponding to the halftone part, and the quantization executing step additionally adds at least part of a difference between the accumulated error and a product of the second use rate and the accumulated error to the quantization error resulting from the quantization of the pixel of interest.

38. The image processing method according to claim 37, wherein the quantization executing step includes:

a maximum value determining step of determining whether the density value of the pixel of interest, which is an input value of the quantization of the pixel of interest, is equal to a maximum value in a range available for the density value;

a minimum value determining step of determining whether the density value of the pixel of interest, which is the input value, is equal to a minimum value in the range available for the density value; and a quantized value obtaining step of obtaining a quantized value being a result of the quantization, if it is determined in the maximum value determining step that the input value is equal to the maximum value, the quantized value obtaining step obtains a value to be output in a case where the density value is more than the threshold value as the quantized value, and if it is determined in the minimum value determining step that the input value is equal to the minimum value, the quantized value obtaining step obtains a value to be output in a case where the density value is less than the threshold value as the quantized value.

39. The image processing method according to claim 29, wherein the use rate determining step sets the first use rate to a value equal to or more than a lowest first use rate regardless of the density value of the pixel of interest, the lowest first use rate being set to a value more than 0 in advance.

40. The image processing method according to claim 39, wherein the use rate determining step:

uses a preset first highlight reference value and a preset second highlight reference value which is more than the first highlight reference value as references indicating a density range in the highlighted part;

uses a preset first shadow reference value and a preset second shadow reference value which is more than the first shadow reference value as references indicating a density range in the shadowed part;

uses a first halftone reference value which is more than the second highlight reference value and less than the first shadow reference value and a second halftone reference value which is more than the first halftone reference value and less than the first shadow reference value as references indicating a density range at a center of the halftone part;

sets the noise use rate to 1 in a case where the density value of the pixel of interest is equal to or less than the first highlight reference value or equal to or more than the second shadow reference value;

sets the first use rate to the lowest first use rate in a case where the density value of the pixel of interest is equal to or more than the first halftone reference value and equal to or less than the second halftone reference value;

sets the first use rate to a value which is equal to or more than the lowest first use rate and equal to or less than 1 and which is gradually decreased from 1 according to a difference between the density value of the pixel of interest and the first highlight reference value in a case where the density value of the pixel of interest is equal to or more than the first highlight reference value and equal to or less than the first halftone reference value;

sets the first use rate to a value which is equal to or more than the lowest first use rate and equal to or less than 1 and which is gradually increased from the lowest first use rate according to a difference between the density value of the pixel of interest and the second halftone reference value in a case where the density value of the pixel of interest is equal to or more than the second halftone reference value and equal to or less than the second shadow reference value;

sets the second use rate to 1 in a case where the density value of the pixel of interest is equal to or more than the second highlight reference value and equal to or less than the first shadow reference value;

sets the second use rate to a value which is equal to or more than 0 and equal to or less than 1 and which is gradually decreased from 1 according to a difference between the second highlight reference value and the density value of the pixel of interest in a case where the density value is equal to or less than the second highlight reference value; and sets the second use rate to a value which is equal to or more than 0 and equal to or less than 1 and which is gradually decreased from 1 according to a difference between the density value of the pixel of interest and the first shadow reference value in a case where the density value of the pixel of interest is equal to or more than the first shadow reference value.

41. The image processing method according to claim 40, wherein the use rate determining step:

additionally uses a third highlight reference value which is more than 0 and equal to or less than the first highlight reference value as a reference indicating a density range in the highlighted part;

additionally uses a third shadow reference value which is equal to or more than the second shadow reference value and less than a maximum value in a range available for the density value as a reference indicating a density range in the shadowed part;

sets the error use rate to 0 in a case where the density value of the pixel is equal to or less than the third highlight reference value;

sets the second use rate to a value obtained by dividing a difference between the density value of the pixel of interest and the third highlight reference value by a difference between the second highlight reference value and the third highlight reference value in a case where the density value is equal to or more than the third highlight reference value and equal to or less than the second highlight reference value;

sets the second use rate to a value obtained by dividing a difference between the third shadow reference value and the density value of the pixel of interest by a difference between the third shadow reference value and the first shadow reference value in a case where the density value is equal to or more than the first shadow reference value and equal to or less than the third shadow reference value; and sets the second use rate to 0 in a case where the density value of the pixel of interest is equal to or more than the third shadow reference value.

42. The image processing method according to claim 41, wherein the use rate determining step is a step of additionally determining an error propagation rate indicating a degree of influence of the quantization error being an error resulting from the quantization of the pixel of interest on the quantization of the peripheral pixels, and the use rate determining step determines the error propagation rate for the pixel of interest based on the density value of the pixel of interest, and in determining the error propagation rate, sets the error propagation rate in a case where the density value of the pixel of interest is a density value corresponding to the highlighted part or the shadowed part to a value which is less than the error propagation rate in a case where the density value of the pixel of interest is a density value corresponding to the halftone part.

\* \* \* \* \*